United States Patent
Pojar et al.

(10) Patent No.: US 11,392,877 B2
(45) Date of Patent: Jul. 19, 2022

(54) METHOD, APPARATUS, AND COMPUTER PROGRAM PRODUCT FOR LOW LATENCY SERVING OF INTERACTIVE ENTERPRISE ANALYTICS WITHIN AN ENTERPRISE GROUP-BASED COMMUNICATION SYSTEM

(71) Applicant: SLACK TECHNOLOGIES, INC., San Francisco, CA (US)

(72) Inventors: Diana Maria Pojar, San Francisco, CA (US); Colin Gibbs, San Francisco, CA (US); Stanislav Vyacheslavovich Babourine, Walnut Creek, CA (US); Fangzi Huang, San Francisco, CA (US)

(73) Assignee: SlackTechnologies, LLC, San Francisco, CA (US)

( * ) Notice: Subject to any disclaimer, the term of this patent is extended or adjusted under 35 U.S.C. 154(b) by 527 days.

(21) Appl. No.: 15/861,611

(22) Filed: Jan. 3, 2018

(65) Prior Publication Data
US 2019/0205808 A1    Jul. 4, 2019

(51) Int. Cl.
| | |
|---|---|
| G06Q 10/06 | (2012.01) |
| H04L 67/306 | (2022.01) |
| H04L 41/14 | (2022.01) |
| H04L 51/046 | (2022.01) |
| G06F 16/28 | (2019.01) |
| G06F 16/951 | (2019.01) |
| H04L 51/52 | (2022.01) |
| G06Q 50/00 | (2012.01) |
| H04L 67/50 | (2022.01) |

(52) U.S. Cl.
CPC ..... *G06Q 10/06393* (2013.01); *G06F 16/288* (2019.01); *G06F 16/951* (2019.01); *H04L 41/14* (2013.01); *H04L 51/046* (2013.01); *H04L 67/306* (2013.01); *G06Q 50/01* (2013.01); *H04L 51/32* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 10,331,677 B1 * | 6/2019 | Horowitz | G06F 16/22 |
| 2004/0006476 A1 | 1/2004 | Chiu | |
| 2008/0306899 A1 * | 12/2008 | Gregory | G06F 16/345 |
| 2013/0218896 A1 | 8/2013 | Palay | |
| 2013/0268516 A1 * | 10/2013 | Chaudhri | H04L 65/403 |
| | | | 707/722 |
| 2014/0052548 A1 | 2/2014 | Dokken, Jr. | |
| 2017/0185592 A1 | 6/2017 | Frei et al. | |
| 2017/0228253 A1 | 8/2017 | Layman et al. | |

(Continued)

OTHER PUBLICATIONS

H. Bosch et al., "ScatterBlogs2: Real-Time Monitoring of Microblog Messages through User-Guided Filtering," in IEEE Transactions on Visualization and Computer Graphics, vol. 19, No. 12, pp. 2022-2031, Dec. 2013, doi: 10.1109/TVCG.2013.186. (Year: 2013).*

(Continued)

*Primary Examiner* — Cory W Eskridge
(74) *Attorney, Agent, or Firm* — Erise IP, P.A.

(57) ABSTRACT

Embodiments of the present disclosure provide methods, systems, apparatuses, and computer program products for generating and serving low latency enterprise interaction analytics within an enterprise group-based communication system.

20 Claims, 79 Drawing Sheets

(56) References Cited

U.S. PATENT DOCUMENTS

| | | | |
|---|---|---|---|
| 2018/0181626 A1* | 6/2018 | Lyons | G06N 20/10 |
| 2018/0287982 A1 | 10/2018 | Draeger et al. | |
| 2019/0253849 A1 | 8/2019 | Ryder et al. | |

OTHER PUBLICATIONS

Matsumoto, T. et al., "Chocoa Communicator—A New Communication System Based on Awareness and Text Communications—", Fujitsu Sci. Tech. J., 36, 2, (Dec. 2000) 154-161.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
Robert Hof, "Stewart Butterfield On How Slack Became A $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.
Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.
Internet Relay Chat, Wikipedia,, [online][retrieved May 30, 2019]. Retrieved from the Internet: <URL: https://en.wikipedia.org/wiki/Internet_Relay_Chat>. (dated May 28, 2019) 17 pages.
Ernie Smith, "Picking Up The Slack", TEDIUM, [online][retrieved May 9, 2019], Retrieved from the Internet: <URL: https://tedium.co/2017/10/17/irc-vs-slack-chat-history/>. (dated Oct. 17, 2017) 8 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.
"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
U.S. Appl. No. 15/651,887, filed Jul. 17, 2017, In re: Grant entitled Messaging Search and Management Apparatuses, Methods and Systems, U.S. Appl. No. 15/651,887.
U.S. Appl. No. 15/604,589, filed May 24, 2017, In re: Grant entitled Messaging Search and Management Apparatuses, Methodsand Systems, U.S. Appl. No. 15/604,589.
U.S. Appl. No. 15/604,584, filed May 24, 2017, In re: Grant entitled Messaging Search and Management Apparatuses, Methodsand Systems, U.S. Appl. No. 15/604,584.

* cited by examiner

```
CREAT TABLE IF NOT EXISTS server_logs (
    team_id BIGINT,
    user_id BIGINT,
    visitor_id STRING,
    user_agent MAP<STRING, STRING>,
    api_call_method STRING,
    api_call_ok BOOLEAN
)
PARTITIONED BY (year INT, month INT, day INT, hour INT)
STORED AS PARQUET
LOCATION 's3://data/server_logs'
```

FIG. 4A

File schema:
"fields": [{"name":"user_id", "type":"long"},
          {"name":"srver_name", "type":"string"},
          {"name":"experiment_name, "type":"string"}]

Table schema:
(user_id BIGINT, experiment_name STRING, server_name STRING)

---------------------------------------Hive---------------------------------------

| user_id | experiment_name | server_name |
|---------|-----------------|-------------|
| 1       | test1           | slack-1     |
| 2       | test1           | slack-2     |

---------------------------------------Presto-------------------------------------

| user_id | experiment_name | server_name |
|---------|-----------------|-------------|
| 1       | slack-1         | test1       |
| 2       | slack-2         | test1       |

FIG. 4B

Teams > Customer Experience
< Public Channels

Export CSV | Last 30 days ▼

Q Search public channels

12 Channels | | | | | Edit Columns |
|---|---|---|---|---|---|
| Name ▼ | Created ▼ | Team ▼ | Messages ▼ | Messages from apps ▼ | Total members ▼ |
| # ce-tweeters ⊕⊕ <br> people riding flying horses or... | 12/24/2015 | Shared <br> With the entire organization | 420,816 | --- | 125 |
| # ops ⊕ | 9/1/2015 | Shared <br> Customer Experience and 2 others | 420,816 | --- | 231 |
| # triage-ops ⊕⊕ <br> Bothering just the right number... | 12/24/2015 | Shared <br> Customer Experience and 2 others | 420,816 | --- | 262 |
| # ops-team ⊕⊕ <br> This channel is for the operation... | 12/24/2015 | Shared <br> With the entire organization | 420,816 | --- | 125 |
| # team-desktop ⊕⊕ <br> Talk about the Mighty Morphin... | 12/24/2015 | Shared <br> Tinyprise | 420,816 | --- | 191 |
| # growth-random ⊕⊕ <br> people riding flying horses or... | 12/24/2015 | Shared <br> Tinyprise and 1 other | 420,816 | --- | 125 |
| # ce-platform ⊕⊕ <br> You have questions about Platfo... | 12/24/2015 | Shared <br> Customer Experience and 2 others | 420,816 | --- | 125 |
| # devel-android ⊕⊕ <br> Android team's architecture | 12/24/2015 | Shared <br> With the entire organization | 420,816 | --- | 125 |

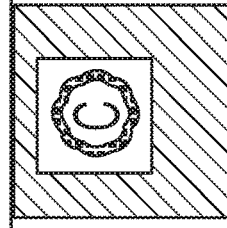

□□ Organization
▤ Billing
⊕ Analytics
⊙ Security
⚙ Settings

Team Table Rows

| Name | Public channels | Members | Messages | % of messages posted in public | Total active users | Change in active users | Messges from people | Messges from bots | Files shared | Messages in public channels | Messages in shared channels | Messages in private channels | Messages in direct messages | Cross-team direct messages |
|---|---|---|---|---|---|---|---|---|---|---|---|---|---|---|
| Team A | 57 | 300 | 5 | 20% | 89 | ↑ 3% | 11,235,434 | 5,434 | 5,434 | 5,434 | 1,000 | 400 | 30 | 4 |
| Team B | 57 | 300 | 5 | 20% | 47 | ↓ 29% | 235,434 | 12 | 5,434 | 5,434 | 1,000 | 400 | 30 | 4 |

FIG. 33

Channel Table Rows

| Name | Created | Teams | Messages | Messages from apps | Total members | Active Members | Members who sent a message | Members who read a message | Members who reacted |
|---|---|---|---|---|---|---|---|---|---|
| # alerts <br> people riding flying horses or... | 12/24/2015 | Shared with the entire organization | 420,616 | - | 12,000 | 120 | 54 | 54 | 54 |
| # ops <br> people riding flying horses or enjoying solo ice cream parties... you know, stuff like that. | 9/1/2015 | Shared with customer Experience and others... <br> Customer Experience, Enterprise, Tinyspeck | 420,616 | - | 231 | 120 | 54 | 54 | 54 |

Member Table Rows

| Name | Account type | Team | Days active | Last activity | Username | Billable | Account created | Messages sent |
|---|---|---|---|---|---|---|---|---|
| John Doe<br>Director of Global Strategy | Full member | Company and 2 others | 17 | 12/27/2016 | username | Yes | 12/13/2016 | 5,000 |
| John Doe<br>Social Media Expert | Multi-channel guest<br>{#pr, #marketing, #editorial} | Company and Tinycompany2<br>{Customer Experience, Enterprise, Tinycompany} | 17 | 12/27/2016 | username | Yes | 12/13/2016 | 700 |

| 6 Teams | | | | | | | Edit Columns |
|---|---|---|---|---|---|---|---|
| Name ▼ | Public channels ▼ | Members ▼ | Messages ▼ | % of messages Read in public ▼ | Weekly active users ▼ | Change in active users ▼ | Me fro |
| Team A | 2 | 5 | -- | 60% | 12 | ↑ 1% | 1 |
| Team B | 12 | 5 | No data available | 60% | 12 | ↑ 1% | 1 |
| Team C | 8 | 5 | -- | 60% | 12 | ↑ 1% | 1 |
| Team D | 2 | 5 | -- | 60% | 12 | ↑ 1% | 1 |
| Team E | 12 | 5 | -- | 60% | 12 | ↑ 1% | 1 |
| Team F | 8 | 5 | -- | 60% | 12 | ↑ 1% | 1 |

| 3 Teams | | | | | | | Edit Columns |
|---|---|---|---|---|---|---|---|
| Name | Public Channels | Members | Messages | % of messages read in public | Weekly active users | Change in active users | Me fro |
| Team A | 2 | 5 | 182 | 60% | 12 | ↑ 1% | 18 |
| Team B | 12 | 5 | 182 | 60% | 12 | ↑ 1% | 18 |
| Team C | 8 | 5 | 182 | 60% | 12 | ↑ 1% | 18 |

| 3 Teams | | | | | | | Edit Columns |
|---|---|---|---|---|---|---|---|
| Name ▼ | Public Channels ▲ | Members ▼ | Messages ▼ | % of messages read in public ▼ | Weekly active users ▼ | Change in active users ▼ | Mess from |
| Team A | 2 | 5 | 182 | 60% | 12 | ↑ 1% | 182 |
| Team C | 8 | 5 | 182 | 60% | 12 | ↑ 1% | 182 |
| Team B | 12 | 5 | 182 | 60% | 12 | ↑ 1% | 182 |

FIG. 42

| 3 Teams | | | | | | | Edit Columns |
|---|---|---|---|---|---|---|---|
| Name ▼ | Public Channels ▼ | Members ▼ | Messages ▼ | % of messages read in public ▼ | Weekly active users ▼ | Change in active users ▼ | Me fro |
| Team B | 12 | 5 | 182 | 60% | 12 | ↑ 1% | 18 |
| Team C | 8 | 5 | 182 | 60% | 12 | ↑ 1% | 18 |
| Team A | 2 | 5 | 182 | 60% | 12 | ↑ 1% | 18 |

| Name ↓ | essages ↓ | % of messages read in public ↓ | Weekly active users ↓ | Change in active users ↓ | Message from people ↓ | Files shared ↓ |
|---|---|---|---|---|---|---|
| Team A | 2 | 60% | 12 | ↑ 1% | 182 | 5,434 |
| Team B | 2 | 60% | 12 | ↑ 1% | 182 | 5,434 |
| Team C | 2 | 60% | 12 | ↑ 1% | 182 | 5,434 |
| Team D | 2 | 60% | 12 | ↑ 1% | 182 | 5,434 |
| Team E | 2 | 60% | 12 | ↑ 1% | 182 | 5,434 |
| Team F | 2 | 60% | 12 | ↑ 1% | 182 | 5,434 |
| Team G | 2 | 60% | 12 | ↑ 1% | 182 | 5,434 |
| Team H | 2 | 60% | 12 | ↑ 1% | 182 | 5,434 |
| Team I | 2 | 60% | 12 | ↑ 1% | 182 | 5,434 |
| Team J | 2 | 60% | 12 | ↑ 1% | 182 | 5,434 |
| Team K | 2 | 60% | 12 | ↑ 1% | 182 | 5,434 |
| Team L | 2 | 60% | 12 | ↑ 1% | 182 | 5,434 |

19 Teams — Edit Columns

| NAME ▼ | CHANNELS | MEMBERS | MESSAGES | MESSAGES READ IN PUBLIC CHANNELS | ACTIVE USERS | CHANGE IN ACTIVE USERS | MES FRO |
|---|---|---|---|---|---|---|---|
| Team Name | 57 | 300 | 5 | 20% | 20% | ↑ 3% | 5.4 |
| Team Name | 57 | 300 | 5 | 20% | 20% | ↑ 3% | 5.4 |
| Team Name | 57 | 300 | 5 | 20% | 20% | ↑ 3% | 5.4 |
| Team Name | 57 | 300 | 5 | 20% | 20% | ↑ 3% | 5.4 |
| Team Name | 57 | 300 | 5 | 20% | 20% | ↑ 3% | 5.4 |
| Team Name | 57 | 300 | 5 | 20% | 20% | ↑ 3% | 5.4 |
| Team Name | 57 | 300 | 5 | 20% | 20% | ↑ 3% | 5.4 |

35 Teams — Export CSV — Last 30 days

| 6 Teams | | | | | | | Edit Columns |
|---|---|---|---|---|---|---|---|
| Name ▼ | Public Channels ▼ | Members ▼ | Messages ▼ | % of messages read in public ▼ | Weekly active users ▼ | Change in active users ▼ | Mess from |
| Team A | 2 | 5 | 182 | 60% | 12 | ↑ 1% | 18 |
| Team B | 12 | 5 | 182 | 60% | 12 | ↑ 1% | 18 |
| Team C | 8 | 5 | 182 | 60% | 12 | ↑ 1% | 18 |
| Team D | 2 | 5 | 182 | 60% | 12 | ↑ 1% | 18 |
| Team E | 12 | 5 | 182 | 60% | 12 | ↑ 1% | 18 |
| Team F | 8 | 5 | 182 | 60% | 12 | ↑ 1% | 18 |

METHOD, APPARATUS, AND COMPUTER PROGRAM PRODUCT FOR LOW LATENCY SERVING OF INTERACTIVE ENTERPRISE ANALYTICS WITHIN AN ENTERPRISE GROUP-BASED COMMUNICATION SYSTEM

BACKGROUND

An enterprise may support communication and collaboration among users across the enterprise. Applicant has identified a number of deficiencies and problems associated with assessing usage, impact, and value of an enterprise communication system. Through applied effort, ingenuity, and innovation, many of these identified problems have been solved by developing solutions that are included in embodiments of the present disclosure, many examples of which are described in detail herein.

BRIEF SUMMARY

This specification relates to the generation and serving of, with low latency, enterprise interaction analytics within an enterprise group-based communication system.

In embodiments, a system for generating enterprise interaction data structures within an enterprise group-based communication system comprises an enterprise group-based communication analytics repository comprising processed enterprise interaction data and unprocessed enterprise interaction data. In embodiments, the enterprise group-based communication analytics repository is in communication with a plurality of data retrieval engines, where each data retrieval engine of the plurality of data retrieval engines is in communication with one or more enterprise interaction data sources. In embodiments, each enterprise interaction data source comprises unprocessed enterprise interaction data including a plurality of enterprise-based digital content objects organized among a plurality of enterprise group-based communication channels. In embodiments, each data retrieval engine is configured to extract unprocessed enterprise interaction data from one or more of the enterprise interaction data sources of the plurality of enterprise interaction data sources. In embodiments, each data retrieval engine is configured to persist unprocessed enterprise interaction data to the enterprise group-based communication analytics repository.

In embodiments, the enterprise group-based communication analytics repository is further in communication with a plurality of query engines, where each query engine of the plurality of query engines is configured to retrieve unprocessed enterprise interaction data from the enterprise group-based analytics repository, process the unprocessed enterprise interaction data to produce processed enterprise interaction data, and return the processed enterprise interaction data to the enterprise group-based analytics repository.

In embodiments, the system further comprises a low latency data communication module configured to generate enterprise analytics analyses in response to receiving enterprise analytics requests from an analytics serving module of a client device.

In embodiments, the system further comprises an analytics computational engine in communication with the enterprise group-based communication analytics repository and the low latency data communication module. In embodiments, the analytics computational engine is configured to retrieve processed enterprise interaction data from the enterprise group-based communication analytics repository and, using a series of computational pipelines dedicated to respective enterprise analytics processing jobs, generate enterprise interaction data structures for use by the low latency data communication module in generating the enterprise analytics analyses.

In embodiments, unprocessed enterprise interaction data comprises one or more signals associated with electronic interactions by client devices with an enterprise group-based communication system.

In embodiments, electronic interactions are one or more of user account creations, direct message transmissions, enterprise group-based communication channels created, enterprise group-based communication channels joined, messages read, messages written, feature uses, emoji uses, cursor mark movements, files uploaded, files downloaded, group-based communication channel deletions, user account deletions, calls placed, teams joined, and teams created.

In embodiments, an enterprise interaction data source is one or more of a server and a backup database.

In embodiments, a data retrieval engine is one of a distributed queue or a data consumption tool. In embodiments, a query engine is one or more of Hive®, Presto®, or Spark®.

In embodiments, the analytics computational engine is further configured to identify and resolve dependencies between enterprise analytics processing jobs.

In embodiments, the analytics computational engine is further configured to retrieve processed enterprise interaction data from the enterprise group-based communication analytics repository on a periodic basis.

In embodiments, processed enterprise interaction data is enterprise interaction data from which metadata has been extracted such that an enterprise interaction may be associated with other enterprise interaction data of the enterprise group-based communication system.

In embodiments, enterprise analytics processing jobs are one or more of statistical processing and aggregation of enterprise interaction data.

In embodiments, the analytics serving module is a user interface.

In embodiments, an enterprise analytics request comprises a date range, an enterprise analytics metric level, an enterprise analytics visualization type, and one or more enterprise analytics metrics. In embodiments, the low latency data communication module is configured to retrieve enterprise interaction data structures based on one or more of the a date range, an enterprise analytics metric level, an enterprise analytics visualization type, and one or more enterprise analytics metrics.

In embodiments, a system for generating enterprise interaction data structures within an enterprise group-based communication system comprises an enterprise group-based communication analytics repository comprising processed enterprise interaction data and unprocessed enterprise interaction data.

In embodiments, an analytics computational engine is configured to retrieve processed enterprise interaction data from the enterprise group-based communication analytics repository and, using a series of computational pipelines dedicated to respective enterprise analytics processing jobs, identify dependencies between a plurality of enterprise analytics processing jobs required to generate a plurality of data structures, resolve the dependencies between the plurality of enterprise analytics processing jobs by assigning them to a chronology such that a first enterprise analytics processing job that depends on a second enterprise analytics processing job will not be started before the second enterprise analytics processing job is completed, and generate the plurality of data structures representing statistical calculations and aggregations of the retrieved processed enterprise interaction data.

In embodiments, the analytics computational engine is further configured to provide the plurality of enterprise interaction data structures to the low latency data communication module for use in generating the enterprise analytics analyses.

In embodiments, the analytics computational engine is further configured to generate any necessary intermediate data structures, and iteratively join the intermediate data structures until the enterprise interaction data structure is complete. In embodiments, the enterprise interaction data structure represents one or more of statistical calculations and aggregations of enterprise level interaction data, user level interaction data, channel level interaction data, workspace level interaction data, and team level interaction data.

In embodiments, the analytics computational engine is further configured to group data within the enterprise interaction data structure. In embodiments, the analytics computational engine is further configured to filter out unwanted data from the enterprise interaction data structure.

In embodiments, a system for serving interactive enterprise analytics within an enterprise group-based communication system comprises an enterprise group-based communication analytics repository comprising processed enterprise interaction data and unprocessed enterprise interaction data. In embodiments, the enterprise group-based communication analytics repository is in communication with a plurality of data retrieval engines, where each data retrieval engine is in communication with one or more enterprise interaction data sources, and where each enterprise interaction data source comprises unprocessed enterprise interaction data including a plurality of enterprise-based digital content objects organized among a plurality of enterprise group-based communication channels.

In embodiments, the enterprise group-based communication analytics repository is further in communication with a plurality of query engines configured to process the unprocessed enterprise interaction data into processed enterprise interaction data.

In embodiments, the system further comprises an analytics computational engine in communication with the enterprise group-based communication analytics repository and a low latency data communication module.

In embodiments, the low latency data communication module is configured to receive, from a client device, a first analytics request for an enterprise analytics analysis, the first analytics request comprising a date range, an enterprise analytics metric level, an enterprise analytics visualization type, and one or more enterprise analytics metrics.

In embodiments, the low latency data communication module is further configured to retrieve a first enterprise interaction data structure provided by the analytics computational engine based on the date range, the enterprise analytics metric level, and the one or more enterprise analytics metrics.

In embodiments, the low latency data communication module is further configured to format the first enterprise interaction data structure according to the enterprise analytics metric level into a first enterprise analytics analysis.

In embodiments, the low latency data communication module is further configured to transmit the first enterprise analytics analysis to the requesting client device, wherein the first enterprise analytics analysis is configured to be rendered for display on the client device.

In embodiments, the low latency data communication module is further configured to receive a first enterprise analytics analysis modify request from the client device, the first enterprise analytics analysis modify request comprising one or more of a revised date range, a revised enterprise metric level, a revised enterprise analytics visualization type, and one or more revised enterprise analytics metrics.

In embodiments, the low latency data communication module is further configured to retrieve a second enterprise interaction data structure provided by the analytics computational engine based on any of the revised date range, revised enterprise metric level, and one or more revised enterprise analytics metrics.

In embodiments, the low latency data communication module is further configured to format the second enterprise interaction data structure according to one of the enterprise analytics metric level or the revised enterprise analytics visualization type into a second enterprise analytics analysis.

In embodiments, the low latency data communication module is further configured to transmit the second enterprise analytics analysis to the client device, wherein the second enterprise analytics analysis is configured to be rendered for display on the client device.

In embodiments, the low latency data communication module is further configured to store the first enterprise analytics analysis and the second enterprise analytics analysis.

In embodiments, the low latency data communication module is further configured to receive a third enterprise analytics request from the client device, the third enterprise analytics request comprising an identifier associated with the first enterprise analytics analysis. In embodiments, the low latency data communication module is further configured to retrieve the first enterprise analytics analysis and transmit the first enterprise analytics analysis to the client device.

In embodiments, the enterprise analytics visualization type is one of a line graph, a pie chart, a chart, a table, a word cloud, a graphic, and a graph.

In embodiments, the enterprise analytics metric level is one of enterprise, team, group, group-based communication channel, user, third party resource, feature, and workspace.

In embodiments, the low latency data communication module is further configured to transmit the first enterprise analytics analysis in an electronic message to an electronic inbox associated with a user profile associated with the enterprise group-based communication system.

Other embodiments include corresponding systems, methods, and computer programs, configured to perform the operations of the apparatus, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
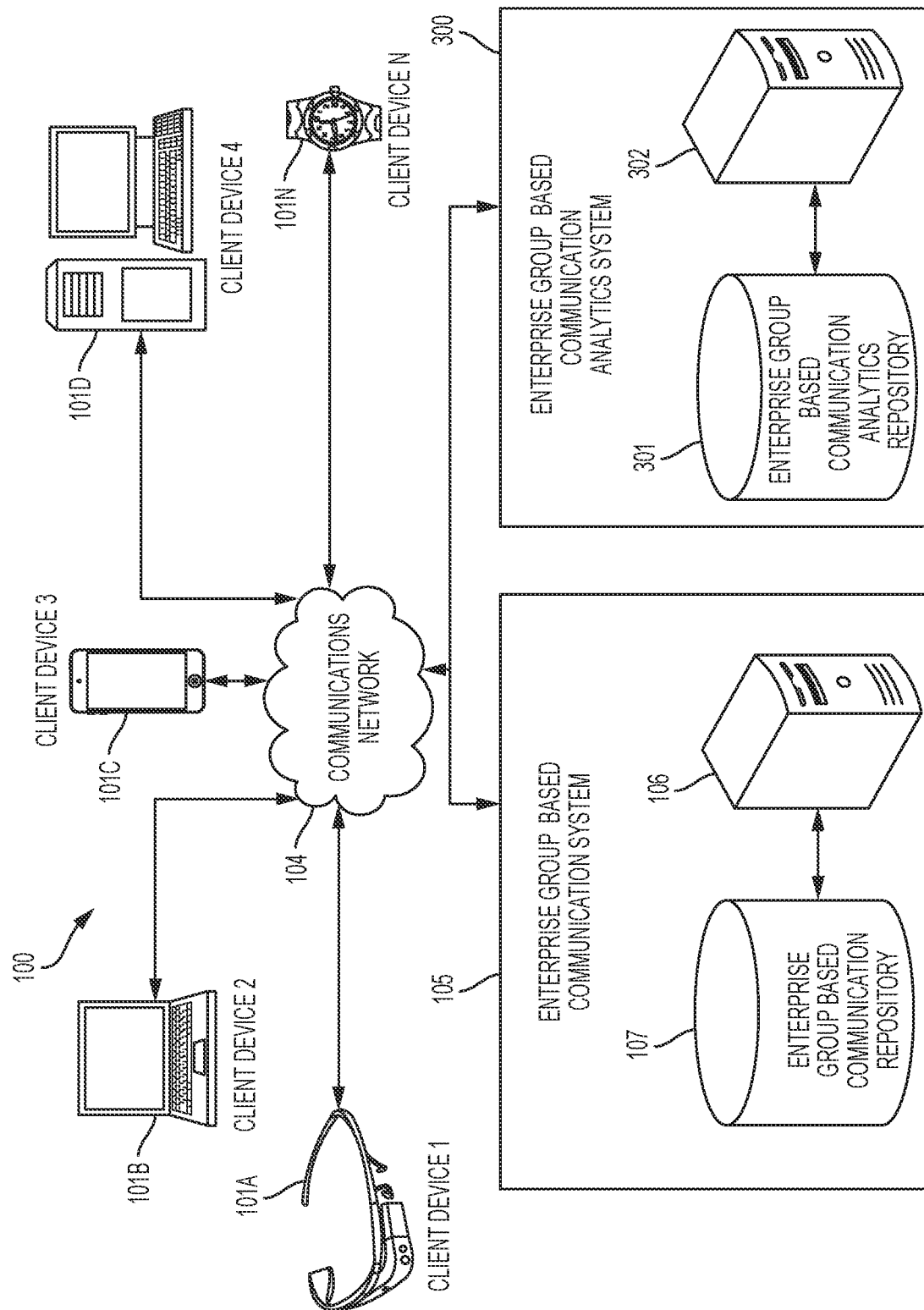
Figure 2:
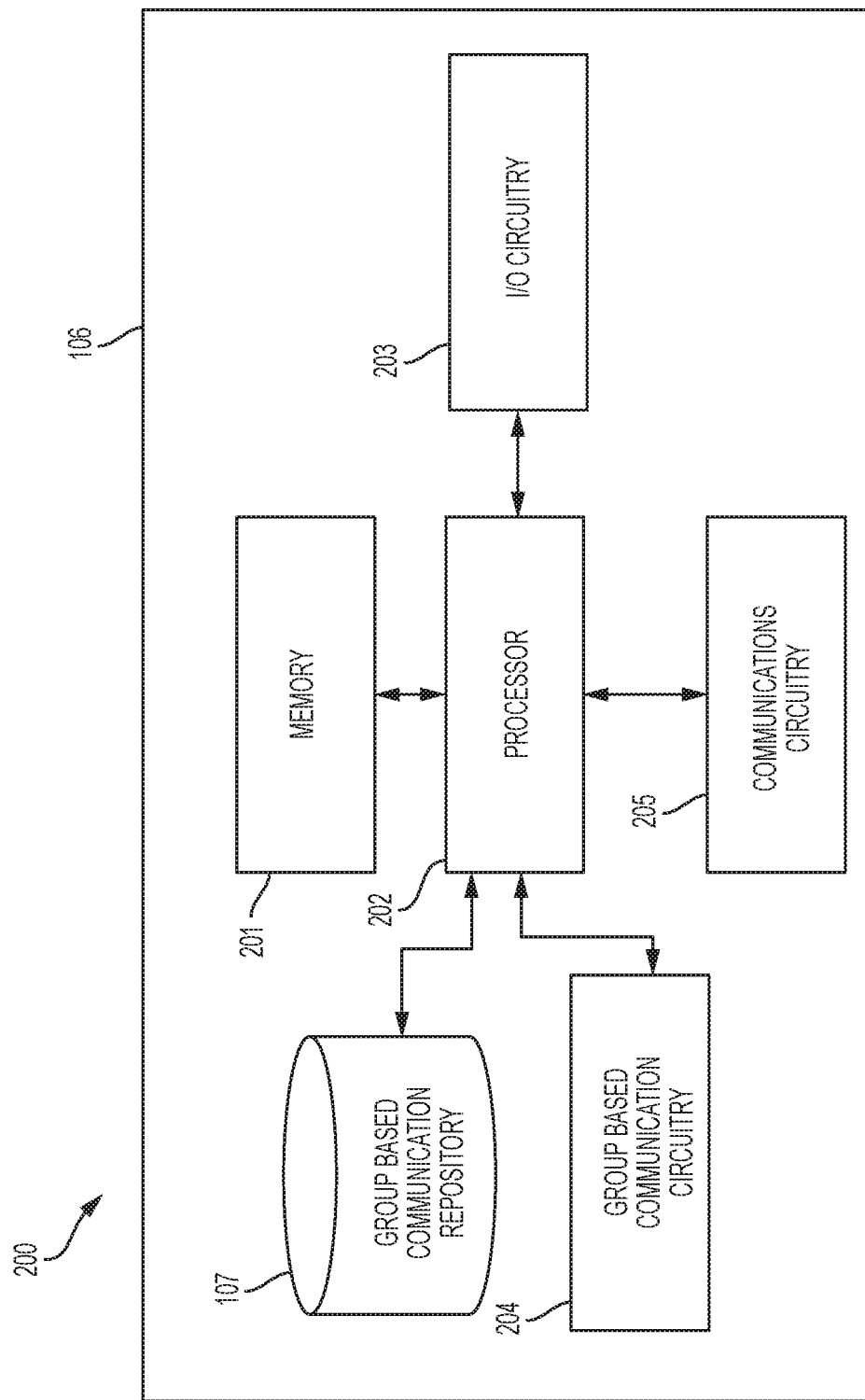
Figure 3:
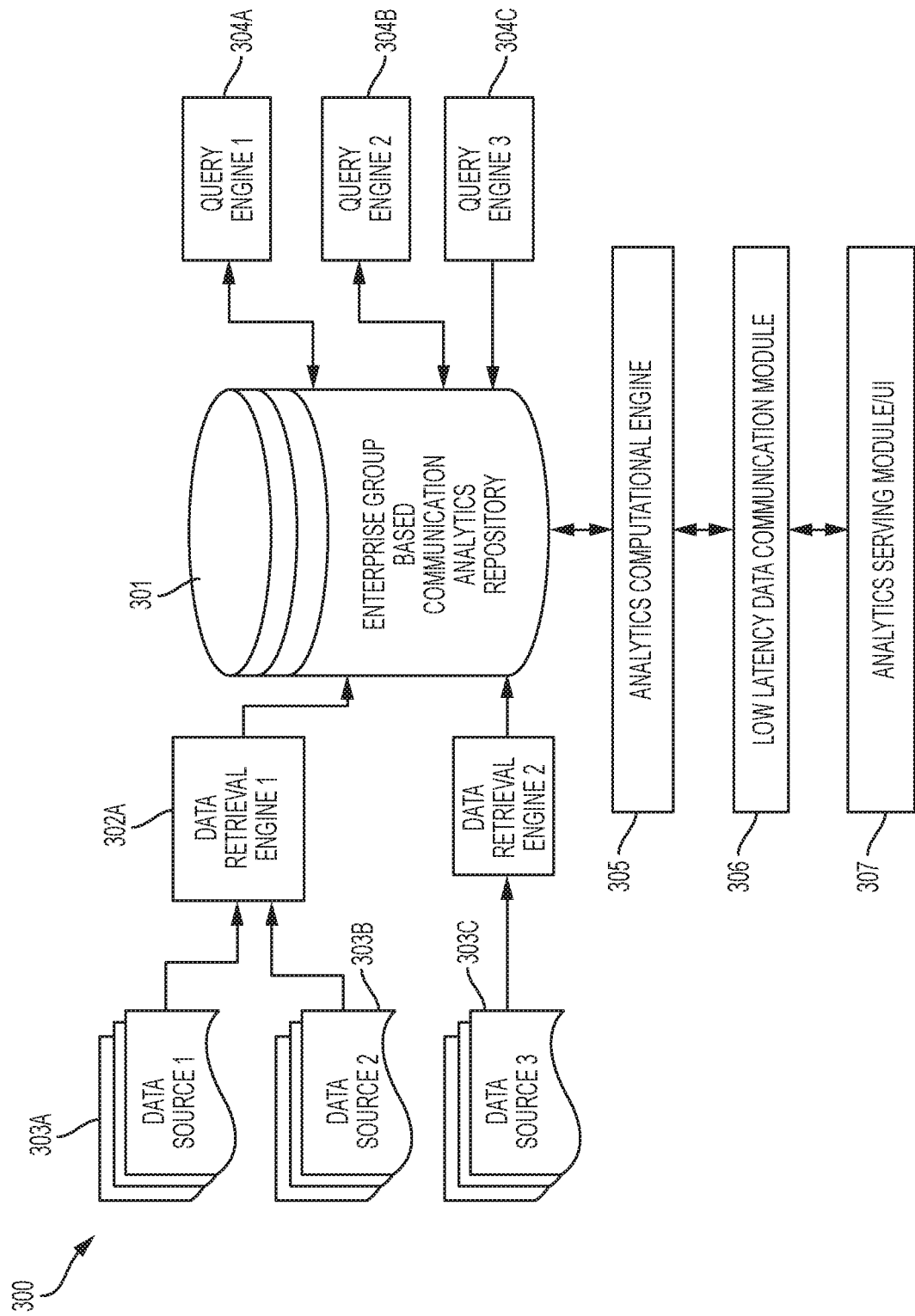
Figures 1, 5A:
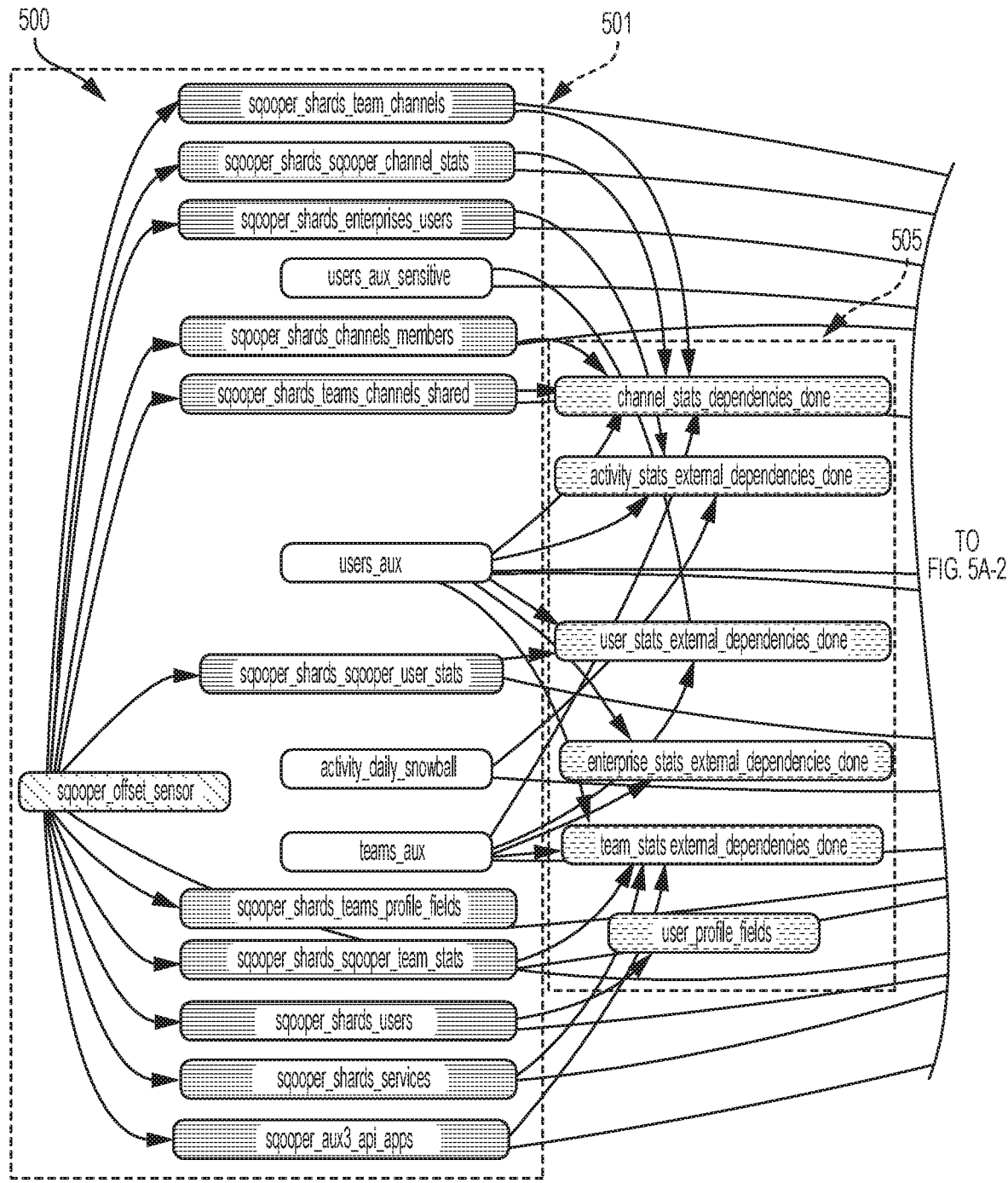
Figures 2, 5A:
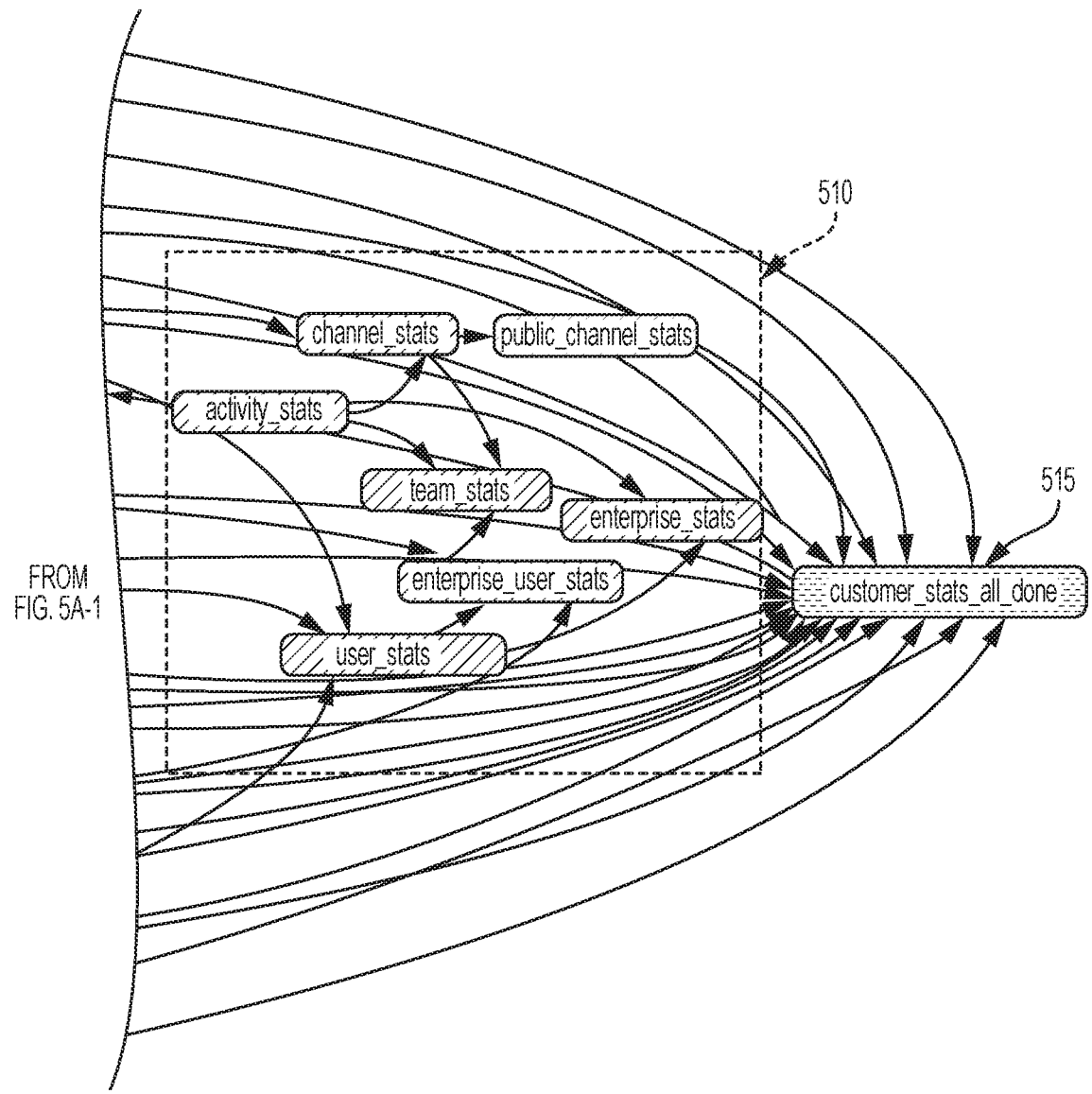
Figure 5B:
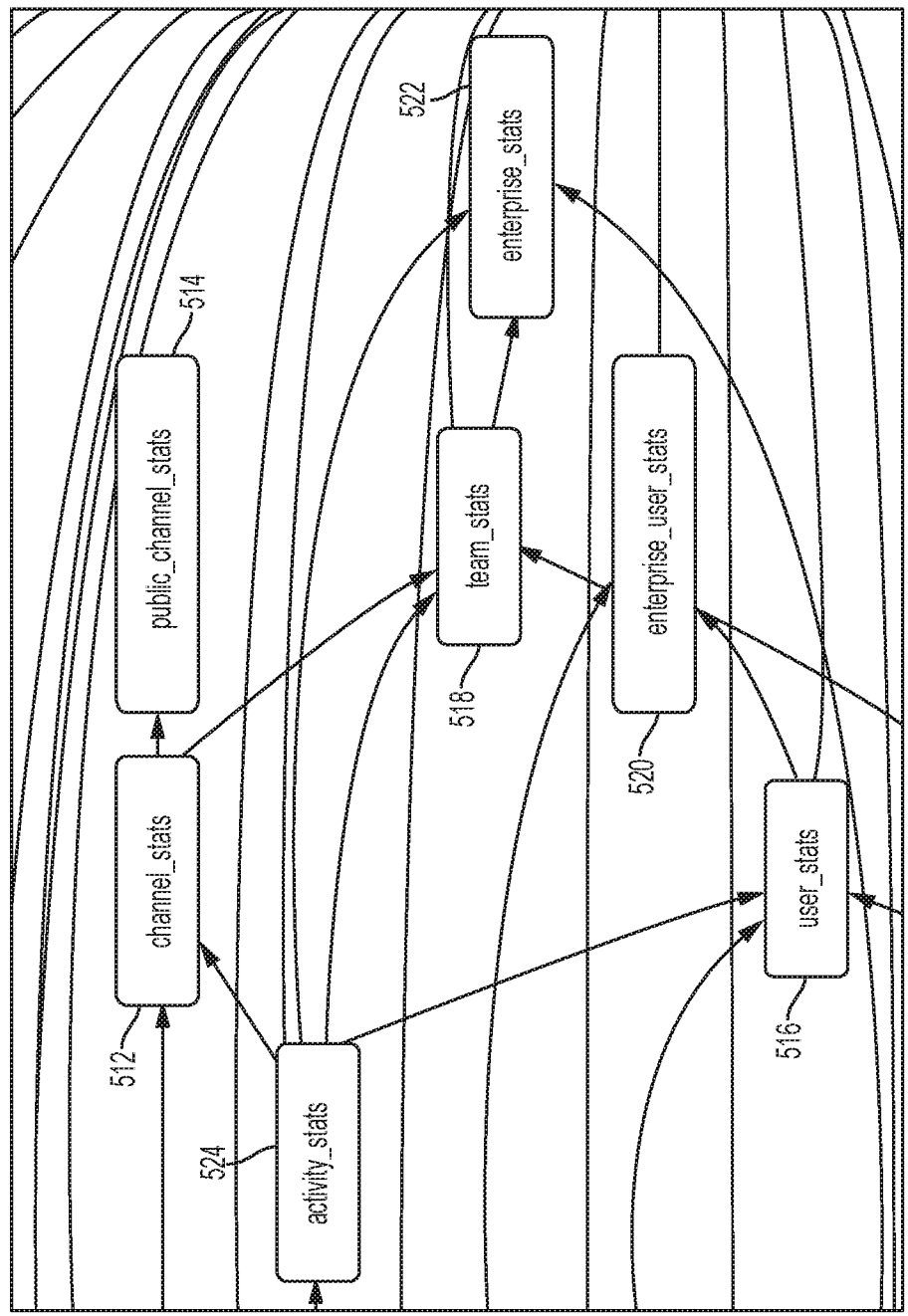
Figure 5C:
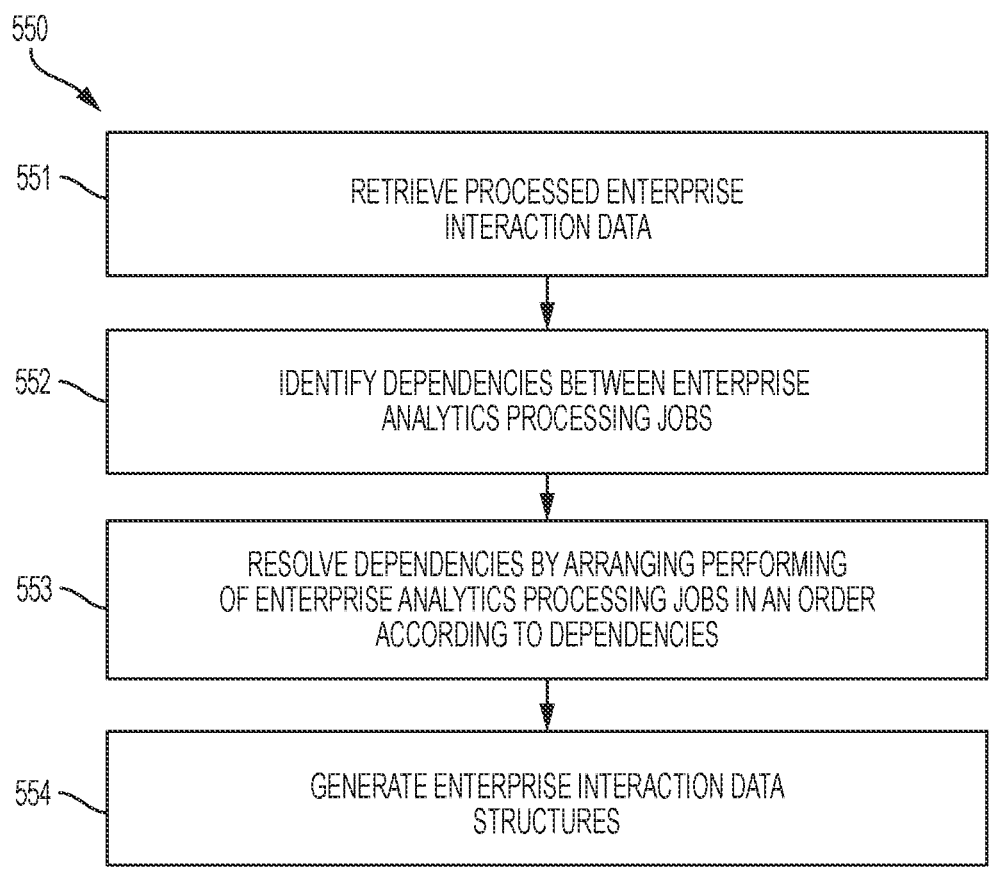
Figure 5D:
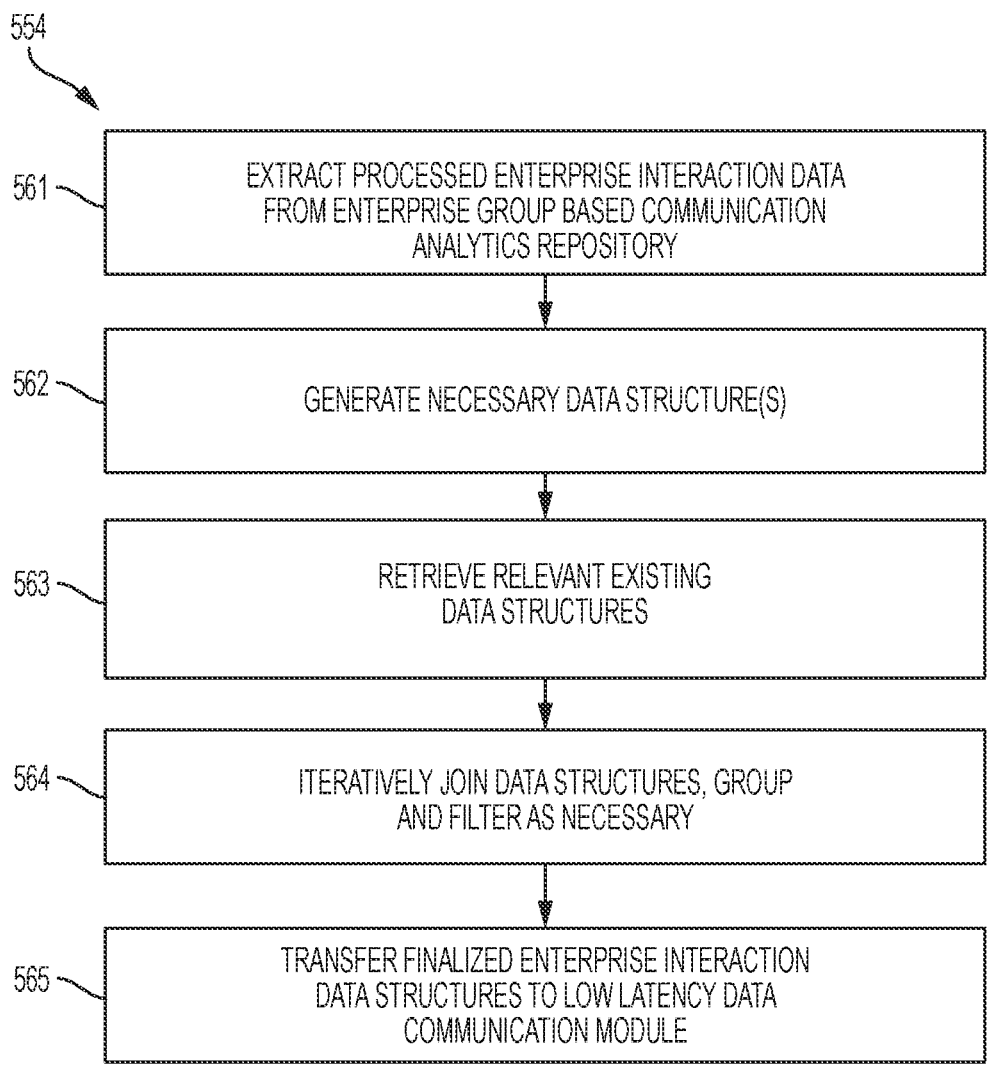
Figure 7A:
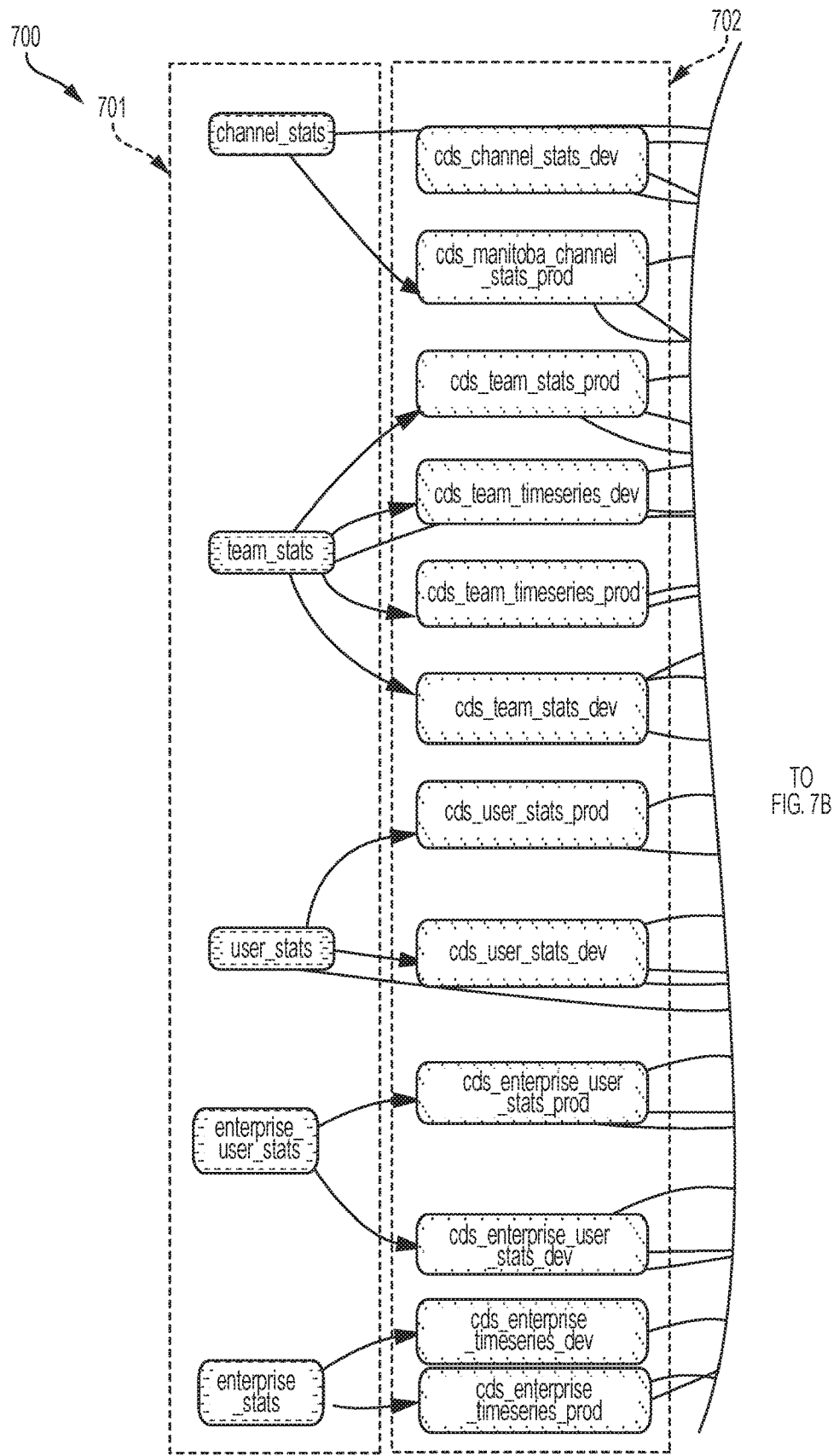
Figure 7B:
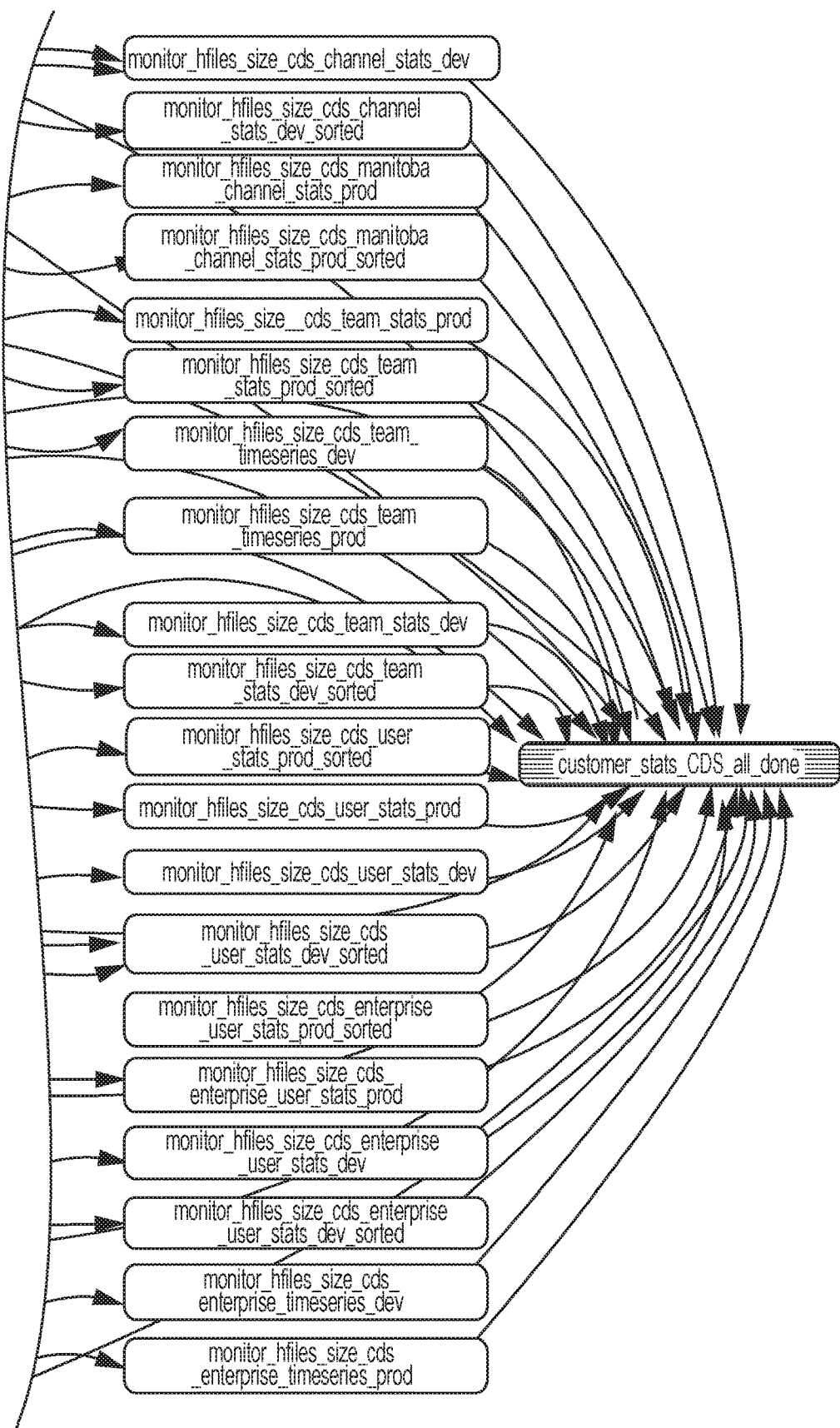
Figure 8:
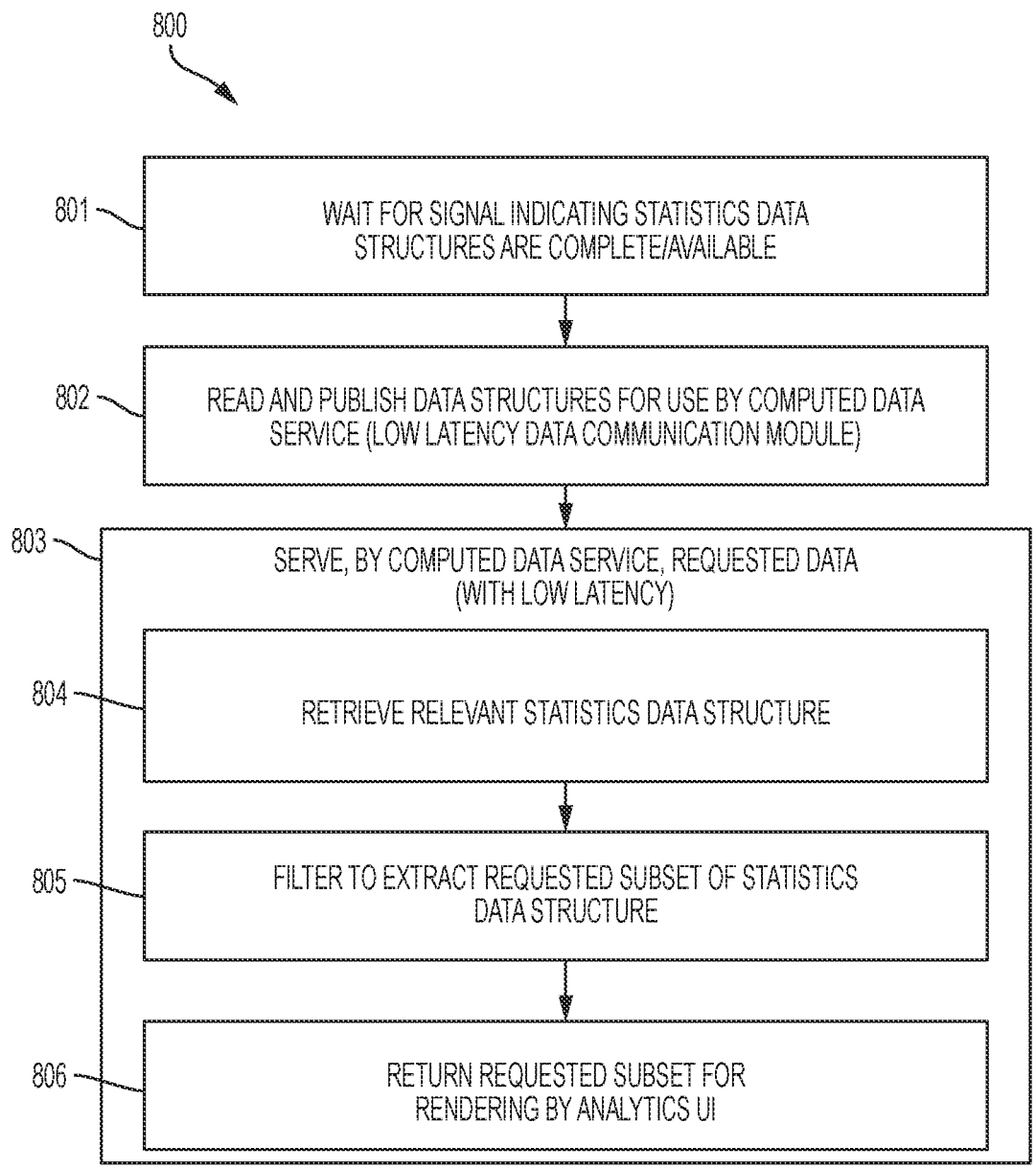
Figure 10A:
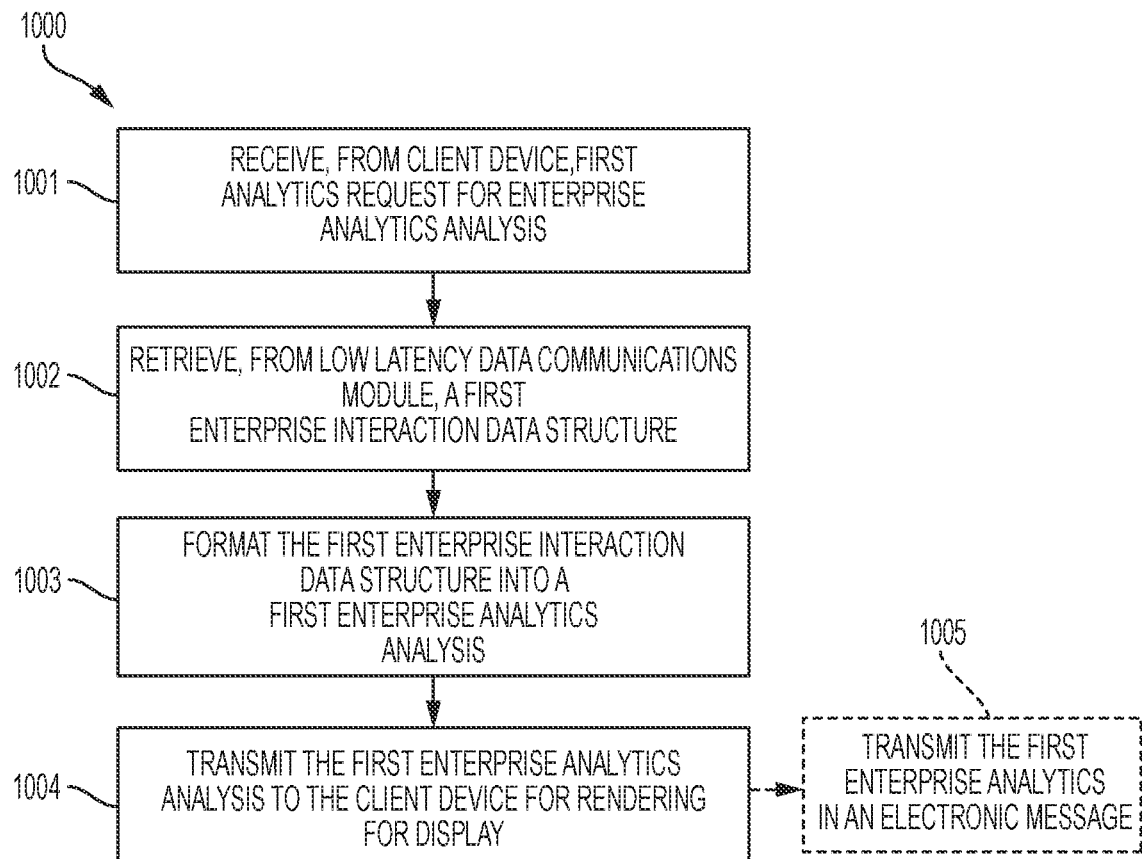
Figure 10B:
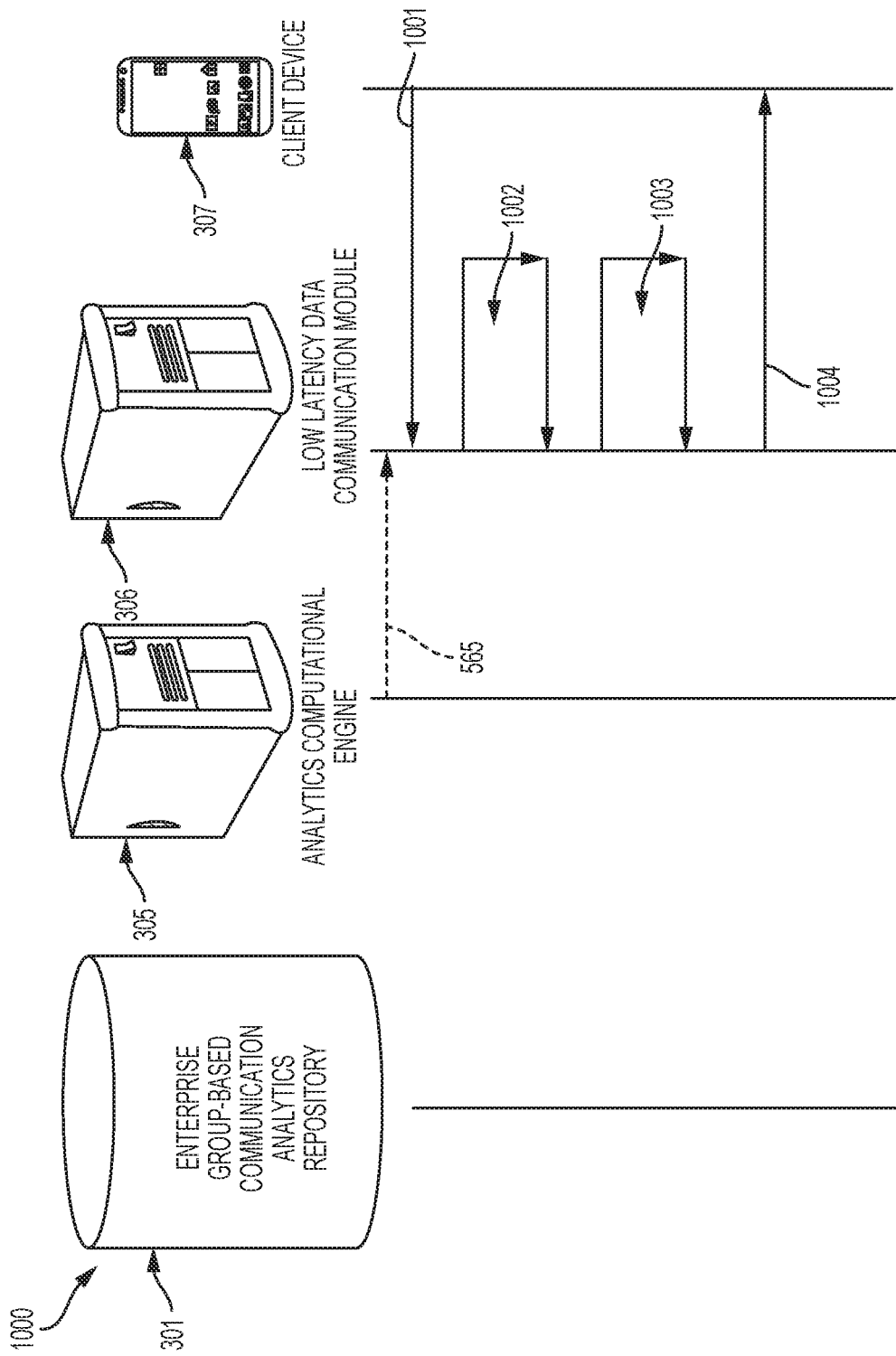
Figure 10C:
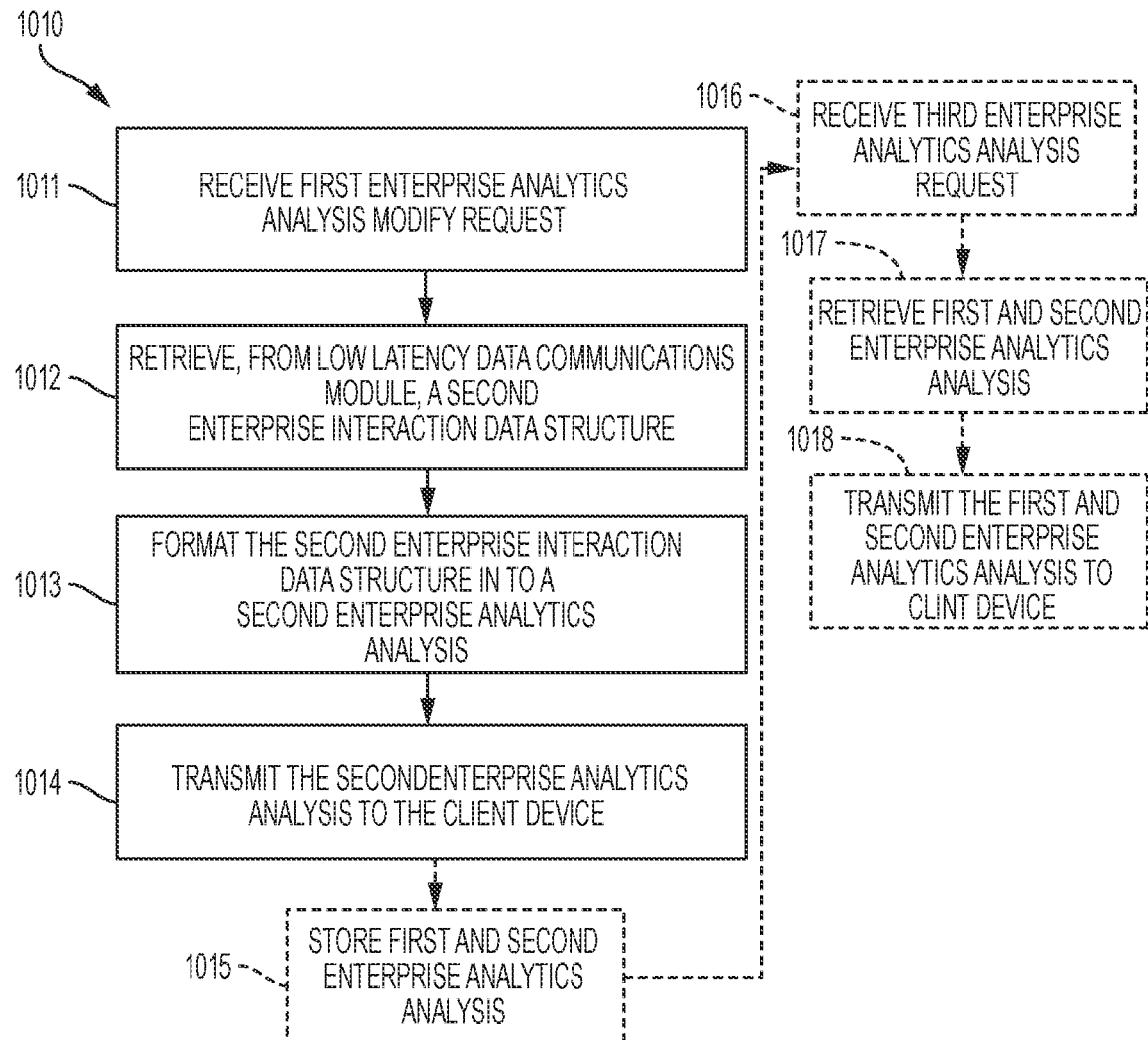
Figure 10D:
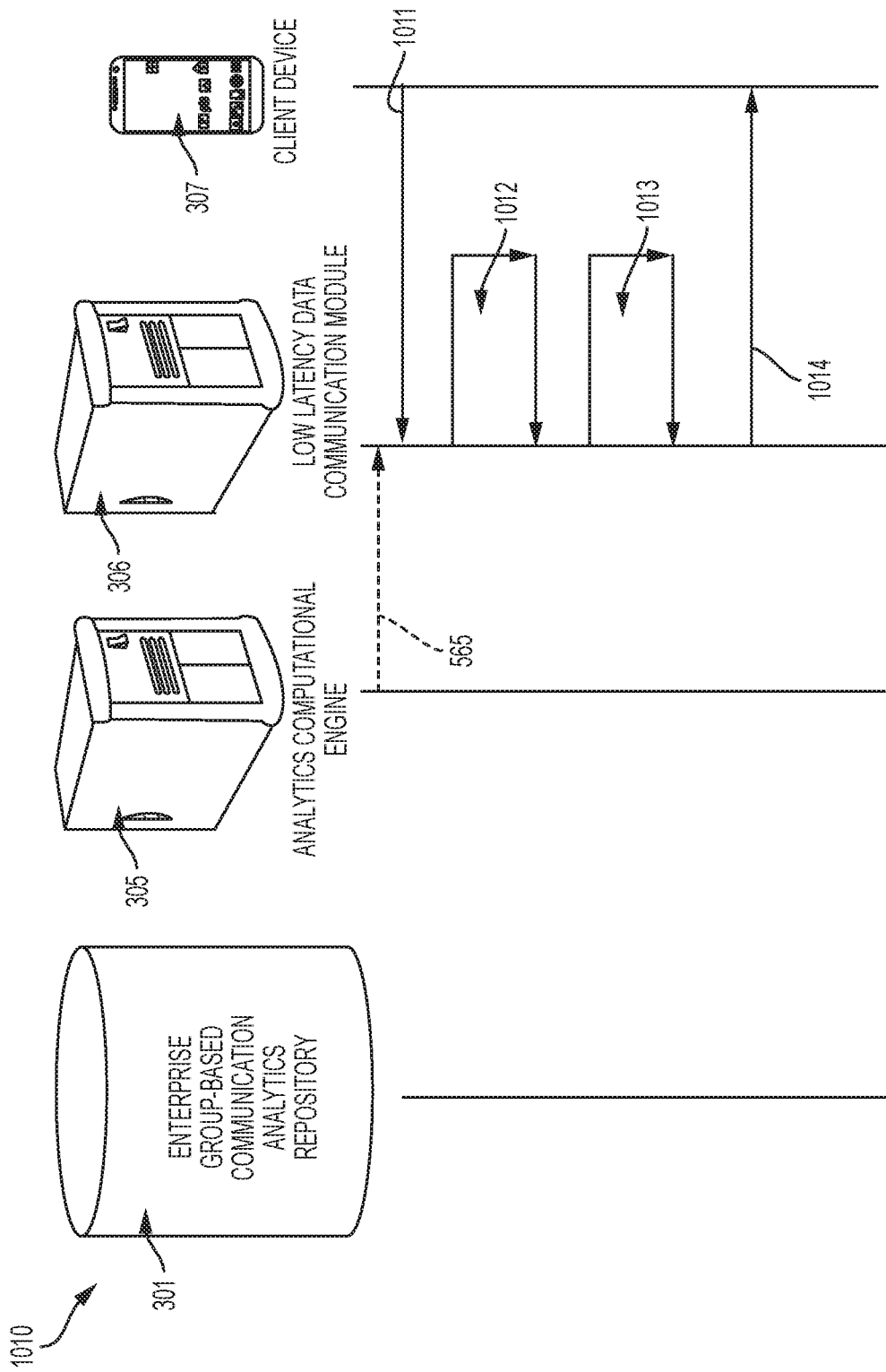
Figure 11:
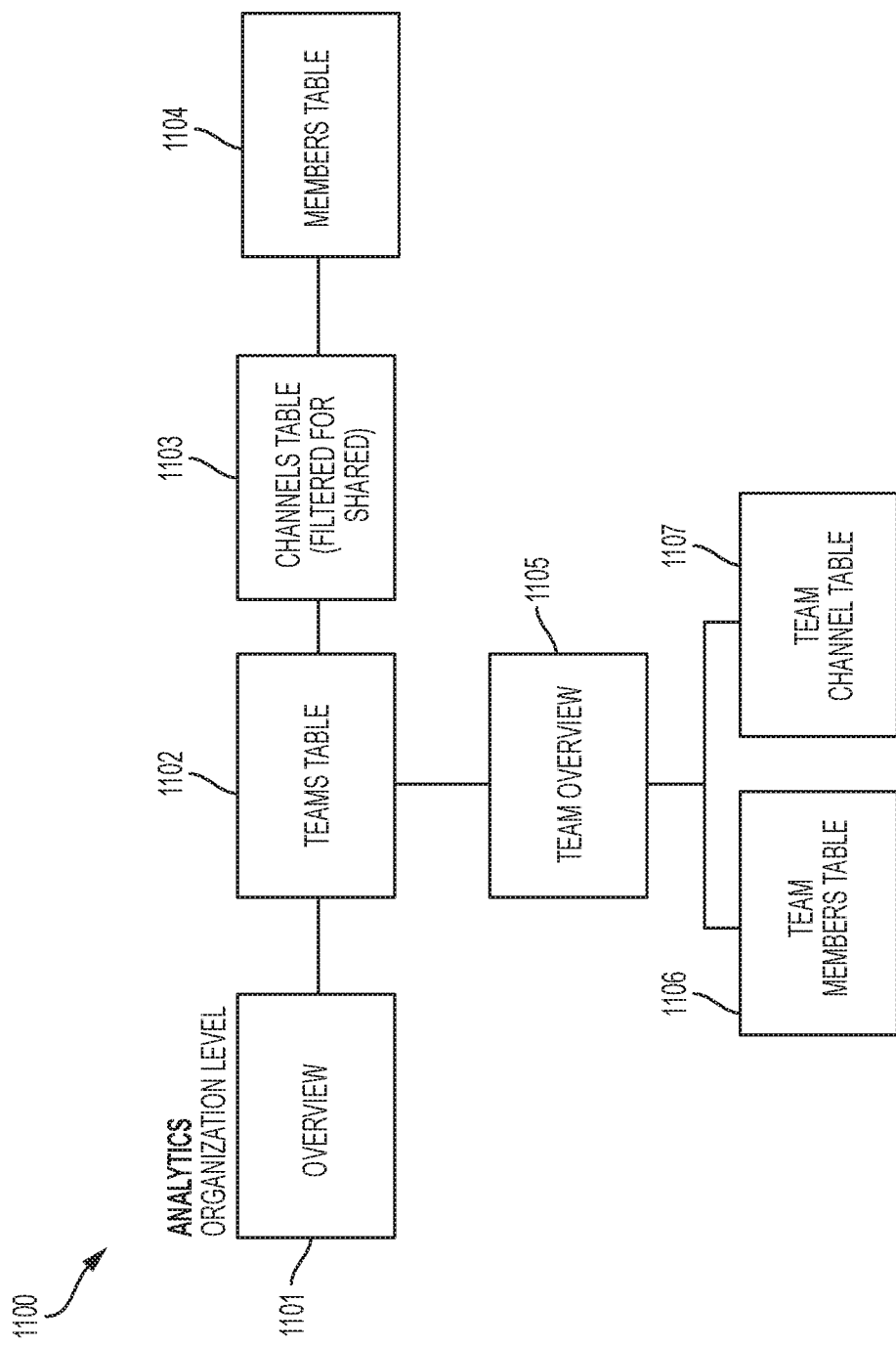

Having thus described the disclosure in general terms, reference will now be made to the accompanying drawings, which are not necessarily drawn to scale, and wherein:

FIG. 1 is a system architecture diagram of a group-based communication system configured to practice embodiments of the present disclosure;

FIG. 2 is an exemplary schematic diagram of a computing entity according to one embodiment of the present disclosure;

FIG. 3 illustrates an exemplary enterprise group-based communication analytics system for use with embodiments of the present disclosure;

FIGS. 4A and 4B illustrate exemplary schemas for use with embodiments of the present disclosure;

FIGS. 5A-1, 5A-2, and 5B illustrate exemplary enterprise analytics processing jobs flows for use with embodiments of the present disclosure;

FIG. 5C illustrates an exemplary enterprise analytics processing job flow for use with embodiments of the present disclosure;

FIG. 5D illustrates an exemplary enterprise interaction data structure computation flow for use with embodiments of the present disclosure;

FIGS. 6A-6F illustrate exemplary enterprise interaction data structure computation flows for use with embodiments of the present disclosure;

FIGS. 7A and 7B illustrate an enterprise analytics publishing flow for use with embodiments of the present disclosure;

FIG. 8 illustrates an enterprise analytics publishing flow for use with embodiments of the present disclosure;

FIGS. 9A-9F illustrate exemplary enterprise analytics serving flows for use with embodiments of the present disclosure;

FIGS. 10A-10B illustrate an exemplary enterprise analytics process for use with embodiments of the present disclosure;

FIGS. 10C-D illustrates an exemplary enterprise analytics process for use with embodiments of the present disclosure;

FIG. 11 illustrates an exemplary organization level enterprise analytics architecture for use with embodiments of the present disclosure; and FIGS. 12-60 illustrate exemplary interfaces for use with embodiments of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to interactive analytics of group-based communication with an enterprise group-based communication system. The enterprise group-based communication system described in this disclosure comprises an enterprise group-based communication server and an enterprise group-based communication repository.

Analyzing the value, both technically and overall within an enterprise, of the deployment of an enterprise group-based communication system requires a tedious and thorough review of each and every electronic interaction occurring between the multiple client devices and an enterprise group-based communication system. Each and every electronic interaction must be recorded and stored in an enterprise group-based communication repository. Computational complexity and confusion is introduced when a computing system attempts to reasonably and correctly attribute the activities of (i.e., electronic interactions performed by) a client device associated with the same user profile to potentially multiple workspace accounts, including DM (i.e., direct messaging) and shared group-based communication channel activities, without double counting. The volume and ever changing nature of such enterprise interaction data leads to this computational complexity and introduces unacceptable latency when looking to analyze the use of an enterprise group-based communication system.

The inventors have identified that the system resources and time allocated to such analyses within the context of an enterprise group-based communication system are easily exhausted and compromised as a result of the complex design and storage needs of an enterprise group-based communication system.

Interactive analytics according to embodiments of the present disclosure enable automated and low latency analysis of deployment of enterprise group-based communication systems. Such automated and low latency analyses enable improvement of the enterprise group-based communication systems on all fronts.

Analysis of a deployment of an enterprise group-based communication system may provide answers to the following questions, among others:

How much (e.g., volume, breadth, consistency, how often) electronic interaction is taking place between client devices within the enterprise and the enterprise group-based communication system?

How much of the electronic interactions taking place between client devices within the enterprise engaging with computing features provided by the enterprise group-based communication system?

Is the enterprise group-based communication system facilitating electronic communication transparency and electronic information sharing among those client devices within the enterprise?

Are there particular groups of client devices within the enterprise that are interacting more (e.g., have higher/lower engagement) with the enterprise group-based communication system? How can those particular groups be identified through the use of enterprise interaction data?

What are the most (and least) used shared enterprise group-based communication channels, and teams within the enterprise group-based communication system (i.e., by client devices within the enterprise)?

Can the enterprise interaction data illustrate whether or not educational initiatives regarding how client devices can interact with the enterprise group-based communication system working? Where is additional training needed?

Embodiments of the present disclosure also provide a flexible design system for data visualization. In embodiments, a legible and highly customizable system is enabled for representing the complex amount of information necessary to make assessments as described herein.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel. It will be appreciated that the term "enterprise group-based communication channel" is a group-based communication channel associated with a particular enterprise identifier.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with enterprise group-based communication channels that the user has been granted access to, one or more group identifiers for groups with which the user is associated, an indication as to whether the user is an owner of any enterprise group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within an enterprise group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the enterprise group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Enterprise group-based communication system users are organized into organization groups (e.g., employees of each company may be a separate organization group) and each organization group may have one or more enterprise group-based communication channels (explained below) to which users may be assigned or which the users may join (e.g., enterprise group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Enterprise group-based communication system users may join enterprise group-based communication channels. Some enterprise group-based communication channels may be globally accessible to those users having a particular organizational group identifier associated with their user profile (i.e., users who are members of the organization). Access to some enterprise group-based communication channels may be restricted to members of specified groups, whereby the enterprise group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the enterprise group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "public group-based communication channel" refers to a group-based communication channel without restricted access, such that is it generally accessible and/or searchable by other members of the enterprise group-based communication system.

The term "enterprise group-based communication system" refers to a networked electronic communications environment comprising an enterprise group-based communication repository and an enterprise group-based communication server that is configured to enable group-based collaborative communication between members of an enterprise. In some embodiments, the enterprise group-based communication system may be operated and instituted by a third-party. The enterprise group-based communication system has increased requirement for availability, scalability, performance, compatibility and security over non-enterprise networks (e.g., a home internet network) and may span multiple enterprises and allow cross collaboration between not only members of different groups within an enterprise or organization, but also collaboration between members and teams of multiple organizations or enterprises.

The term "enterprise" should be understood to refer to a company, organization and the like. These terms are used interchangeably throughout the disclosure. It will be appreciated that an "enterprise" or "organization" may be associated with an enterprise identifier or an organization identifier, respectively.

The term "channel creation request" refers to one or more items of data by which a user of an enterprise group-based communication system may request to create a group-based communication channel. The channel creation request may originate from a user's client device. The channel creation request comprises desired channel settings as well as an originator identifier.

The term "channel access request" refers to one or more items of data by which a client device of an enterprise group-based communication system may request access to a group-based communication channel via the group-based communication server. The channel access request comprises a group-based communication channel identifier. In some embodiments, the channel access request may further comprise a global identifier associated with the requesting client device, a user identifier associated with the requesting client device, and/or a group identifier associated with the requesting client device.

The term "invitation to join" refers to one or more items of data by which a client device of an enterprise group-based communication system may provide access (e.g., by sending a group identifier or group-based communication channel identifier) to a group-based communication channel or a group. The invitation to join may comprise a group-based communication channel identifier, a group identifier, a recipient's global identifier and/or a recipient's user identifier.

The term "originator identification" or "originator identifier" refers to one or more items of data by which the originator of a channel creation request or a channel access request may be identified. The originator identification may be an email address, user identifier, global identifier, an IP address, or any other type of information that can identify a requesting entity. In some embodiments the originator identification may include a group identifier, which may uniquely identify a group associated with the originator of the channel creation request or channel access request.

The term "user identification" or "user identifier" refers to one or more items data by which a user of a client device may be uniquely identified. In some embodiments, the user identification may be an email address, a unique identification string, an employee number, a social security number, a driver's license number, and the like.

The term "channel settings" refers to various defined or definable parameters of a group-based communication channel. The channel settings may comprise a channel type, a channel name string, and a channel purpose string.

A channel type refers to an indicator that informs a group-based communication server that the group-based communication channel is either public or private.

A channel name string refers to a data structure containing a string of alphanumerical characters for identifying a channel in non-technical terms.

A channel purpose string refers to a data structure containing a string of alphanumerical characters that indicates to a group-based communication server and/or a user a purpose of the group-based communications channel. In some examples, a channel purpose string may contain a channel purpose such as "to work on project Nucleus."

Channel settings may also include a message retention window that indicates a period of network time during which messages associated with a group-based communication channel are retained within an enterprise group-based communication repository. Upon expiration of the period of network time (i.e., the message retention window), a message or file associated with the message retention window may be deleted from an enterprise group-based communication repository.

Channel settings may also include one or more of a group capacity and a user capacity that, when applicable, indicates the number of groups (or users) authorized to access the particular group-based communication channel; and, when applicable one or more group identifier values that indicate the group identifier(s) of one or more groups authorized to access the group-based communication channel. In some embodiments, if a user associated with a client device attempts to access a group-based communication channel and the user capacity has been reached, the client device may not be permitted to access the group-based communication channel.

Channel settings may also include one or more authorized third party resource identifiers that indicate to an enterprise group-based communication server which third party resources are authorized to be downloaded and/or otherwise accessed within the group-based communication channel. In embodiments, if a third party resource attempts to access a group-based communication channel and the third party resource is not associated with an authorized third party resource identifier, the third party resource may not be granted access to the group-based communication channel.

The term "third party resource" refers to a third party application that may be integrated in a group-based communication channel within an enterprise group-based communication system and may be accessed by a client device accessing the group-based communication channel. For example, a third party resource may be a Software as a Service (SaaS) product or an Application (App) product that is provided by a third party resource provider and integrated in an enterprise group-based communication system. In such an example, a client device accessing the enterprise group-based communication system may access the SaaS or App product via a group-based communication channel that a user of the client device is associated with.

The terms "group administrator," "group admin" "team administrator," "team admin," "enterprise administrator," or "organization administrator" refer to credentials or identifiers associated with user profile that indicate to an enterprise group-based communication server that a client device associated with the user profile may edit access control parameters (e.g. channel settings) of respective groups and enterprise group-based communication channels having identifiers associated with the user profile. In some embodiments, group administrators transmit channel creation requests to the enterprise group-based communication server to create enterprise group-based communication channels for a particular group. Users identified as group administrators may edit the access control rights to a group or group-based communication channel which the group is a part of. Group administrators may also add users to the group or group-based communication channel which the group is a part of or to invite users to a group or group-based communication channel which the group is a part of. The access control parameters editable by the group administrator may be limited by the settings set by a super administrator.

The term "super administrator" refers to an identifier associated with a user profile that indicates to an enterprise group-based communication server that a client device associated with the user profile may control, access, and modify any group-based communication channel (including private enterprise group-based communication channels) and modify enterprise settings. The super administrator may also assign group administrator rights to members of the organization. The super administrator may delegate rights to administrators and/or users. The super administrator may also be referred to as an organization owner.

The term "enterprise settings" refers to organizationally defined network parameters, protocols, keys, limits, and policies that enable or confirm specified availability, scalability, performance, compatibility and security levels for an enterprise group-based communication system. The enterprise settings authorize (whitelist) or deauthorize (or blacklist) groups to set group specific settings. The enterprise settings authorize (whitelist) or deauthorize (or blacklist) users to perform various actions within the enterprise group-based communication system. Enterprise settings span channel creation, messaging and file usage, invitations, emoji creation, app installs, user profiles and access modes. The enterprise settings regulate all enterprise group-based communication channels and all enterprise group-based communication channels for the respective organization must comply with the enterprise settings.

The term "group storage location" refers one or more storage locations in the enterprise group-based communication repository for storing messages that are a part of private-enterprise group-based communication channels. Each private group-based communication channel may have its own group storage location. Location within the definition of group storage location may refer to a physical location in memory where data is stored (e.g., a range of memory addresses) or to part of memory with distinct access control parameters. Access to the group storage location may be controlled by group identifiers. In one embodiment, the group storage location is nested inside of the enterprise storage location. For example, for a channel access request to the group storage location for the private-group-based communication channel entitled "Development Team only", a group-based communication must receive (e.g., by querying the enterprise group-based communication repository) one or more group identifier(s) associated with the client device which generated the channel access request. Once the group-based communication has the group identifier(s), a comparison is performed to determine if there exists (for the user) a group identifier for the development team. If so, the user is allowed access to the "Development Team only" channel.

The term "global identifier" refers to one or more items of data by which a user or user's client device may be uniquely identified across the organization and the enterprise group-based communication system. In embodiments where the enterprise group-based communication system spans multiple organizations the global identifier is unique across multiple organizations. The global identifier is a 64 bit unsigned integer that uniquely identifies a user.

The term "open team" group type refers to access control parameters that indicate to an enterprise group-based communication server that a client device may request a group identifier for that group to be stored in a user record. For example, if the "fun" group is an open team group type then a user may request the group identifier (for storage in his user record) of the "fun" group and the enterprise group-based communication server will store in the user's record the group identifier for the fun team.

The term "request to join a team" group type refers to access control parameters indicate to an enterprise group-based communication server that the group identifier for that group may only be obtained via a request to a group admin. For example, if the "fun" group is a request to join a team group type then when a user sends, to the group-based communication server, a request for the group identifier (for storage in his user record) the enterprise group-based communication server will deny the request and send a message to a client device of a group administrator. The group administrator after receiving this message from the enterprise group-based communication server may send the user an invitation to join the group (which includes the group identifier). Thus, unlike an open team group type the enterprise group-based communication server does not automatically grant the group identifier for the group. Instead the user must receive an invitation request for the group to obtain the group identifier for his user record.

The term "private team" group type refers to access control parameters that indicate to an enterprise group-based communication server that the group identifier for that group may only be obtained via an invitation to join. For example, if the "fun" group is a private team group type then when a user send a request for the group identifier (for storage in his use record) to an enterprise group-based communication server, the enterprise group-based communication server will block the request and not forward a message to a group administrator. In some embodiments, a private team group type will be considered not joinable, because access is only granted via invitation from the group administrator or super administrator.

The term "third party resource identifier" refers to one or more items of data that uniquely identify, to an enterprise group-based communications server, a third party resource.

The term "third party resource access request" refers to one or more items of data by which a client device may request a function from one or more installed third party resources or applications in a group-based communication channel. The third party resource access request may include a global identifier/user identifier and a third party resource identifier. The terms "third party resource" and "application" or "app" may be used interchangeably on occasion.

The term "members of the organization", "users of the organization," "members of the enterprise," or "users of the enterprise," and other like phrases refer to users of the enterprise group-based communication system that have global identifiers and/or user identifiers in their user profile.

The term "enterprise interaction data" refers to signals associated with interaction by client devices with an enterprise group-based communication system. In embodiments, enterprise interaction data can be any of user account creations, direct message transmissions, enterprise group-based communication channels created, enterprise group-based communication channels joined, messages read, messages written, feature uses, emoji uses, cursor mark movements, files uploaded, files downloaded, group-based communication channel deletions, user account deletions, calls placed, teams joined, and teams created.

The term "interaction" refers to an identifiable, non-transitory occurrence that has technical significance for system hardware and/or software. For example, in a group-based communication channel, a message sent by a client device is an interaction. An interaction may be user-generated, such as keystrokes or mouse movements, or system-generated, such as program loading and errors.

The term "processed enterprise interaction data" refers to enterprise interaction data from which metadata has been extracted such that an enterprise interaction may be associated with other enterprise interaction data of the enterprise group-based communication system. Enterprise interaction data is considered unprocessed before having been processed for such metadata extraction and interaction associations. Examples of metadata extraction and interaction associations for use with embodiments of the present disclosure are disclosed in U.S. patent application Ser. No. 15/604,584, titled "MESSAGING SEARCH AND MANAGEMENT APPARATUSES, METHODS AND SYSTEMS," filed May 24, 2017, U.S. patent application Ser. No. 15/604,589, titled "MESSAGING SEARCH AND MANAGEMENT APPARATUSES, METHODS AND SYSTEMS," filed May 24, 2017, and U.S. patent application Ser. No. 15/651,887, titled "MESSAGING SEARCH AND MANAGEMENT APPARATUSES, METHODS AND SYSTEMS," filed Jul. 17, 2017, the contents of which are incorporated herein by reference in their entirety.

The term "computational pipeline" refers to a set of data processing elements connected in series, where the output of one element is the input of the next one. In examples, the elements of a pipeline are executed in parallel or in time-sliced fashion; in that case, some amount of buffer storage is often inserted between elements.

The term "enterprise analytics processing job" refers to statistical processing and/or aggregation of structured enterprise interaction data. In embodiments, a plurality of enterprise analytics processing jobs must complete in a particular order before any enterprise analytics requests may be fulfilled by an enterprise group-based communication analytics system. In embodiments, enterprise analytics processing jobs include machine learning algorithms.

The term "dependency" refers to a reliance by a particular analytics processing job on another analytics processing job. For example, as used herein, a dependency exists between a first analytics processing job and a second analytics processing job when the second analytics processing job relies upon output from the first analytics processing job. In such an example, the first analytics processing job must complete before the second analytics processing job can begin.

The term "enterprise interaction data source" refers to a source of data from which enterprise interaction data is received. Examples of enterprise interaction data sources include servers, backup databases, and the like. The data from enterprise interaction data sources may be structured (conforming to a defined schema) or unstructured (not conforming to a defined schema). When the enterprise interaction data is not formatted according to a defined schema, various tools can be used to apply the defined schema to the data. Examples of such structuring tools include Spark® and Hive®.

The term "data retrieval engine" refers to a service or module that performs retrieval of enterprise interaction data, in an unstructured or structured format, from one or more enterprise interaction data sources and then persists the enterprise interaction data to an enterprise group-based communication analytics repository. Examples of data retrieval engines include database extraction tools, Kafka® and Secor®. Kafka® and Secor® are stateless tools. Kafka® is a distributed queue such that data is retrieved by or sent to the Kafka® engine and then read from the Kafka® engine by other tools. In examples, Kafka® aids in transporting data from enterprise interaction data sources to the enterprise group-based communication analytics repository. Secor® is an example of a tool that reads data from Kafka® and writes the data to files in the enterprise group-based communication analytics repository.

The term "ephemeral cluster" refers to a temporary cluster of data created from structured enterprise interaction data. For example, ephemeral clusters may be started so that a MapReduce infrastructure or other execution engines may be used to process enterprise analytics processing jobs. Examples of a MapReduce service or infrastructure include Elastic MapReduce (EMR) by Amazon®. In embodiments, EMR clusters are ephemeral in that data only persists within them temporarily in order to decouple where processing of data occurs with where the data is stored. EMR clusters may perform enterprise analytics processing jobs. MapReduce is a programming model and an associated implementation for processing and generating big data sets with a parallel, distributed algorithm on a cluster. In embodiments, a MapReduce program is composed of a Map( ) procedure (method) that performs filtering and sorting (such as sorting students by first name into queues, one queue for each name) and a Reduce( ) method that performs a summary operation (such as counting the number of students in each queue, yielding name frequencies).

The term "query engine" refers to a service or module that performs retrieval and processing of structured data from the enterprise group-based communication repository. In embodiments, a query engine may comprise a distributed SQL query engine optimized for interactive queries. In such an example, the query engine enables answers to ad-hoc questions with minimal turnaround time, as well as data assumption validations, smaller dataset exploration, and visualization creation. Examples of such a query engine is Presto®.

In some embodiments, a query engine may comprise a distributed dataset manager for dealing with larger datasets or longer time series enterprise interaction data. A distributed dataset manager may implicitly convert SQL-like queries into MapReduce jobs. Examples of such a query engine include Hive®.

In some embodiments, a query engine may comprise a data processing framework for writing batch and aggregation jobs. The data processing framework enables more efficient and robust batch and aggregation jobs because it can interpret a more expressive language, instead of SQL-like queries. Such a data processing framework may enable caching data in memory to make computations more efficient. Examples of such a query engine include Spark®.

The term "schema" refers to the organization of data as a blueprint of how the data is stored in an enterprise group-based communication analytics repository. In embodiments, to enable the use of multiple independent query engines for enterprise analytics processing jobs, the enterprise interaction data must be structured according to the same schema before being stored in the enterprise group-based communication analytics repository. In embodiments, the structured enterprise interaction data may be stored in columnar format. In some embodiments, a metastore may be used to provide the true schema required by the enterprise group-based communication analytics system. The metastore is desirable because of processing of data in multiple locations. In embodiments, the schema may be defined using Thrift®, which enables enforcement of a typed schema for the structured data. Files can be stored using Parquet® which formats and stores the data in a columnar format. Examples of a metastore include the Metastore provided by Hive®

The terms "structured data" and "structured enterprise interaction data" refer to enterprise interaction data that has been formatted according to a defined schema. The term "unstructured data" refers to enterprise interaction data that has not been formatted according to the defined schema, or has not been confirmed as being formatted according to the defined schema.

The term "analytics computational engine" refers to a computing engine for generating data structures for use by embodiments of the present disclosure. For example, an analytics computational module may retrieve processed structured data from an enterprise group-based communication analytics repository on a periodic basis (e.g., daily) to produce data structures for use by a computed data service to deliver enterprise analytics analyses for rendering on a user interface displayed on a client device.

The term "enterprise interaction data structure" refers to a data structure computed using processed enterprise interaction data. For example, an enterprise interaction data structure can be generated using data representative of aggregated enterprise interaction data for one of all user profiles of an enterprise group-based communication system, a single user profile of an enterprise group-based communication system, all enterprise group-based communication channels of an enterprise group-based communication system, a single enterprise group-based communication channel of an enterprise group-based communication system, all workspaces of an enterprise group-based communication system, a single workspaces of an enterprise group-based communication system, or an entire enterprise group-based communication system. It will be appreciated that the nature of the enterprise interaction data structures is apparent from the description of the computations and tables presented herein, and that any enterprise interaction data structure computed according to computations and tables presented herein is within the scope of the present disclosure.

The terms "computed data service," "low latency data communication module" and "low latency data communications module" refer to a computing system that receives and processes enterprise analytics requests from client devices, delivering the enterprise analytics analyses back to the client devices with low latency as compared to the use of a larger combination of repositories and servers. The computed data service or low latency data communications module serves as an interface between a client device (e.g., the user interface displaying enterprise analytics analyses) and an enterprise group communication analytics repository and/or analytics computational engine. The computed data service or low latency data communications module may comprise a storage mechanism for storage of pre-computed enterprise interaction data structures (e.g., computed by an analytics computational module) for use in enterprise analytics analyses.

The terms "analytics serving module" and "analytics serving user interface" refer to an interface by which analytics requests may be initiated by client devices, and by which enterprise analytics analyses may be delivered to and displayed on client devices.

The terms "enterprise analytics request" and "requested subset" refers to an instruction or direction initiated by a computing device, usually a client device, for enterprise analytics analyses related to interactions between client devices and an enterprise group-based communication system.

The term "interactive analytics" refers to the nature of a display of analytics related to electronic interactions within an enterprise group-based communication system. The analytics are considered interactive in that the retrieved analytics and associated interfaces are customizable by a requesting client device.

The terms "enterprise analytics metric level" or "metric type" refer to a level of enterprise interaction data targeted by a query (i.e., enterprise analytics request). In embodiments, an enterprise analytics metric level is one of enterprise, team, group, channel, user, third party resource, feature, and workspace The term "enterprise analytics visualization type" refers to a selection of how an enterprise analytics analysis in response to an enterprise analytics request shall be formatted for display on a client device. In embodiments, an enterprise analytics visualization type can be any of a line graph, a pie chart, a chart, a table, a word cloud, a graphic, a network graph, and a graph.

The term "enterprise analytics metrics" refer to metrics by which a client device wishes to analyze interaction data within an enterprise group-based communication system.

The term "enterprise analytics analysis" refers to an analysis completed on an enterprise interaction data structure that is configured for display at a client device according to an enterprise analytics visualization type. For example, an enterprise analytics analysis may comprise instructions that, when executed on the client device, cause the display of an analysis associated with an enterprise interaction data structure according to how the client device requested that the analysis be formatted and retrieved.

The term "enterprise analytics analysis modify request" refers to an instruction or direction initiated by a computing device, usually a client device, for modification of any parameter of a previously received enterprise analytics analysis request.

The term "revised" refers to electronic modification.

The term "analysis identifier" refers to one or more items of data that uniquely identify, to an enterprise group-based communications server, a previously performed enterprise analytics analysis.

The term "persist" refers to storing data in computer data storage.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access an enterprise group-based communication system 105 via a communications network 104 using client devices 101A-101N. The enterprise group-based communication system 105 may comprise an enterprise group-based communication server 106 in communication with at least one enterprise group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the enterprise group-based communication system. In some embodiments, the protocol is a custom protocol of JSON objects sent via a Websocket channel. In some embodiments, the protocol is JSON over RPC, JSON over REST/HTTP, and the like.

The enterprise group-based communication server 106 may be embodied as a computer or computers as known in the art. The enterprise group-based communication server 106 may provide for receiving of electronic data from various sources, including but not necessarily limited to the client devices 101A-101N. For example, the enterprise group-based communication server 106 may be operable to receive and post or transmit group-based messaging communications provided by the client devices 101A-101N.

The enterprise group-based communication repository 107 may be embodied as a data storage device such as a Network Attached Storage (NAS) device or devices, or as a separate database server or servers. The enterprise group-based communication repository 107 includes information accessed and stored by the enterprise group-based communication server 106 to facilitate the operations of the enterprise group-based communication system 105. For example, the enterprise group-based communication repository 107 may include, without limitation, a plurality of messaging communications organized among a plurality of enterprise group-based communication channels, and/or the like.

The client devices 101A-101N may be any computing device as defined above. Electronic data received by the enterprise group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the enterprise group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the enterprise group-based communication system 105 via a web browser. As yet another example, the client device 101A-101N may include various hardware or firmware designed to interface with the enterprise group-based communication system 105.

In some embodiments of an exemplary enterprise group-based communication system 105, a message or messaging communication may be sent from a client device 101A-101N to an enterprise group-based communication system 105. In various implementations, the message may be sent to the enterprise group-based communication system 105 over communications network 104 directly by a client device 101A-101N, the message may be sent to the enterprise group-based communication system 105 via an intermediary such as a message server, and/or the like. For example, the client device 101A-101N may be a desktop, a laptop, a tablet, a smartphone, and/or the like that is executing a client application (e.g., an enterprise group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
      <user_account_credentials>
        <user_name>ID_user_1</user_name>
        <password>abc123</password>
        //OPTIONAL <cookie>cookieID</cookie>
        //OPTIONAL <digital_cert_link>www.mydigitalcertificate.com/
JohnDoeDaDoeDoe@gmail.com/mycertifcate.dc</digital_cert_link>
        //OPTIONAL <digital_certificate>_DATA_</digital_certificate>
      </user_account_credentials>
    </user_accounts_details>
    <client_details>//iOS Client with App and Webkit
        //it should be noted that although several client details
        //sections are provided to show example variants of client
        //sources, further messages will include only on to save
        //space
      <client_IP>10.0.0.123</client_IP>
      <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1XXXX</client_serial_number>
        <client_UDID>3XXXXXXXXXXXXXXXXXXXXXXXXD</client_UDID>
        <client_OS>iOS</client_OS>
        <client_OS_version >7.1.1 </client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
      <client_IP>10.0.0.123</client_IP>
      <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_ UDID>
        <client_OS>iOS</client_OS>
        <client_OS_version >7.1.1 </client_OS_version>
        <client_app_type>web browser</client_app_type>
        <client_name>Mobile Safari</client_name>
        <client_version>9537.53</client_version>
    </client_details>
    <client_details> //Android Client with Webbrowser
      <client_IP>10.0.0.123</client_IP>
      <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ </client serial number>
        <client_UDID>FXXXXXXXXX-XXXX-XXXX-XXXX-XXXX
XXXXXXXXXXXXX </client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
      <client_IP>10.0.0.123</client_IP>
      <user_agent_string>Mozilla/5.0 (Macintosh; Intel Mac OS X 10_9_3)
```

```
AppleWebKit/537.75.14 (KHTML, like Gecko) Version/7.0.3 Safari/537.75.14</user_agent_string>
    <client_product_type>MacPro5,1</client_product_type>
    <client_serial_number>YXXXXXXXXZ</client serial number>
    <client_UDID>FXXXXXXXXX-XXXX-XXXX-XXXX-
XXXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <message>
    <message_identifier>ID_message_10</message_identifier>
    <team_identifier>ID_team_1</team_identifier>
    <channel_identifier>ID_channel_1</channel_identifier>
    <contents>That is an interesting invention. I have attached a copy our patent
policy.</contents>
    <attachments>patent_policy.pdf</attachments>
  </message>
</auth_request>
```

The enterprise group-based communication system 105 comprises at least one enterprise group-based communication server 106 that may create a storage message based upon the received message to facilitate message indexing and storage in an enterprise group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST/storage_message.php HTTP/1.1
Host: www.server.com
Content-Type: Application/XML
Content-Length: 667
<?XML version = "1.0" encoding ="UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
       <topic>inventions</topic>
       <topic>patents</topic>
       <topic>policies</topic>
    </topics>
    <responses>
       <response>liked by ID_user_2</response>
       <response>starred by ID_user_3</response>
    </responses>
    <contents>That is an interesting invention. I have attached a copy our patent policy.</contents>
    <attachments>patent_policy.pdf</attachments>
    <conversation_primitive>
       conversation includes messages: ID_message_8, ID_message_9, ID_message_10,
       ID_message_11, ID_message_12
    </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the enterprise group-based communication channel in response to the message), downloading a file associated with the message, sharing the message from one enterprise group-based communication channel to another enterprise group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the enterprise group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from enterprise group-based communication repository 107). In one implementation, a storage message may be sent from enterprise group-based communication server 106 to facilitate indexing in enterprise group-based communication repository 107. In another implementation, metadata associated with the message may be determined and the message may be indexed in enterprise group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in enterprise group-based communication repository 107 to facilitate searching. In one embodiment, the files may be indexed such that a company's or a group's files are indexed at a separate distributed repository.

Examples of messaging search and management apparatuses and methods for use with embodiments of the present disclosure are disclosed in U.S. patent application Ser. No. 15/604,584, titled "MESSAGING SEARCH AND MANAGEMENT APPARATUSES, METHODS AND SYSTEMS," filed May 24, 2017, U.S. patent application Ser. No. 15/604,589, titled "MESSAGING SEARCH AND MANAGEMENT APPARATUSES, METHODS AND SYSTEMS," filed May 24, 2017, and U.S. patent application Ser. No. 15/651,887, titled "MESSAGING SEARCH AND MANAGEMENT APPARATUSES, METHODS AND SYSTEMS," filed Jul. 17, 2017, the contents of which are incorporated herein by reference in their entirety.

Example Apparatus for Implementing Embodiments of the Present Disclosure

The enterprise group-based communication server 106 may be embodied by one or more computing systems, such as apparatus 200 shown in FIG. 2. The apparatus 200 may include a processor 202, a memory 201, input/output circuitry 203, communications circuitry 205, enterprise group-based communication repository 107 and enterprise group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or coprocessor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The enterprise group-based communication circuitry 204 includes hardware configured to support an enterprise group-based communication system. The enterprise group-based communication circuitry 204 may utilize processing circuitry, such as the processor 202, to perform these actions. The enterprise group-based communication circuitry 204 may send and/or receive data from enterprise group-based communication repository 107. In some implementations, the sent and/or received data may be of enterprise-based digital content objects organized among a plurality of enterprise group-based communication channels. It should also be appreciated that, in some embodiments, the enterprise group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Interactive Analytics within an Enterprise Group-Based Communication System In embodiments of the present disclosure, a plurality of query engines have access to an enterprise group-based communication analytics repository such that each query engine may retrieve unprocessed enterprise interaction data from the enterprise group-based communication analytics repository as well as write processed enterprise interaction data to the enterprise group-based communication analytics repository.

Retrieval, Management, and Storage of Enterprise Interaction Data

FIG. 3 illustrates an exemplary enterprise group-based communication analytics system 300 for use with embodiments of the present disclosure. In embodiments, an enterprise group-based communication analytics repository 301 is in communication, via a communications network (not shown), with an enterprise group-based communication analytics server 302. While not shown directly in FIG. 3, the functions performed by other components within FIG. 3 may be performed by or within an enterprise group-based communication analytics server 302.

In FIG. 3, the enterprise group-based communication analytics repository 301 is in communication, via a communications network (not shown), with a plurality of data retrieval engines 302A-302B.

In embodiments, the plurality of data retrieval engines 302A-302B retrieve unprocessed enterprise interaction data from one or more enterprise interaction data sources 303A, 303B, 303C. Data retrieval engines 302A-302B retrieve unprocessed enterprise interaction data from enterprise interaction data sources 303A-303C and transmit the unprocessed enterprise interaction data for storage in enterprise group-based communication analytics repository 301 and ultimately further processing.

In some embodiments, a first data retrieval engine 302A comprises a scalable, append-only message log that utilizes a service for persisting a message log on to the enterprise group-based communication analytics repository 301. In some embodiments, a second data retrieval engine 302B comprises a database extraction (i.e., scraping) tool that extracts database backup data and exports it as a table of unprocessed enterprise interaction data to the enterprise group-based communication analytics repository 301. In some embodiments, the first data retrieval engine 302A extracts unprocessed enterprise interaction data from data source 303A and data source 303B, while the second data retrieval engine 302B extracts unprocessed enterprise interaction data from data source 303C. Examples of a first and second data retrieval engine 302A, 302B include Kafka® and Secor®.

In embodiments, the enterprise group-based communication analytics system 300 may include a variety of modules to analyze messages received by an enterprise group-based communication system (e.g., depicted in FIG. 1). Such modules may include a metadata determining process (e.g., to determine and/or facilitate indexing of message contents and/or metadata), a message aggregating process (e.g., to collect and/or forward messages for further analysis), a ranking process (e.g., to facilitate ranking for a variety of applications), and/or the like. The enterprise group-based communication analytics system 300 may facilitate indexing message contents and/or metadata (e.g., team, channel, user, topics, responses, files, third party metadata).

In embodiments, the enterprise group-based communication analytics system 300 may include a variety of modules to analyze the unprocessed enterprise interaction data. In one implementation, such modules may include a work graph generating process (e.g., to generate work graphs (e.g., machine learning structured input data such as a channel's priority for a user)), a machine learning process (e.g., to generate other machine learning structure input data (e.g., team-level term priority), to generate machine learning structures (e.g., team-level neural networks)), and/or the like. For example, the enterprise group-based communication analytics system 300 may utilize tools such as Apache Hive®, Presto®, Apache Spark®, and/or the like to facilitate analyzing the unstructured or structured data.

In some embodiments, ephemeral clusters are created from the unprocessed enterprise interaction data stored in the enterprise group-based communication analytics repository 301. For example, ephemeral clusters may be started so that a MapReduce infrastructure or other execution engines may be used to process the unprocessed enterprise interaction data. Examples of a MapReduce service or infrastructure include Elastic MapReduce (EMR) by Amazon®. In embodiments, EMR clusters are ephemeral in that data only persists within them temporarily in order to decouple where processing of data occurs with where the data is stored. EMR clusters may perform enterprise analytics processing jobs.

In embodiments, a plurality of query engines 304A, 304B, 304C can retrieve unprocessed enterprise interaction data from the enterprise group-based communication repository 301 as well as write processed enterprise interaction data to the enterprise group-based communication repository 301.

In some embodiments, a first query engine 304A comprises a distributed SQL query engine optimized for interactive queries. First query engine 304A enables answers to ad-hoc questions with minimal turnaround time, as well as data assumption validations, smaller dataset exploration, and visualization creation. Examples of a first query engine 304A include Presto®.

In some embodiments, a second query engine 304B comprises a distributed dataset manager for dealing with larger datasets or longer time series enterprise interaction data. A distributed dataset manager may implicitly convert SQL-like queries into MapReduce jobs. Examples of a second query engine 304B include Hive®.

In some embodiments, a third query engine 304C comprises a data processing framework for writing batch and aggregation jobs. The data processing framework enables more efficient and robust batch and aggregation jobs because it can interpret a more expressive language, instead of SQL-like queries. Such a data processing framework may enable caching data in memory to make computations more efficient. Examples of a third query engine 304C include Spark®.

In some embodiments, an analytics computational engine 305 retrieves processed enterprise interaction data from enterprise group-based communication analytics repository 301 to produce enterprise interaction data structures necessary for enterprise analytics analyses. Upon completion of all enterprise interaction data structures necessary, analytics computational engine 305 provides the enterprise interaction data structures to a low latency data communication module (also referred to herein as a computed data service) 306. The low latency data communication module 306 receives enterprise analytics requests from an analytics serving module or user interface 307 at a client device, processes them, and returns enterprise analytics analyses to the analytics serving module or user interface 307.

FIGS. 4A and 4B illustrate exemplary schema for structuring unstructured enterprise interaction data and for storing the structured data, according to embodiments of the present disclosure. In embodiments, unstructured enterprise interaction data must be structured before being stored in the enterprise group-based communication analytics repository 301. To bind all of the query engines together, the enterprise group-based communication analytics system 300 enforces a typed schema for structured data. The structured data may be stored in columnar format. In some embodiments, a metastore may be used to provide the true schema required by the enterprise group-based communication analytics system. The metastore is desirable because of processing of data in multiple locations.

For example, the structured data may be defined using Thrift®, which enables enforcement of a typed schema for the structured data. Files can be stored using Parquet® which formats and stores the data in a columnar format. In such an example, the plurality of query engines 304A-304C preferably support Parquet which provides many advantages around query and space efficiency. The metastore can be the Metastore provided by Hive®.

In embodiments, the first and second query engines 304A-304B (e.g., Presto, Hive) have connectors that allow them to access the metastore to read tables. In embodiments, the third query engine (e.g., Spark) enables a plurality of processing pipelines that dynamically add partitions and modifies the schema as the structured data evolves.

Computing and Serving Enterprise Group Based Communication System Analytics

FIGS. 5A-1 and 5A-2 illustrate an enterprise interaction analytics scheduling graph, according to embodiments of the present disclosure. Graph 500 illustrates dependencies between sets of analytics processing jobs. As used herein, a dependency exists between a first analytics processing job and a second analytics processing job when the second analytics processing job relies upon output from the first analytics processing job. In such an example, the first analytics processing job must complete before the second analytics processing job can begin.

For example and referring to FIG. 5A, before analytics processing jobs in the box labeled 510 can begin, those analytics processing jobs in the box labeled 505 must complete. Similarly, before the analytics processing jobs in the box labeled 505 can begin, those analytics processing jobs in the box labeled 501 must complete. As such, those analytics processing jobs in the box labeled 501 can be considered dependencies of those analytics processing jobs in the box labeled 505, as the analytics processing jobs in the box labeled 505 are dependent upon them. Similarly, those analytics processing jobs in the box labeled 505 can be considered dependencies those analytics processing jobs in the box labeled 510, as the analytics processing jobs in the box labeled 510 depend on them. Not only are those analytics processing jobs in the box labeled 505 dependencies of those analytics processing jobs in the box labeled 510, but those analytics processing jobs in the box labeled 501 are also dependencies of the analytics processing jobs of the analytics processing jobs in the box labeled 510. Finally, the analytics processing job 515 is dependent upon all of the analytics processing jobs in the boxes labeled 501, 505, and 510. As such, the analytics processing jobs in the boxes labeled 501, 505, and 510 must be completed in that order before the analytics processing job 515 can begin and complete.

In embodiments, processed enterprise analytics data contained within the enterprise group-based communication analytics repository 301 is used for the enterprise analytics processing jobs described herein. It will be appreciated that the enterprise analytics processing jobs are implemented, in embodiments, as a series of pipelines used to compute metrics at different levels (e.g., user, channel, team, enterprise, organization).

In embodiments, once the enterprise analytics processing jobs depicted in FIGS. 5A-1 and 5A-2 are completed (i.e., a series of tables or other enterprise interaction data structures are delivered), a series of polishing jobs may perform additional filtering and prepare the output of the enterprise analytics processing jobs for serving of data with low latency.

FIG. 5B illustrates an exemplary enterprise analytics processing pipeline. It will be appreciated that the arrows represent dependencies between enterprise analytics processing jobs. In embodiments, an activity_stats job 524 must complete before either of the channel_stats job 512 and user_stats job 526 can begin. Carrying on, the channel_stats job 512 must complete before the public_channel_stats job 514 can begin. The user_stats job 516 must complete before the enterprise_user_stats job 520 can begin. The team_stats job 518 is dependent upon the completion of the activity_stats job 524, the channel_stats job 512 (which is dependent upon the completion of activity_stats 524), and the enterprise_user_stats job 520. Finally, the enterprise_stats job 522 is dependent upon the completion of the team_stats job 518 and the activity_stats job 524. In embodiments, each of the enterprise analytics processing jobs described herein is run on a periodic basis (e.g., daily). It will be appreciated that the enterprise analytics processing jobs discussed herein are exemplary, and that other enterprise analytics processing jobs performing in accordance with embodiments herein are within the scope of the present disclosure.

FIG. 5C illustrates an exemplary enterprise analytics computation flow for use with embodiments of the present disclosure. In embodiments, an enterprise analytics computation flow 550 begins with retrieval of processed enterprise interaction data 551 from, for example, an enterprise group-based communication analytics repository. In embodiments, an analytics computational module retrieves the processed enterprise interaction data.

In embodiments, flow 550 continues with identifying dependencies 552 that exist between enterprise analytics processing jobs. In embodiments, identifying dependencies 552 comprises defining a dependency graph. For example, a tool such as Airflow® may be used to define the dependency graph.

In embodiments, flow 550 continues with resolving the dependencies 553. In embodiments, resolving the dependencies 553 is accomplished by arranging an order of the enterprise analytics processing jobs according to the dependencies. In embodiments, the dependency graph aids in assigning specified times or chronology to enterprise analytics processing jobs. In such embodiments, a tool such as Airflow® may mark an enterprise analytics processing job complete so that a subsequent enterprise analytics processing job may begin. It will be appreciated that Airflow® is an example of a dependency identification and resolution tool that may be used with embodiments of the present disclosure. However, it will be appreciated that any dependency identification and resolution tool that performs the necessary functions described herein may be used without departing from the scope of the disclosure.

In embodiments, flow 550 continues with computing enterprise interaction data structures 554 using the analytics processing jobs. Examples of enterprise interaction data structure computations are illustrated in FIG. 5D and FIGS. 6A-6F.

FIG. 5D illustrates an exemplary enterprise interaction data structure computation process for use with embodiments of the present disclosure. In embodiments, process 554 begins with extracting processed enterprise interaction data from an enterprise group-based communication analytics repository 561.

Process 554 continues with generating any data structures 562 necessary for computing the enterprise interaction data structure. Process 554 continues with retrieving relevant existing data structures 563 necessary for computing the enterprise interaction data structure.

It will be appreciated that data structures used in process 554 are selected according to the desired resulting enterprise interaction data structure. For example, if a data structure contains a list of messages transmitted by all users of a group-based communication system/service (represented by user_id) and the desired resulting enterprise interaction data structure should only contain an indication of how many messages were transmitted by those users who are humans and how many messages were transmitted by those users who are bots, the list of messages must be joined with a different data structure that maps user_id to user type.

Process 554 continues with iteratively joining 564 data structures with relevant existing data structures to reduce the processed enterprise interaction data down to what is necessary for the desired enterprise interaction data structure. In embodiments, the reduced structured data is also grouped according to desired parameters (e.g., group-based communication channel identifier, user identifier, and the like). Any unwanted data from the desired enterprise interaction data structure is also filtered out.

Process 554 continues with transferring the finalized enterprise interaction data structures to a low latency data communication module 565.

Figure 6A:
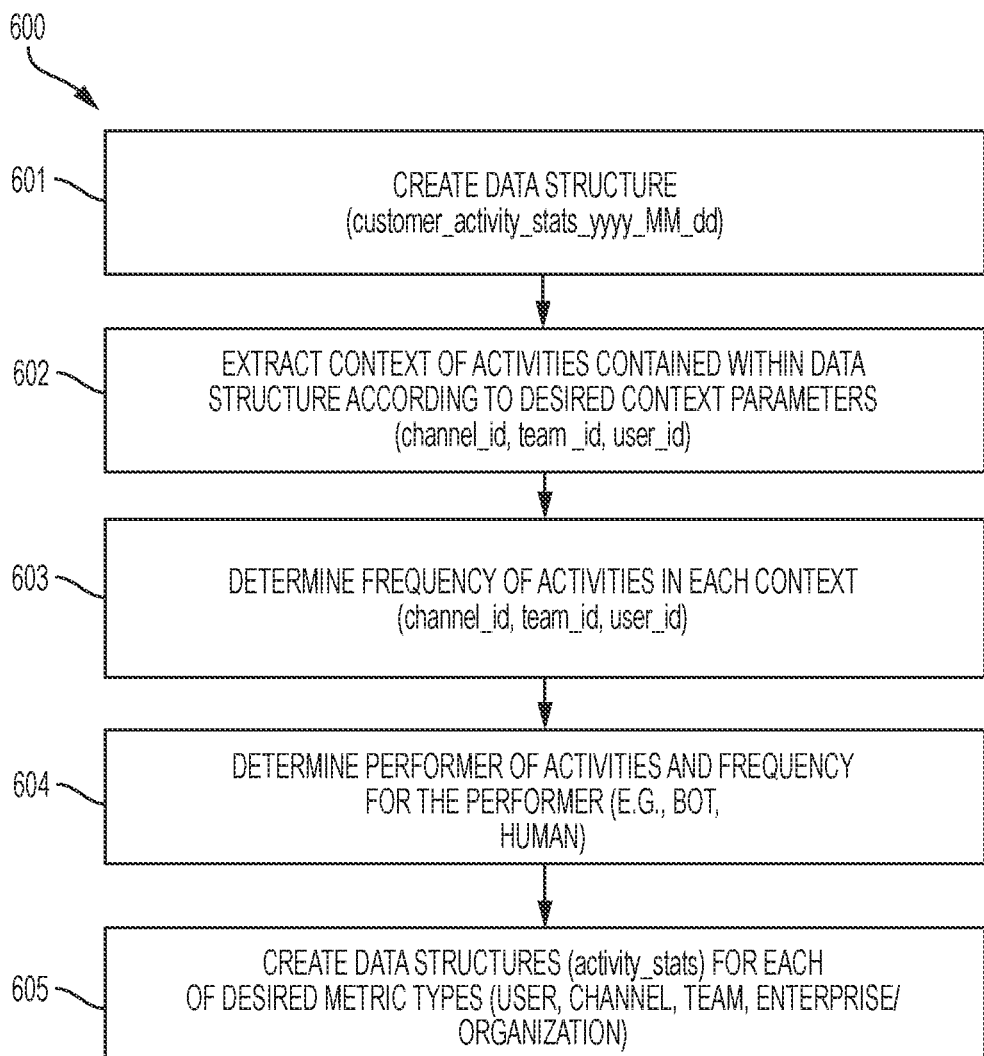

FIG. 6A illustrates an exemplary analytics processing job flow for use with embodiments of the present disclosure. In embodiments, an activity_stats data structure is generated for all enterprise interaction data representing activities (e.g., electronic transactions) within an enterprise group-based communication system.

In embodiments, a flow 600 begins with creating a data structure 601. In embodiments, the data structure may be indicative of activity statistics for a particular network time period (e.g., yyyy_MM_dd). An example schema of the data structure is shown in Table 1.

In embodiments, a context is extracted 602 for each electronic transaction. In embodiments, examples of contexts include a channel identifier, a user identifier, or a team identifier. In embodiments, electronic transactions include writing a message, reading a message, sending a message.

In embodiments, flow 600 continues with determining a frequency of each electronic transaction in each context 603. In embodiments, flow 600 continues with determining a performer (or user type) of each electronic transaction as well as a frequency for the performer 604. In examples, a performer may be a bot or a human (utilizing a client device).

In embodiments, flow 600 continues with generating, using the extracted data, statistics across multiple metric types. In examples, metric types include user, channel, team, enterprise, and organization.

TABLE 1

Example Data Structure Schema team_id bigint,
user_id bigint,
channel_id bigint,
channel_type string,
is_mpdm int,
is_bot int,
is_shared_channel tinyint,
last_activity_ever bigint,
last_message_posted bigint,
last_message_read bigint,
activity_datelist bigint,
cursor_marks_count bigint,
cursor_marks_count_7d bigint,
cursor_marks_count_30d bigint,
cursor_marks_count_90d bigint,
messages_count bigint,
messages_count_7d bigint,
messages_count_30d bigint,
messages_count_90d bigint,
chats_count bigint,
chats_count_30d bigint,
chats_count_90d bigint,
messages_count_from_apps bigint,
messages_count_from_apps_30d bigint,
messages_count_from_apps_90d bigint,
is_writer tinyint,
is_writer_7d tinyint,
is_writer_30d tinyint,
is_writer_90d tinyint,
is_reader tinyint,
is_reader_7d tinyint,
is_reader_30d tinyint, TABLE 1-continued Example Data Structure Schema is_reader_90d tinyint,
files_count bigint,
files_count_30d bigint,
files_count_90d bigint,
activity_counts_90d array<bigint>

An example schema for an activity_stats data structure is illustrated in Table 2.

TABLE 2

Example Schema for activity_stats Data Structure team_id bigint
user_id bigint
channel_id bigint
last_activity_ever bigint
activity_datelist bigint
days_active_in_30d bigint
messages_count_30d bigint
chats_count_30d bigint
messages_count_from_apps_30d bigint
writers_count_30d bigint
readers_count_30d bigint
active_users_30d bigint
channel_writers_count_30d bigint
channel_readers_count_30d bigint
channel_active_users_30d bigint
channel_messages_count_30d bigint
channel_chats_count_30d bigint
channel_messages_count_from_apps_30d bigint
private_messages_count_30d bigint
private_chats_count_30d bigint
channel_cursor_marks_count_30d bigint
private_cursor_marks_count_30d bigint
dm_cursor_marks_count_30d bigint
shared_channel_messages_count_30d bigint
shared_channel_cursor_marks_count_30d bigint
dm_messages_count_30d bigint
dm_chats_count_30d bigint
writers_count_7d bigint
readers_count_7d bigint
active_users_7d bigint
writers_count bigint
readers_count bigint
active_users bigint
messages_count bigint
chats_count bigint
messages_count_from_apps bigint
shared_channel_messages_count bigint
cursor_marks_channels_count bigint
cursor_marks_groups_count bigint
cursor_marks_dms_count bigint
cursor_marks_shared_channels_count bigint
shared_channel_chats_count_30d bigint
shared_channel_chats_count bigint
channel_messages_count bigint
channel_chats_count bigint
channel_messages_count_from_apps bigint
private_messages_count bigint
private_chats_count bigint
dm_messages_count bigint
dm_chats_count bigint
files_count_30d bigint
files_count bigint
days_active_in_90d bigint
files_count_90d bigint
chats_count_90d bigint
messages_count_90d bigint
messages_count_from_apps_90d bigint
channel_messages_count_from_apps_90d bigint
channel_chats_count_90d bigint
channel_messages_count_90d bigint
channel_cursor_marks_count_90d bigint
private_chats_count_90d bigint
private_messages_count_90d bigint TABLE 2-continued Example Schema for activity_stats Data Structure

```
private_cursor_marks_count_90d   bigint
dm_chats_count_90d               bigint
dm_messages_count_90d            bigint
dm_cursor_marks_count_90d        bigint
shared_channel_chats_count_90d   bigint
shared_channel_messages_count_90d    bigint
shared_channel_cursor_marks_count_90d   bigint
readers_count_90d                bigint
writers_count_90d                bigint
active_users_90d                 bigint
channel_readers_count_90d        bigint
channel_writers_count_90d        bigint
channel_active_users_90d         bigint
activity_counts_90d              array<bigint>
ds                               string
metric_type   string -- possible values: user, team, channel, org
```

Figure 6B:
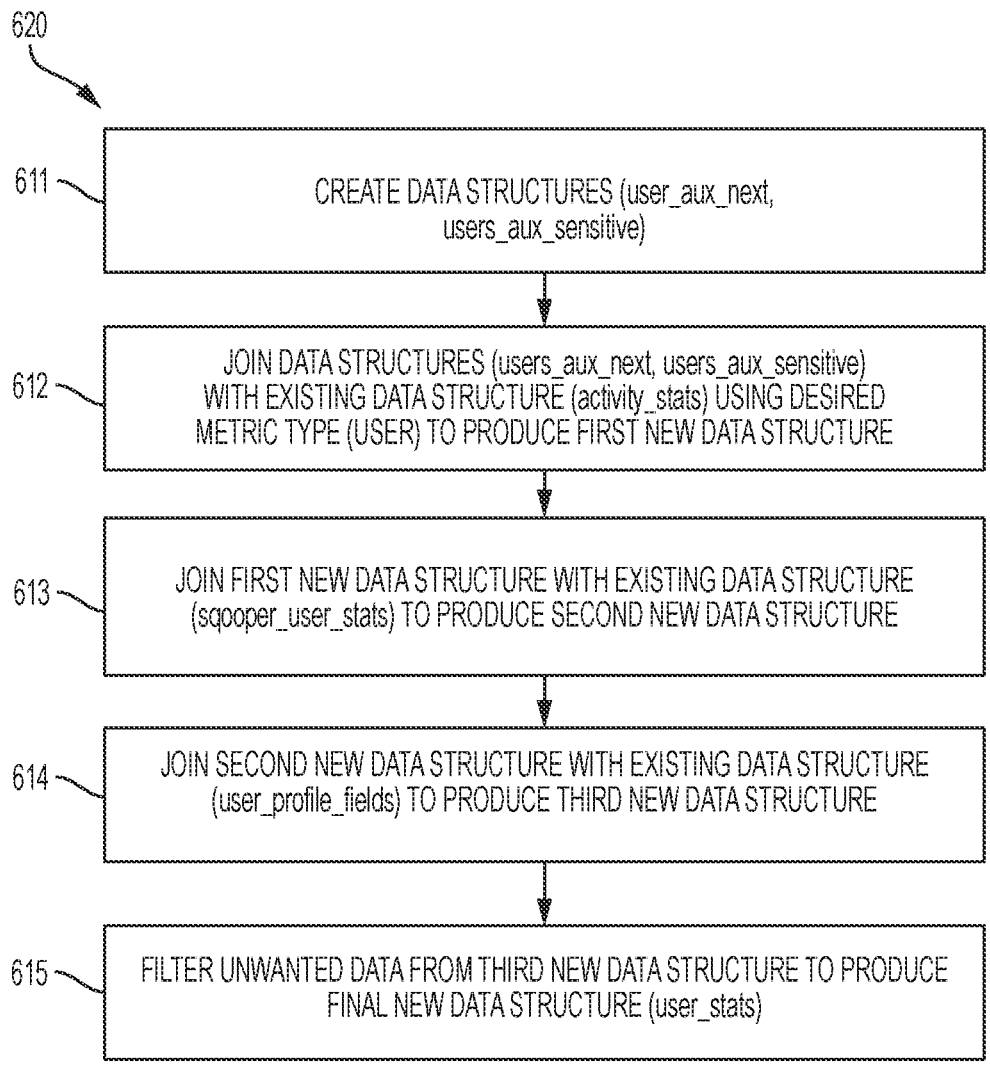

FIG. 6B illustrates an exemplary analytics processing job flow for use with embodiments of the present disclosure. In embodiments, a user_stats data structure is generated for all enterprise interaction data statistics for all users of an enterprise group-based communication system. In embodiments, the enterprise interaction data statistics are statistics representing electronic transactions made by users of client devices within an enterprise group-based communication system.

In embodiments, a flow 610 begins with creating two data structures 611. In embodiments, the two data structures include structured data representative of all user identifiers within an enterprise group-based communication system.

In embodiments, flow 610 continues with joining the two data structures with the activity_stats data structure 612 to obtain activities (e.g., electronic transactions) associated with all users of the enterprise group-based communication system over a period of network time. In embodiments, this joining is done using only the metric type user.

In embodiments, flow 610 continues with joining 613 the data structure resulting from the join in step 612 is with a data structure containing all time activities associated with all user identifiers of the enterprise group-based communication system.

In embodiments, flow 610 continues with joining the data structure resulting from the join in step 613 with a data structure containing enterprise attributes associated with each user identifier of the enterprise group-based communication system.

In embodiments, flow 610 continues with filtering out, from the data structure resulting from the join in step 614, any structured data related to deleted user identifiers. As such, the resulting data structure is the desired user_stats data structure.

An exemplary schema for the user_stats data structure is shown in Table 3.

TABLE 3

Example Schema for user_stats Data Structure

```
enterprise_id         bigint
enterprise_user_id    bigint
team_id               bigint
user_id               bigint
first_name            string
last_name             string
username              string
email                 string
department            string
```

TABLE 3-continued

Example Schema for user_stats Data Structure

```
cost_center              string
is_admin                 int
is_owner                 int
is_primary_owner         int
is_restricted            int
is_ultra_restricted      int
is_inactive              int
is_billable_seat         int
messages_sent_30d        int
messages_sent_all_time   int
activity_datelist        bigint
days_active_in_30d       int
last_activity            int
account_created          int
is_bot                   int
user_title               string
days_active_in_90d       bigint
messages_sent_90d        bigint
activity_counts_90d      array<bigint>
chats_sent_30d           bigint
chats_sent_90d           bigint
chats_sent_all_time      bigint
ds                       string
```

Figure 6C:
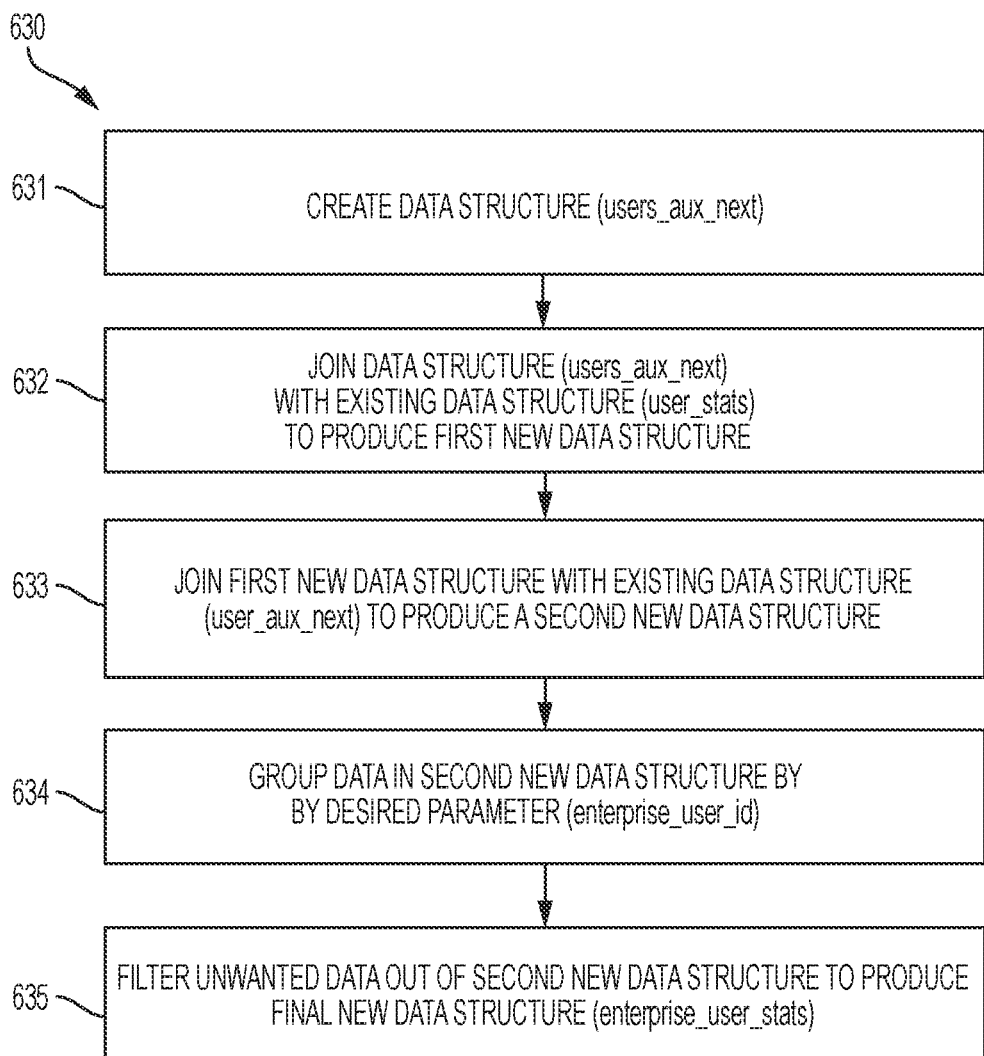

FIG. 6C illustrates an exemplary analytics processing job flow for use with embodiments of the present disclosure. In embodiments, an enterprise_user_stats data structure is generated for all enterprise interaction data statistics for each user of an enterprise group-based communication system by counting all activities (e.g., electronic transactions) associated with the user identifier across workspaces within the enterprise group-based communication system. In embodiments, the enterprise interaction data statistics are statistics representing electronic transactions made by the user of client devices within an enterprise group-based communication system.

In embodiments, a flow 630 begins with creating a data structures 631. In embodiments, the data structure includes structured data representative of all user identifiers within an enterprise group-based communication system.

In embodiments, flow 630 continues with joining the data structure with the existing user_stats data structure 632 (which includes all workplace level statistics) and then join the resulting data structure with an existing data structure 633 to collect all workspace identifiers associated with the user identifier.

In embodiments, flow 630 continues with grouping the resulting data from the join in step 633 by the desired parameter. In this example, the desired parameter is enterprise_user_id, which is an enterprise user identifier associated with the user.

Unwanted data is filtered out 635, and the enterprise_user_stats data structure is complete.

An example schema for the enterprise_user_stats data structure is depicted in Table 4.

TABLE 4

Example Schema for enterprise_user_stats Data Structure

```
enterprise_id         bigint
enterprise_user_id    bigint
first_name            string
last_name             string
username              string
email                 string
department            string
cost_center           string
is_admin              int
```

TABLE 4-continued

Example Schema for enterprise_user_stats Data Structure

| | |
|---|---|
| is_owner | int |
| is_primary_owner | int |
| is_restricted | int |
| is_ultra_restricted | int |
| is_inactive | int |
| is_billable_seat | int |
| messages_sent_30d | int |
| messages_sent_all_time | int |
| days_active_in_30d | int |
| last_activity | int |
| account_created | int |
| workspaces | map<string,string> |
| is_bot | int |
| user_title | string |
| days_active_in_90d | int |
| messages_sent_90d | int |
| chats_sent_30d | int |
| chats_sent_90d | int |
| chats_sent_all_time | int |
| ds | string |

Figure 6D:
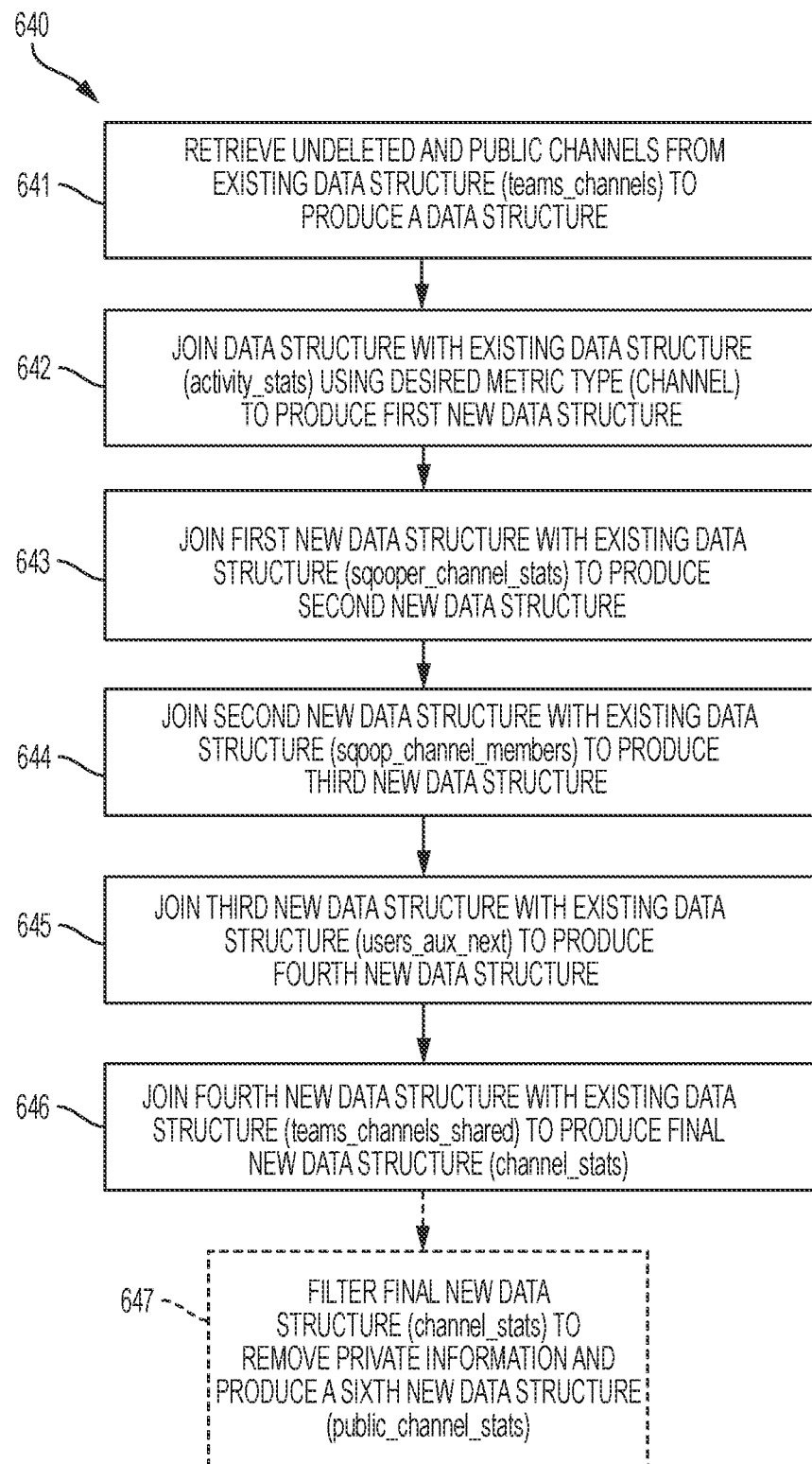

FIG. 6D illustrates an exemplary analytics processing job flow for use with embodiments of the present disclosure. In embodiments, a channel_stats data structure is generated for all enterprise interaction data statistics for each public group-based communication channels of an enterprise group-based communication system. In embodiments, the enterprise interaction data statistics are statistics representing electronic transactions made by users of client devices within an enterprise group-based communication system.

In embodiments, a flow 640 begins with creating a data structure 641 by retrieving structured data including channel identifiers for all undeleted and public group-based communication channels from an existing data structure (e.g., teams_channels).

In embodiments, flow 640 continues with joining the data structure 642 with an existing data structure activity_stats including all enterprise interaction data representing activities (e.g., electronic transactions) within the enterprise group-based communication system. In embodiments, the data structure is joined with the existing activity_stats data structure using a desired metric. In this example, the desired metric type is channel. The resulting data structure from step 642 includes channel activities for desired periods of network time (e.g., 1 day, 30 day, 90 day).

In embodiments, flow 640 continues with joining the resulting data structure from the join in step 642 with an existing data structure (sqooper_channel_stats) representing all activities associated with group-based communication channels of the enterprise group-based communication system.

In embodiments, flow 640 continues with joining 644 the resulting data structure from the join in step 643 with an existing data structure (sqoop_channel_members) to determine how many members and guests are associated with a channel identifier.

In embodiments, flow 640 continues with joining 645 the resulting data structure from the join in step 644 with an existing data structure representing all user identifiers within the enterprise group-based communication system to determine which user identifiers associated with the channel identifier are bots.

In embodiments, flow 640 continues with joining 646 the resulting data structure from the join in step 645 with an existing data structure representing team or group identifiers associated with channel identifiers within the enterprise group-based communication system to determine what group identifiers are associated with the channel identifier.

As such, the channel_stats data structure is generated. An example schema for the channel_stats data structure is depicted in Table 5.

Optionally, flow 640 continues with filtering the channel_stats data structure to remove any private or sensitive information 647. As such, a public_channel_stats data structure is created.

TABLE 5

Example Schema for channel_stats Data Structure

| | |
|---|---|
| enterprise_id | bigint |
| team_id | bigint |
| channel_id | bigint |
| name | string |
| date_create | bigint |
| date_archived | bigint |
| last_message_posted | bigint |
| is_shared | tinyint |
| full_members_count | bigint |
| guest_members_count | bigint |
| messages_count | bigint |
| messages_count_30d | bigint |
| chats_count | bigint |
| chats_count_30d | bigint |
| messages_count_from_apps_30d | bigint |
| writers_count | bigint |
| writers_count_30d | bigint |
| readers_count_30d | bigint |
| active_users_30d | bigint |
| reactions_count | bigint |
| reactions_count_30d | bigint |
| users_who_reacted_count | bigint |
| users_who_reacted_count_30d | bigint |
| messages_reacted_to_count | bigint |
| messages_reacted_to_count_30d | bigint |
| purpose | string |
| workspaces | array<bigint> |
| messages_count_90d | bigint |
| chats_count_90d | bigint |
| messages_count_from_apps_90d | bigint |
| writers_count_90d | bigint |
| readers_count_90d | bigint |
| active_users_90d | bigint |
| reactions_count_90d | bigint |
| users_who_reacted_count_90d | bigint |
| messages_reacted_to_count_90d | bigint |
| is_enterprise | tinyint |
| ds | string |

Figure 6E:
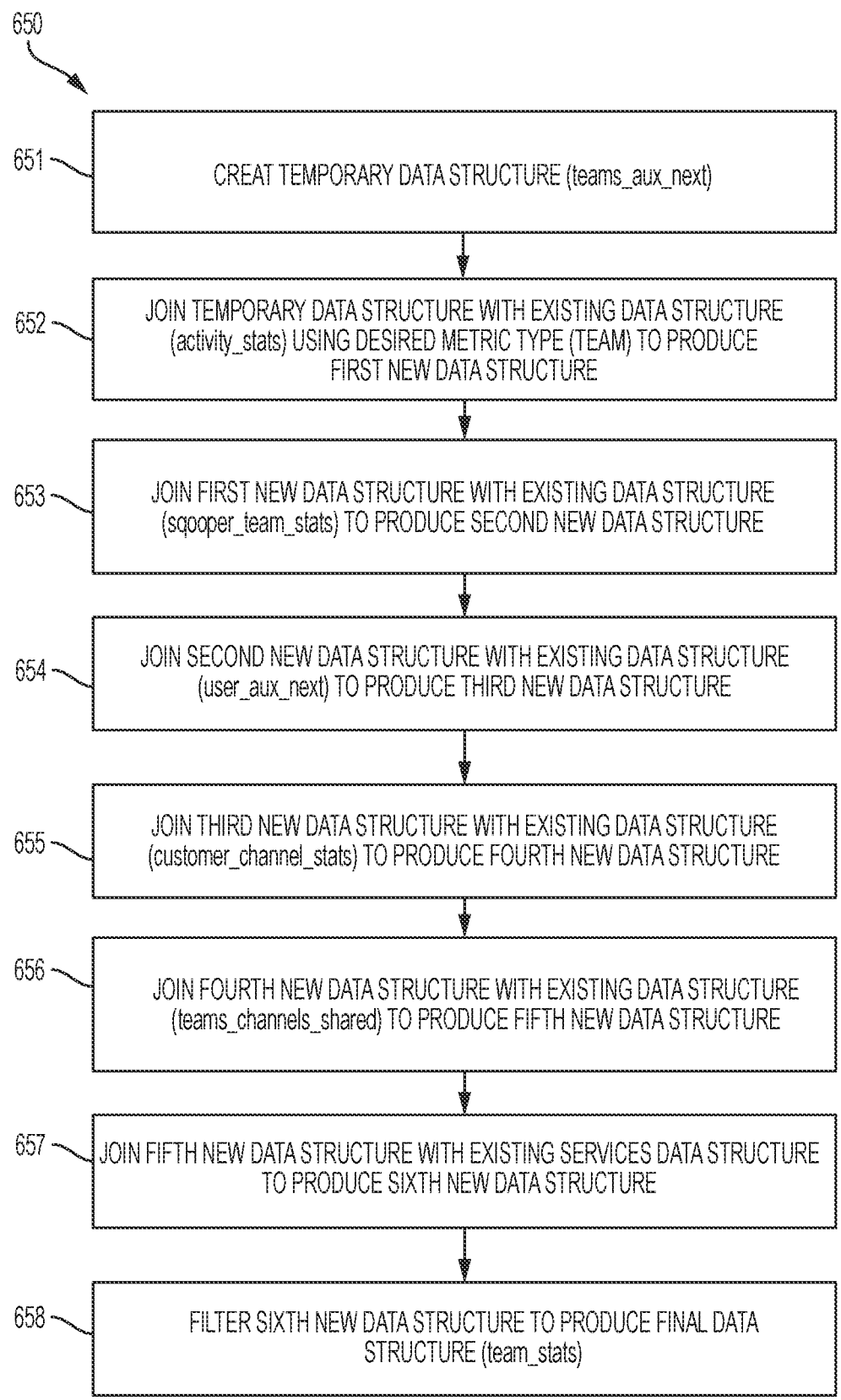

FIG. 6E illustrates an exemplary analytics processing job flow for use with embodiments of the present disclosure. In embodiments, a team_stats data structure is generated for all enterprise interaction data statistics for each group or team of an enterprise group-based communication system. In embodiments, the enterprise interaction data statistics are statistics representing electronic transactions made by users of client devices within an enterprise group-based communication system.

In embodiments, a flow 650 begins with creating a data structure 651 representing all information related to all teams within the enterprise group-based communication system (e.g., name, domain, etc.).

In embodiments, flow 650 continues with joining the data structure 652 with an existing data structure activity_stats including all enterprise interaction data representing activities (e.g., electronic transactions) within the enterprise group-based communication system. In embodiments, the data structure is joined with the existing activity_stats data structure using a desired metric. In this example, the desired metric type is team. The resulting data structure from step 652 includes team activities for desired periods of network time (e.g., 1 day, 30 day, 90 day).

In embodiments, flow 650 continues with joining 653 the resulting data structure from the join in step 652 with an existing data structure (sqooper_team_stats) representing all activities associated with team identifiers or group identifiers of the enterprise group-based communication system.

In embodiments, flow 650 continues with joining 654 the resulting data structure from the join in step 653 with an existing data structure (user_aux_next) to determine a count of guest user identifiers associated with the team identifier or group identifier.

In embodiments, flow 650 continues with joining 655 the resulting data structure from the join in step 654 with an existing data structure (customer_channel_stats) to determine a count of channel identifiers associated with the team identifier or group identifier.

In embodiments, flow 650 continues with joining 656 the resulting data structure from the join in step 655 with an existing data structure (teams_channels_shared) to determine a count of channel identifiers of shared group-based communication channels associated with the team identifier or group identifier.

In embodiments, flow 650 continues with joining 657 the resulting data structure from the join in step 656 with an existing services data structure to determine a count of third party resources (e.g., applications) associated with the team identifier or group identifier.

In embodiments, flow 650 continues with filtering out 658 data associated with deleted team identifiers or group identifiers. As such, the team_stats data structure is generated.

An example schema for the team_stats data structure is depicted in Table 6.

TABLE 6

| Example Schema for team_stats Data Structure | |
|---|---|
| enterprise_id | bigint |
| team_id | bigint |
| name | string |
| domain | string |
| date_created | bigint |
| full_members_count | bigint |
| guests_count | bigint |
| apps_count | bigint |
| channels_count | bigint |
| shared_channels_count | bigint |
| messages_channels_count | bigint |
| messages_channels_count_30d | bigint |
| chats_channels_count | bigint |
| chats_channels_count_30d | bigint |
| messages_channels_count_from_apps_30d | bigint |
| writers_channels_count_30d | bigint |
| readers_channels_count_30d | bigint |
| users_channels_count_30d | bigint |
| messages_groups_count | bigint |
| messages_groups_count_30d | bigint |
| chats_groups_count | bigint |
| chats_groups_count_30d | bigint |
| messages_shared_channels_count_30d | bigint |
| messages_dms_count | bigint |
| messages_dms_count_30d | bigint |
| chats_dms_count | bigint |
| chats_dms_count_30d | bigint |
| cursor_marks_channels_count_30d | bigint |
| cursor_marks_groups_count_30d | bigint |
| cursor_marks_dms_count_30d | bigint |
| cursor_marks_shared_channels_count_30d | bigint |
| files_shared_count | bigint |
| files_shared_count_30d | bigint |
| writers_count_7d | bigint |
| readers_count_7d | bigint |

TABLE 6-continued

| Example Schema for team_stats Data Structure | |
|---|---|
| active_users_7d | bigint |
| writers_count | bigint |
| readers_count | bigint |
| active_users | bigint |
| messages_count | bigint |
| chats_count | bigint |
| messages_count_from_apps | bigint |
| shared_channel_messages_count | bigint |
| cursor_marks_channels_count | bigint |
| cursor_marks_groups_count | bigint |
| cursor_marks_dms_count | bigint |
| cursor_marks_shared_channels_count | bigint |
| cursor_marks_channels_count_1d | bigint |
| cursor_marks_groups_count_1d | bigint |
| cursor_marks_dms_count_1d | bigint |
| cursor_marks_shared_channels_count_1d | bigint |
| messages_count_1d | bigint |
| chats_count_1d | bigint |
| chats_shared_channels_count_30d | bigint |
| chats_shared_channels_count_1d | bigint |
| messages_channels_count_1d | bigint |
| chats_channels_count_1d | bigint |
| messages_channels_count_from_apps_1d | bigint |
| messages_groups_count_1d | bigint |
| chats_groups_count_1d | bigint |
| messages_dms_count_1d | bigint |
| chats_dms_count_1d | bigint |
| writers_count_1d | bigint |
| readers_count_1d | bigint |
| active_users_1d | bigint |
| files_count | bigint |
| files_size | bigint |
| files_count_1d | bigint |
| files_count_30d | bigint |
| messages_channels_count_90d | bigint |
| chats_channels_count_90d | bigint |
| messages_channels_count_from_apps_90d | bigint |
| writers_channels_count_90d | bigint |
| readers_channels_count_90d | bigint |
| users_channels_count_90d | bigint |
| messages_groups_count_90d | bigint |
| chats_groups_count_90d | bigint |
| messages_shared_channels_count_90d | bigint |
| messages_dms_count_90d | bigint |
| chats_dms_count_90d | bigint |
| cursor_marks_channels_count_90d | bigint |
| cursor_marks_groups_count_90d | bigint |
| cursor_marks_dms_count_90d | bigint |
| cursor_marks_shared_channels_count_90d | bigint |
| files_shared_count_90d | bigint |
| chats_shared_channels_count_90d | bigint |
| files_count_90d | bigint |
| writers_count_30d | bigint |
| readers_count_30d | bigint |
| active_users_30d | bigint |
| writers_count_90d | bigint |
| readers_count_90d | bigint |
| active_users_90d | bigint |
| ds | string |

Figure 6F:
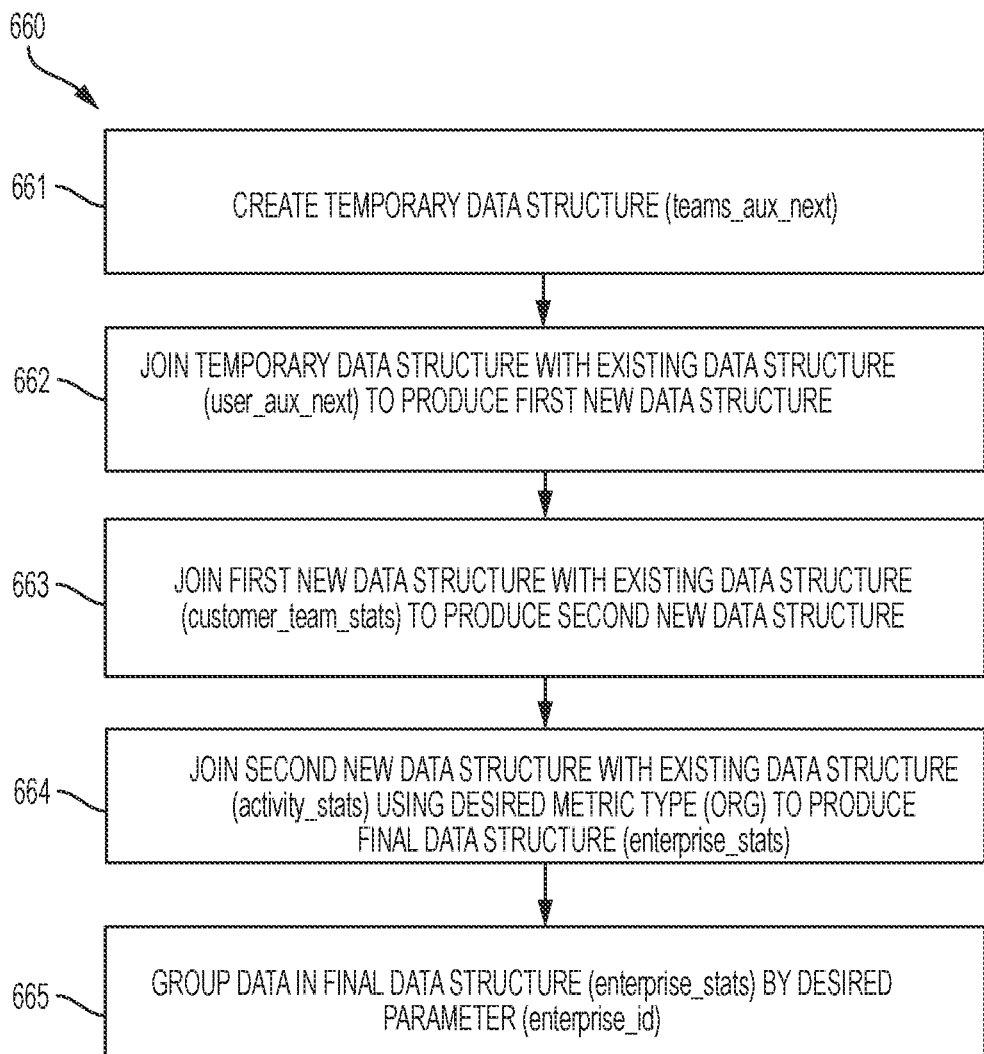

FIG. 6F illustrates an exemplary analytics processing job flow for use with embodiments of the present disclosure. In embodiments, an enterprise_stats data structure is generated for all enterprise interaction data statistics for each enterprise (e.g., having an enterprise identifier) within an enterprise group-based communication system. In embodiments, the enterprise interaction data statistics are statistics representing electronic transactions made by users of client devices within an enterprise group-based communication system.

In embodiments, a flow 660 begins with creating a data structure 661 representing all information related to all teams within the enterprise group-based communication system, including an enterprise identifier with which each team is associated (e.g., name, domain, enterprise_id, etc.).

In embodiments, flow 660 continues with joining 662 the data structure with an existing data structure (user_aux_next) to determine a count of guest user identifiers and billable user identifiers associated with each enterprise identifiers within the enterprise group-based communication system.

In embodiments, flow 660 continues with joining 663 the resulting data structure from the join in step 662 with an existing data structure (customer_team_stats) representing all activities associated with team identifiers or group identifiers associated with the enterprise identifier.

In embodiments, flow 660 continues with joining 664 the resulting data structure from the join in step 663 with an existing data structure (activity_stats) using a desired metric (e.g., enterprise or organization) to obtain data representative of activities for teams associated with the enterprise identifier for desired periods of network time (e.g., 1 day, 30 day, 90 day).

In embodiments, flow 660 continues with grouping 665 the data within the resulting data structure from the filtering in step 664 by a desired parameter. In this example, the desired parameter is enterprise_id. As such, the enterprise_stats data structure is generated.

An example schema for the enterprise_stats data structure is depicted in Table 7.

TABLE 7

Example Schema for enterprise_stats Data Structure

| | |
|---|---|
| enterprise_id | bigint |
| name | string |
| domain | string |
| date_created | bigint |
| teams_count | bigint |
| full_members_count | bigint |
| guests_count | bigint |
| billable_active_count | bigint |
| apps_count | bigint |
| writers_count_1d | bigint |
| readers_count_1d | bigint |
| active_users_1d | bigint |
| writers_count_7d | bigint |
| readers_count_7d | bigint |
| active_users_7d | bigint |
| messages_count_1d | bigint |
| chats_count_1d | bigint |
| messages_count_from_apps_1d | bigint |
| messages_channels_count_1d | bigint |
| chats_channels_count_1d | bigint |
| messages_groups_count_1d | bigint |
| chats_groups_count_1d | bigint |
| messages_dms_count_1d | bigint |
| chats_dms_count_1d | bigint |
| chats_shared_channels_count_1d | bigint |
| cursor_marks_channels_count_1d | bigint |
| cursor_marks_groups_count_1d | bigint |
| cursor_marks_dms_count_1d | bigint |
| cursor_marks_shared_channels_count_1d | bigint |
| messages_channels_count | bigint |
| chats_channels_count | bigint |
| messages_groups_count | bigint |
| chats_groups_count | bigint |
| messages_dms_count | bigint |
| chats_dms_count | bigint |
| files_count_1d | bigint |
| files_count_30d | bigint |
| files_count_90d | bigint |
| writers_count_30d | bigint |
| readers_count_30d | bigint |
| active_users_30d | bigint |
| writers_count_90d | bigint |
| readers_count_90d | bigint |
| active_users_90d | bigint |
| ds | string |

TABLE 7-continued

Example Schema for enterprise_stats Data Structure

FIGS. 7A-7B and 8 illustrate an exemplary enterprise analytics publishing flow for use with embodiments of the present disclosure. In embodiments, a set of pipelines reads the data structures created as depicted in FIGS. 6A-6F, performs filtering and transformations, and publishes the enterprise analytics data so that a low latency data communication module/system can serve the enterprise analytics upon request.

In embodiments, an exemplary graph 700 depicts the enterprise analytics publishing flow 800 that is depicted in FIG. 8. In embodiments, an enterprise analytics publishing flow 800 begins with waiting for a signal indicating that the necessary data structures are complete and available 801. This can be seen in the column within box 701 in FIGS. 7A-7B.

In embodiments, flow 800 continues with starting pipelines that read and publish 802 the data structures for use by a computed data service (CDS or low latency data communication module). This can be seen in the column within box 702 in FIGS. 7A-7B. In embodiments, the computed data service allows for serving enterprise analytics data with low latency. In embodiments, the computed data service may be based on an open source project such as Quiver®. In embodiments, the computed data service performs checks to ensure the enterprise analytics data is available and no file or data structure size limits have been exceeded. In embodiments, the pipelines that read and publish the data structures can be implemented using Spark® and written in Scala®.

In embodiments, flow 800 continues with serving 803 by the computed data service, the requested enterprise analytics data. In embodiments, serving the requested enterprise analytics data 803 comprises retrieving a relevant data structure 804, filtering the retrieved data structure to extract a requested subset of enterprise analytics data 805, and returning the requested subset of enterprise analytics data 806 to a requesting device.

Figure 9A:
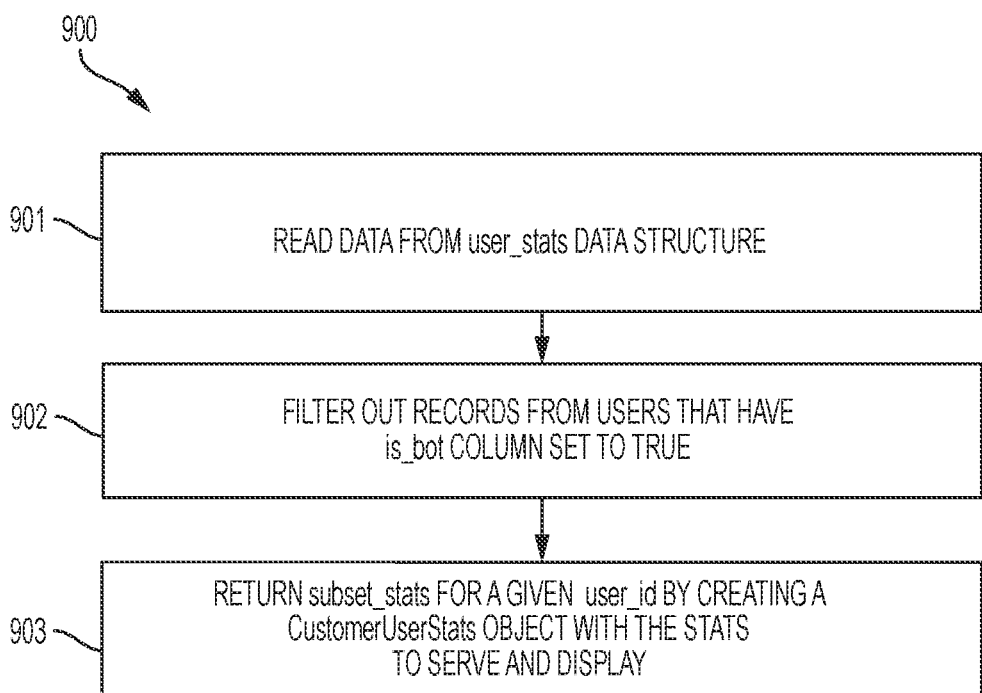

FIG. 9A illustrates an enterprise analytics serving flow for use with embodiments of the present disclosure. In embodiments, a subset of enterprise analytics statistics can be returned for a given user identifier. In embodiments, the flow 900 for returning a subset of enterprise analytics statistics for a given user identifier begins with reading data from the user_stats data structure defined above 901. In embodiments, flow 900 continues with filtering out data from the user_stats data structure that is related to bots (i.e., has an is_bot column set to true) 902. In embodiments, flow 900 continues with returning the subset of enterprise analytics statistics for the given user identifier by creating an object containing the subset to serve and render for display on a client device 903. Examples of enterprise analytics statistics that can be served for a given user identifier are depicted in Table 8.

In embodiments, the enterprise analytics statistics for a given user identifier are sortable. In such embodiments, the subset of enterprise analytics statistics is created to be queriably in ascending/descending order based on a dimension. Examples of metrics that are sortable are depicted in Table 9.

| | |
|---|---|
| writers_count_90d | bigint |
| readers_count_90d | bigint |
| active_users_90d | bigint |
| ds | string |

TABLE 8

Exemplary Enterprise Analytics Statistics Available for a Given User Identifier

```
struct CustomerUserStats {
  1: i64 user_id
  2: i64 team_id
  3: optional i64 enterprise_user_id
  4: optional i64 enterprise_id
  5: optional string first_name
  6: optional string last_name
  7: optional string username
  8: optional string email
  9: optional string department
  10: optional string cost_center
  11: optional bool is_admin
  12: optional bool is_owner
  13: optional bool is_primary_owner
  14: optional bool is_restricted
  15: optional bool is_ultra_restricted
  16: optional bool is_inactive
  17: optional bool is_billable_seat
  18: optional i32 messages_sent_30d
  19: optional i32 messages_sent
  21: optional i32 days_active_30d
  22: optional i32 last_activity
  23: optional i32 account_created
  24: optional string user_title
  25: optional i64 messages_sent_90d
  26: optional i64 days_active_90d
  27: optional i64 chats_sent_30d
  28: optional i64 chats_sent_90d
  29: optional i64 chats_sent #chats_sent_all_time
}
```

TABLE 9

Exemplary Sortable Metrics for Enterprise Analytics for a Given User Identifier

```
enum UserSortDimensions {
  name # (first name + last name), if both empty, user username
  messages_sent_30d
  messages_sent
  days_active_30d
  last_activity
  account_created
  username
  email
  messages_sent_90d
  days_active_90d
  chats_sent
  chats_sent_30d
  chats_sent_90d
  department
  cost_center
}
```

Figure 9B:
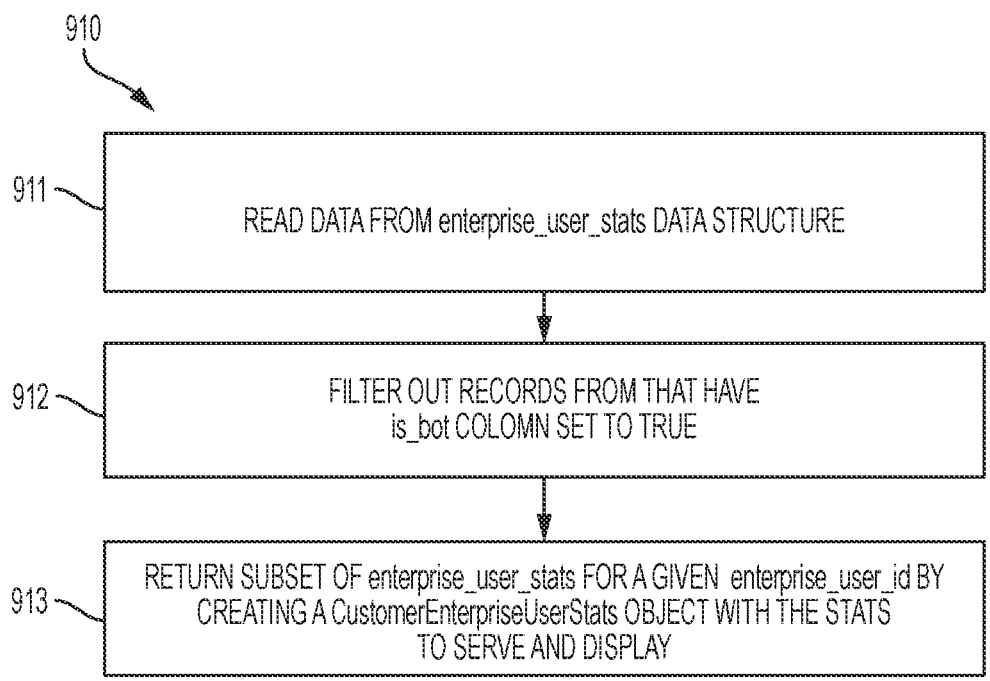

FIG. 9B illustrates an enterprise analytics serving flow for use with embodiments of the present disclosure. In embodiments, a subset of enterprise analytics statistics can be returned for a given enterprise user identifier. In embodiments, the flow 910 for returning a subset of enterprise analytics statistics for a given enterprise user identifier begins with reading data from the enterprise_user_stats data structure defined above 911. In embodiments, flow 910 continues with filtering out data from the user_stats data structure that is related to bots (i.e., has an is_bot column set to true) 912. In embodiments, flow 910 continues with returning the subset of enterprise analytics statistics for the given enterprise user identifier by creating an object containing the subset to serve and render for display on a client device 913. Examples of enterprise analytics statistics that can be served for a given enterprise user identifier are depicted in Table 10.

In embodiments, the enterprise analytics statistics for a given enterprise user identifier are sortable. In such embodiments, the subset of enterprise analytics statistics is created to be queriably in ascending/descending order based on a dimension. Examples of metrics that are sortable are depicted in Table 11.

TABLE 10

Exemplary Enterprise Analytics Statistics Available for a Given Enterprise User Identifier

```
struct CustomerEnterpriseUserStats 1
  1: i64 enterprise_user_id
  2: i64 enterprise_id
  3: optional string first_name
  4: optional string last_name
  5: optional string username
  6: optional string email
  7: optional string department
  8: optional string cost_center
  9: optional bool is_admin
  10: optional bool is_owner
  11: optional bool is_primary_owner
  12: optional bool is_restricted
  13: optional bool is_ultra_restricted
  14: optional bool is_inactive
  15: optional bool is_billable_seat
  16: optional i32 messages_sent_30d
  17: optional i32 messages_sent
  18: optional i32 days_active_30d
  19: optional i32 last_activity
  20: optional i32 account_created
  21: optional map<string, string> workspaces
  22: optional string user_title
  23: optional i32 messages_sent_90d
  24: optional i32 days_active_90d
  25: optional i32 chats_sent_30d
  26: optional i32 chats_sent_90d
  27: optional i32 chats_sent #chats_sent_all_time
}
```

TABLE 11

Exemplary Sortable Metrics for Enterprise Analytics for a Given Enterprise User Identifier

```
enum UserSortDimensions {
  name # (first name + last name), if both empty, user username
  messages_sent_30d
  messages_sent
  days_active_30d
  last_activity
  account_created
  username
  email
  messages_sent_90d
  days_active_90d
  chats_sent
  chats_sent_30d
  chats_sent_90d
  department
  cost_center
}
```

Figure 9C:
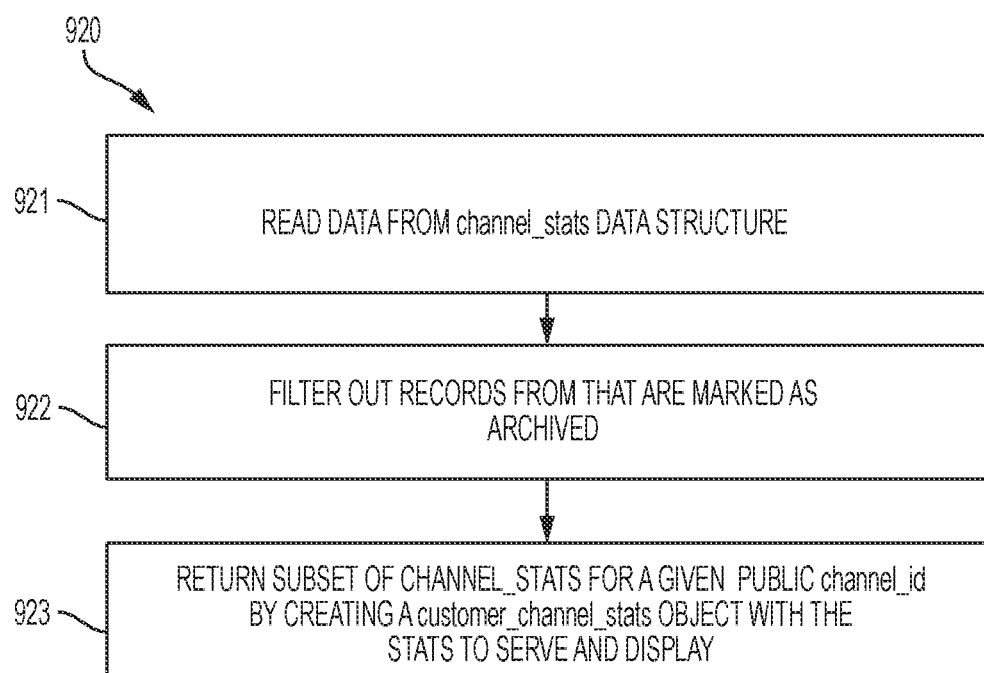

FIG. 9C illustrates an enterprise analytics serving flow for use with embodiments of the present disclosure. In embodiments, a subset of enterprise analytics statistics can be returned for a given channel identifier. In embodiments, the flow 920 for returning a subset of enterprise analytics statistics for a given channel identifier begins with reading data from the channel_stats data structure defined above 921. In embodiments, flow 920 continues with filtering out data from the channel_stats data structure that is marked as archived 922. For example, a record may have a date_archived parameter that is not empty. In embodiments, flow 920 continues with returning the subset of enterprise analytics statistics for the given channel identifier by creating an object containing the subset to serve and render for display on a client device 923. Examples of enterprise analytics statistics that can be served for a given channel identifier are depicted in Table 12.

In embodiments, the enterprise analytics statistics for a given channel identifier are sortable. In such embodiments, the subset of enterprise analytics statistics is created to be queriably in ascending/descending order based on a dimension. Examples of metrics that are sortable are depicted in Table 13.

TABLE 12

Exemplary Enterprise Analytics Statistics Available for a Given Channel Identifier

```
struct CustomerChannelStats {
  1: i64 team_id
  2: optional i64 enterprise_id
  3: i64 channel_id
  4: optional string name
  5: optional i64 date_create
  6: optional i64 date_archived
  7: optional i64 last_message_posted
  8: optional i32 is_shared
  9: optional i64 full_members_count
  10: optional i64 guest_members_count
  11: optional i64 messages_count
  12: optional i64 messages_count_30d
  13: optional i64 chats_count
  14: optional i64 chats_count_30d
  15: optional i64 messages_count_from_apps_30d
  16: optional i64 writers_count
  17: optional i64 writers_count_30d
  18: optional i64 readers_count_30d
  19: optional i64 active_users_30d # billing
  20: optional i64 reactions_count
  21: optional i64 reactions_count_30d
  22: optional i64 users_who_reacted_count
  23: optional i64 users_who_reacted_count_30d
  24: optional i64 messages_reacted_to_count
  25: optional i64 messages_reacted_to_count_30d
  26: optional i64 writers_count_30_days_ago_30d
  27: optional i64 total_members_count # full_members_count + guest_members_count
  28: optional i64 writers_percentage # writers_count * 100 / (full_members_count + guest_members_count)
  29: optional i64 writers_percentage_30d # (writers_count_30d − writers_count_30_days_ago_30d) * 100 / writers_count_30_days_ago_30d
  30: optional string purpose
  31: optional list<i64> workspaces
  32: optional i64 messages_count_90d
  33: optional i64 chats_count_90d
  34: optional i64 messages_count_from_apps_90d
  35: optional i64 writers_count_90d
  36: optional i64 readers_count_90d
  37: optional i64 reactions_count_90d
  38: optional i64 users_who_reacted_count_90d
  39: optional i64 messages_reacted_to_count_90d
  40: optional i64 writers_count_90_days_ago_90d
  41: optional i64 writers_percentage_90d # (writers_count_90d − writers_count_90_days_ago_90d) * 100 / writers_count_90_days_ago_90d
  42: optional i32 is_enterprise
}
```

TABLE 13

Exemplary Sortable Metrics for Enterprise Analytics for a Given Channel Identifier

```
enum ChannelSortDimensions {
  name
  date_create
  last_message_posted
  full_members_count
  guest_members_count
  messages_count
  messages_count_30d
  chats_count
  chats_count_30d
  messages_count_from_apps_30d
  writers_count
  writers_count_30d
  readers_count_30d
  active_users_30d
  reactions_count
  reactions_count_30d
  users_who_reacted_count
  users_who_reacted_count_30d
  total_members_count
  Writers_percentage_30d
  messages_count_90d
  chats_count_90d
  messages_count_from_apps_90d
  writers_count_90d
  readers_count_90d
  reactions_count_90d
  users_who_reacted_count_90d
  writers_percentage_90d
}
```

Figure 9D:
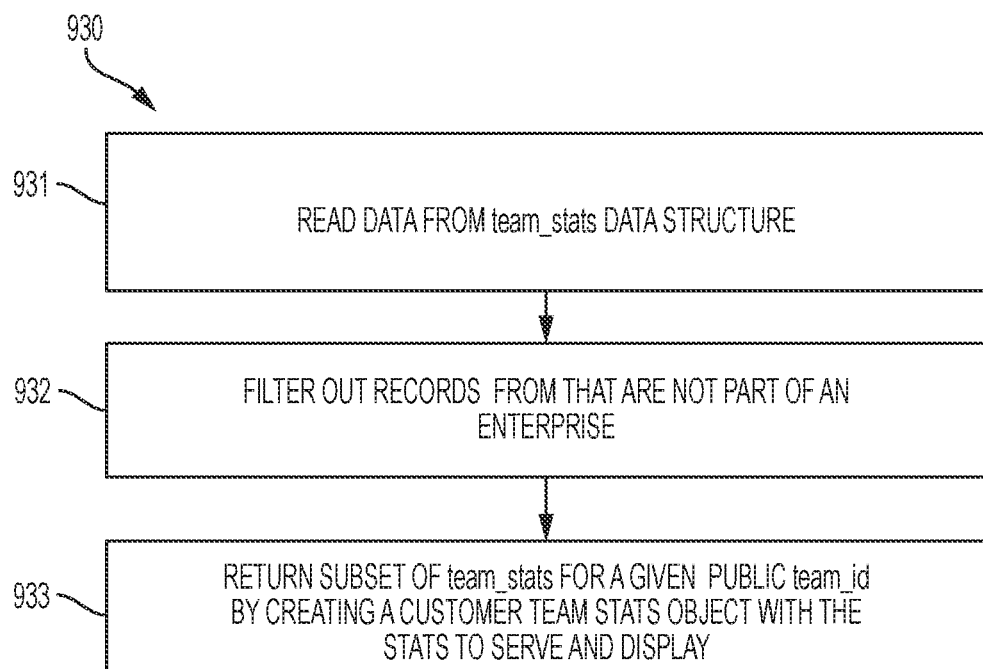

FIG. 9D illustrates an enterprise analytics serving flow for use with embodiments of the present disclosure. In embodiments, a subset of enterprise analytics statistics can be returned for a given team or group identifier. In embodiments, the flow 930 for returning a subset of enterprise analytics statistics for a given team or group identifier begins with reading data from the team_stats data structure defined above 931. In embodiments, flow 930 continues with filtering out data from the team_stats data structure that is not associated with an enterprise identifier 932. In embodiments, flow 930 continues with returning the subset of enterprise analytics statistics for the given team or group identifier by creating an object containing the subset to serve and render for display on a client device 933. Examples of enterprise analytics statistics that can be served for a given team or group identifier are depicted in Table 14.

In embodiments, the enterprise analytics statistics for a given team or group identifier are sortable. In such embodiments, the subset of enterprise analytics statistics is created to be queriably in ascending/descending order based on a dimension. Examples of metrics that are sortable are depicted in Table 15.

TABLE 14

Exemplary Enterprise Analytics Statistics Available for a Given Team Identifier

```
struct CustomerTeamStats {
  1: i64 team_id
  2: optional i64 enterprise_id
  3: optional string name
  4: optional string domain
```

TABLE 14-continued

Exemplary Enterprise Analytics Statistics Available for a Given Team Identifier

5: optional i64 date_created
6: optional i64 full_members_count
7: optional i64 guests_count
8: optional i64 apps_count
9: optional i64 channels_count
10: optional i64 shared_channels_count
11: optional i64 messages_channels_count
12: optional i64 messages_channels_count_30d
13: optional i64 chats_channels_count
14: optional i64 chats_channels_count_30d
15: optional i64 messages_count_from_apps_30d
16: optional i64 writers_channels_count_30d
17: optional i64 readers_channels_count_30d
18: optional i64 users_channels_count_30d
19: optional i64 messages_groups_count
20: optional i64 messages_groups_count_30d
21: optional i64 chats_groups_count
22: optional i64 chats_groups_count_30d
23: optional i64 messages_shared_channels_count_30d
24: optional i64 messages_dms_count
25: optional i64 messages_dms_count_30d
26: optional i64 chats_dms_count
27: optional i64 chats_dms_count_30d
28: optional i64 cursor_marks_channels_count_30d
29: optional i64 cursor_marks_groups_count_30d
30: optional i64 cursor_marks_dms_count_30d
31: optional i64 cursor_marks_shared_channels_count_30d
34: optional i64 writers_count_7d
35: optional i64 readers_count_7d
36: optional i64 active_users_7d
40: optional i64 messages_count
41: optional i64 chats_count
42: optional i64 messages_count_from_apps
43: optional i64 shared_channel_messages_count
44: optional i64 cursor_marks_channels_count
45: optional i64 cursor_marks_groups_count
46: optional i64 cursor_marks_dms_count
47: optional i64 cursor_marks_shared_channels_count
48: optional i64 readers_count_30_days_ago_30d
49: optional i64 users_channels_count # full_members_count + guest_count
50: optional i32 readers_percentage_30d # readers_count_30d * 100 / users_channels_count
51: optional i32 readers_change_prior_month_30d # (readers_count_30d − readers_count_30_days_ago_30d) * 100 / readers_count_30_days_ago_30d
52: optional i64 chats_count_30d # chats_channels_count_30d + chats_groups_count_30d + chats_dms_count_30d
53: optional i32 chats_channels_count_percentage # chats_channels_count * 100 / chats_count
54: optional i32 chats_channels_count_percentage_30d # chats_channels_count_30d * 100 / chats_count_30d
55: optional i32 cursor_marks_percentage # cursor_marks_channels_count * 100 / (cursor_marks_channels_count + cursor_marks_groups_count + cursor_marks_dms_count)
56: optional i32 cursor_marks_percentage_30d # cursor_marks_channels_count_30d * 100 / (cursor_marks_channels_count_30d + cursor_marks_groups_count_30d + cursor_marks_dms_count_30d)
57: optional i64 chats_shared_channels_count_30d
58: optional i64 files_count
59: optional i64 files_count_30d
60: optional i64 messages_channels_count_90d
61: optional i64 messages_count_from_apps_90d
62: optional i64 messages_groups_count_90d
63: optional i64 messages_shared_channels_count_90d
64: optional i64 messages_dms_count_90d
65: optional i64 writers_channels_count_90d
66: optional i64 readers_channels_count_90d
67: optional i64 users_channels_count_90d
68: optional i64 chats_channels_count_90d
69: optional i64 chats_groups_count_90d
70: optional i64 chats_dms_count_90d
71: optional i64 chats_shared_channels_count_90d
72: optional i64 cursor_marks_channels_count_90d
73: optional i64 cursor_marks_groups_count_90d
74: optional i64 cursor_marks_dms_count_90d
75: optional i64 cursor_marks_shared_channels_count_90d
76: optional i64 files_count_90d
77: optional i64 readers_count_90_days_ago_90d
78: optional i32 readers_percentage_90d # readers_count_90d * 100 / users_channels_count
79: optional i32 readers_change_prior_month_90d # (readers_count_90d − readers_count_90_days_ago_90d) * 100 / readers_count_90_days_ago_90d TABLE 14-continued Exemplary Enterprise Analytics Statistics Available for a Given Team Identifier

```
  80: optional i64 chats_count_90d # chats_channels_count_90d + chats_groups_count_90d +
chats_dms_count_90d
  81: optional i32 chats_channels_count_percentage_90d # chats_channels_count_90d * 100 /
chats_count_90d
  82: optional i32 cursor_marks_percentage_90d # cursor_marks_channels_count_90d * 100 /
(cursor_marks_channels_count_90d + cursor_marks_groups_count_90d +
cursor_marks_dms_count_90d)
    83: optional i64 readers_count_30d
    84: optional i64 readers_count_90d
    85: optional i64 writers_count_30d
    86: optional i64 writers_count_90d
}
```

TABLE 15

Exemplary Sortable Metrics for Enterprise Analytics for a Given Team Identifier

```
enum TeamSortDimensions {
  name
  date_created
  users_channels_count
  full_members_count
  guests_count
  apps_count
  channels_count
  shared_channels_count
  readers_channels_count_30d
  readers_percentage_30d
  readers_change_prior_month_30d
  writers_channels_count_30d
  messages_count_from_apps
  messages_count_from_apps_30d
  chats_count
  chats_count_30d
  chats_channels_count
  chats_channels_count_percentage
  chats_channels_count_30d
  chats_channels_count_percentage_30d
  chats_groups_count
  chats_groups_count_30d
  chats_dms_count
  chats_dms_count_30d
  chats_shared_channels_count_30d
  cursor_marks_percentage
  cursor_marks_percentage_30d
  files_count
  files_count_30d
  readers_channels_count_90d
  readers_percentage_90d
  readers_change_prior_month_90dreaders_count_90_days_ago_90d
  writers_channels_count_90d
  messages_count_from_apps_90d
  chats_count_90d
  chats_channels_count_90d
  chats_channels_count_percentage_90d
  chats_groups_count_90d
  chats_dms_count_90d
  chats_shared_channels_count_90d
  files_count_90d
  cursor_marks_percentage_90d
  readers_count_30d
  readers_count_90d
  writers_count_30d
  writers_count_90d
}
```

Figure 9E:
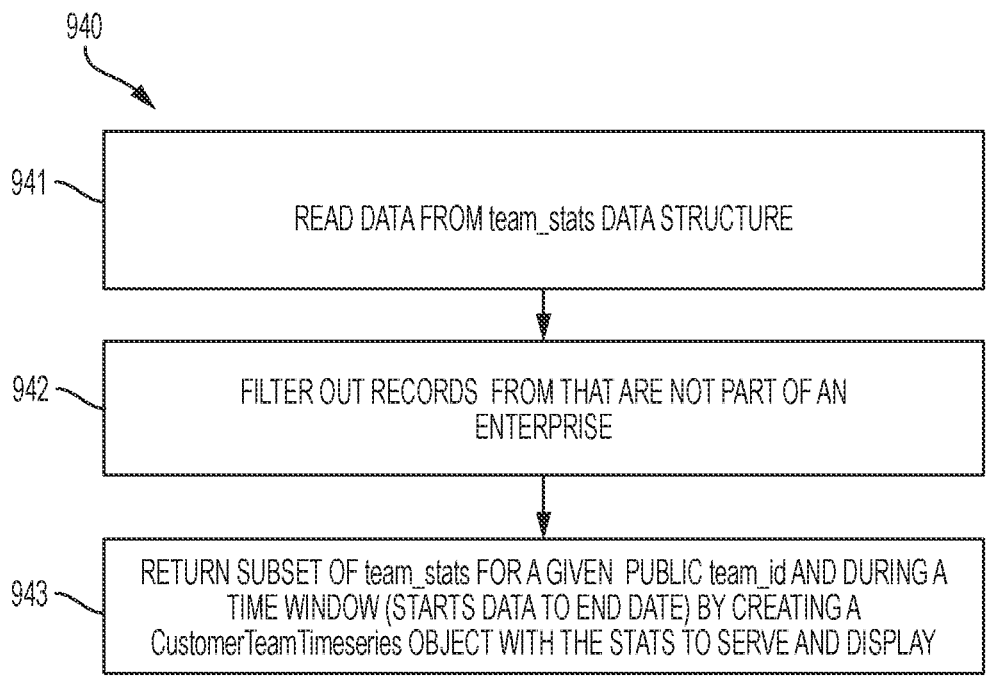

FIG. 9E illustrates an enterprise analytics serving flow for use with embodiments of the present disclosure. In embodiments, a subset of enterprise analytics statistics can be returned for a given team or group identifier for a given time window (e.g., a network time window may have a start date and an end date). In embodiments, the given time window may be defined by a start date yyyy-MM-dd and an end date yyyy-MM-dd. In embodiments, the flow 940 for returning a subset of enterprise analytics statistics for a given team or group identifier for a given time window begins with reading data from the team_stats data structure defined above 941. In embodiments, flow 940 continues with filtering out data from the team_stats data structure that is not associated with an enterprise identifier 942. In embodiments, flow 940 continues with returning the subset of enterprise analytics statistics for the given team or group identifier for the given time window by creating an object containing the subset to serve and render for display on a client device 943. Examples of enterprise analytics statistics that can be served for a given team or group identifier for a given time window are depicted in Table 16.

In embodiments, an object containing a partial subset of the enterprise analytics statistics for the given team or group identifier for the given time window (e.g., data may already exist for the time window with the exception of one new day of data). In such an example, the object is read and the new data is appended to it.

TABLE 16

Exemplary Enterprise Analytics Statistics Available for a Given Team Identifier in a Given Time Window

```
struct CustomerTeamTimeseries {
    1: string ds
    2: i64 team_id
    3: optional i64 enterprise_id
    4: optional i64 channels_count
    5: optional i64 full_members_count
    6: optional i64 guests_count
    7: optional i64 readers_count_1d
    8: optional i64 writers_count_1d
    9: optional i64 readers_count_7d
   10: optional i64 writers_count_7d
   11: optional i64 chats_count_1d
   12: optional i64 messages_channels_count_from_apps_1d
   13: optional i64 chats_channels_count_1d
   14: optional i64 chats_groups_count_1d
   15: optional i64 chats_shared_channels_count_1d
   16: optional i64 chats_dms_count_1d
   17: optional i64 cursor_marks_channels_count_1d
   18: optional i64 cursor_marks_groups_count_1d
   19: optional i64 cursor_marks_dms_count_1d
   20: optional i64 cursor_marks_shared_channels_count_1d
   21: optional i64 messages_count
   22: optional i64 files_size
   23: optional i64 files_count_1d
   24: optional i64 shared_channels_count
  }
```

Figure 9F:
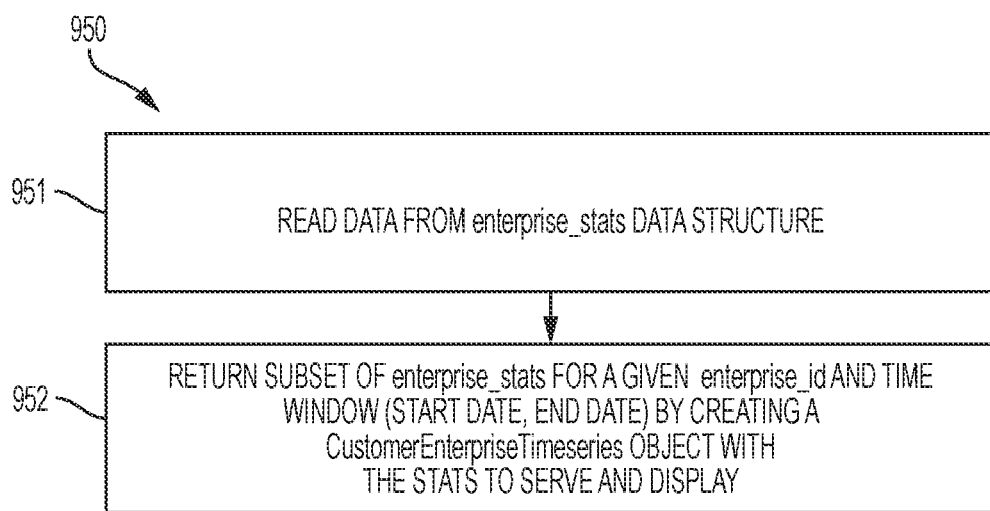

FIG. 9F illustrates an enterprise analytics serving flow for use with embodiments of the present disclosure. In embodiments, a subset of enterprise analytics statistics can be returned for a given enterprise identifier for a given time window (e.g., a network time window may have a start date and an end date). In embodiments, the given time window may be defined by a start date yyyy-MM-dd and an end date yyyy-MM-dd. In embodiments, the flow 950 for returning a subset of enterprise analytics statistics for a given enterprise identifier for a given time window begins with reading data from the enterprise_stats data structure defined above 951. In embodiments, flow 950 continues with returning the subset of enterprise analytics statistics for the given enterprise identifier for the given time window by creating an object containing the subset to serve and render for display on a client device 952. Examples of enterprise analytics statistics that can be served for a given enterprise identifier for a given time window are depicted in Table 17.

In embodiments, an object containing a partial subset of the enterprise analytics statistics for the given enterprise identifier for the given time window (e.g., data may already exist for the time window with the exception of one new day of data). In such an example, the object is read and the new data is appended to it.

TABLE 17

Exemplary Enterprise Analytics Statistics Available for a
Given Enterprise Identifier in a Given Time Window

```
struct CustomerEnterpriseTimeseries {
  1: string ds
  2: i64 enterprise_id
  3: optional i64 teams_count
  4: optional i64 full_members_count
  5: optional i64 guests_count
  6: optional i64 billable_active_count
  7: optional i64 readers_count_1d
  8: optional i64 writers_count_1d
  9: optional i64 readers_count_7d
  10: optional i64 writers_count_7d
  11: optional i64 chats_count_1d
  12: optional i64 messages_count_from_apps_1d
  13: optional i64 chats_channels_count_1d
  14: optional i64 chats_groups_count_1d
  15: optional i64 chats_shared_channels_count_1d
  16: optional i64 chats_dms_count_1d
  17: optional i64 cursor_marks_channels_count_1d
  18: optional i64 cursor_marks_groups_count_1d
  19: optional i64 cursor_marks_dms_count_1d
  20: optional i64 cursor_marks_shared_channels_count_1d
  21: optional i64 files_count_1d
}
```

Exemplary Processes for Rendering Enterprise
Analytics for Display

FIGS. 10A-10B illustrate an exemplary enterprise analytics analysis process for use with embodiments of the present disclosure. Method 1000 begins with receiving 1001, from a client device, a first analytics request for an enterprise analytics analysis. In embodiments, the first analytics request may comprise a date range, an enterprise analytics metric level, an enterprise analytics visualization type, and one or more enterprise analytics metrics.

Method 1000 continues with retrieving a first enterprise interaction data structure by the low latency data communications module 1002. In embodiments, the first enterprise interaction data structure is retrieved based on the date range, the enterprise analytics metric level, and the one or more enterprise analytics metrics.

Method 1000 continues with formatting the first enterprise interaction data structure according to the enterprise analytics visualization type into a first enterprise analytics analysis 1003.

Method 1000 continues with transmitting the first enterprise analytics analysis to the requesting client device 1004. In embodiments, first enterprise analytics analysis is configured to be rendered for display on the client device.

In some embodiments, method 1000 can optionally continue with transmitting the first enterprise analytics analysis in an electronic message to an electronic inbox associated with a user profile associated with the enterprise group-based communication system 1005.

FIGS. 10C-10D illustrate an exemplary enterprise analytics process for use with embodiments of the present disclosure. In embodiments, method 1010 is a continuation of method 1000.

Method 1010 begins with receiving a first enterprise analytics analysis modify request from the client device 1011. In embodiments, the first enterprise analytics analysis modify request comprises one or more of a revised date range, a revised enterprise metric level, a revised enterprise analytics visualization type, and one or more revised enterprise analytics metrics.

Method 1010 continues with retrieving a second enterprise interaction data structure from the enterprise interaction data in the low latency data communications module 1012. In embodiments, the second enterprise interaction data structure is retrieved based on any of the revised date range, revised enterprise metric level, and one or more revised enterprise analytics metrics.

Method 1010 continues with formatting the second enterprise interaction data structure according to one of the enterprise analytics visualization type or the revised enterprise analytics visualization type into a second enterprise analytics analysis 1013.

Method 1010 continues with transmitting the second enterprise analytics analysis to the client device 1014. In embodiments, the second analytics analysis is configured to be rendered for display on the client device.

In embodiments, method 1010 can optionally continue with storing the first enterprise analytics analysis and the second enterprise analytics analysis in the enterprise group-based communication analytics repository or in the low latency data communications module 1015.

In embodiments, method 1010 can optionally continue with receiving a third enterprise analytics request from the client device 1016. In embodiments, the third enterprise analytics request comprising an identifier associated with the first enterprise analytics analysis.

In embodiments, method 1010 can optionally continue with retrieving the first enterprise analytics analysis 1017 and transmitting the first enterprise analytics analysis to the client device 1018.

It will be appreciated that the analytics computational engine 305 has previously provided the enterprise interaction data structures to the low latency data communication module 306 (step 565). It will also be appreciated that, at any point in the process, additional enterprise interaction data may be retrieved from the enterprise group-based communication analytics repository 301.

In some embodiments, the enterprise interaction data comprises one or more of user account creations, direct message transmissions, enterprise group-based communication channels created, enterprise group-based communication channels joined, messages read, messages written, feature uses, emoji uses, cursor mark movements, files uploaded, files downloaded, group-based communication channel deletions, user account deletions, calls placed, teams joined, and teams created.

In some embodiments, the enterprise analytics visualization type is one of a line graph, a pie chart, a chart, a table, a word cloud, a graphic, a network graph, and a graph.

In some embodiments, the enterprise analytics metric level is one of enterprise, team, group, group-based communication channel, user, third party resource, feature, and workspace.

FIG. 11 illustrates an exemplary organization level enterprise analytics architecture for use with embodiments of the present disclosure. An organization level enterprise analytics architecture 1100 can be arranged including an overview interface 1101, a team table interface 1102, a channels table interface 1103, a member table interface 1104, a team overview interface 1105, a team member table interface 1106, and a team channel table interface 1107.

Figure 12:
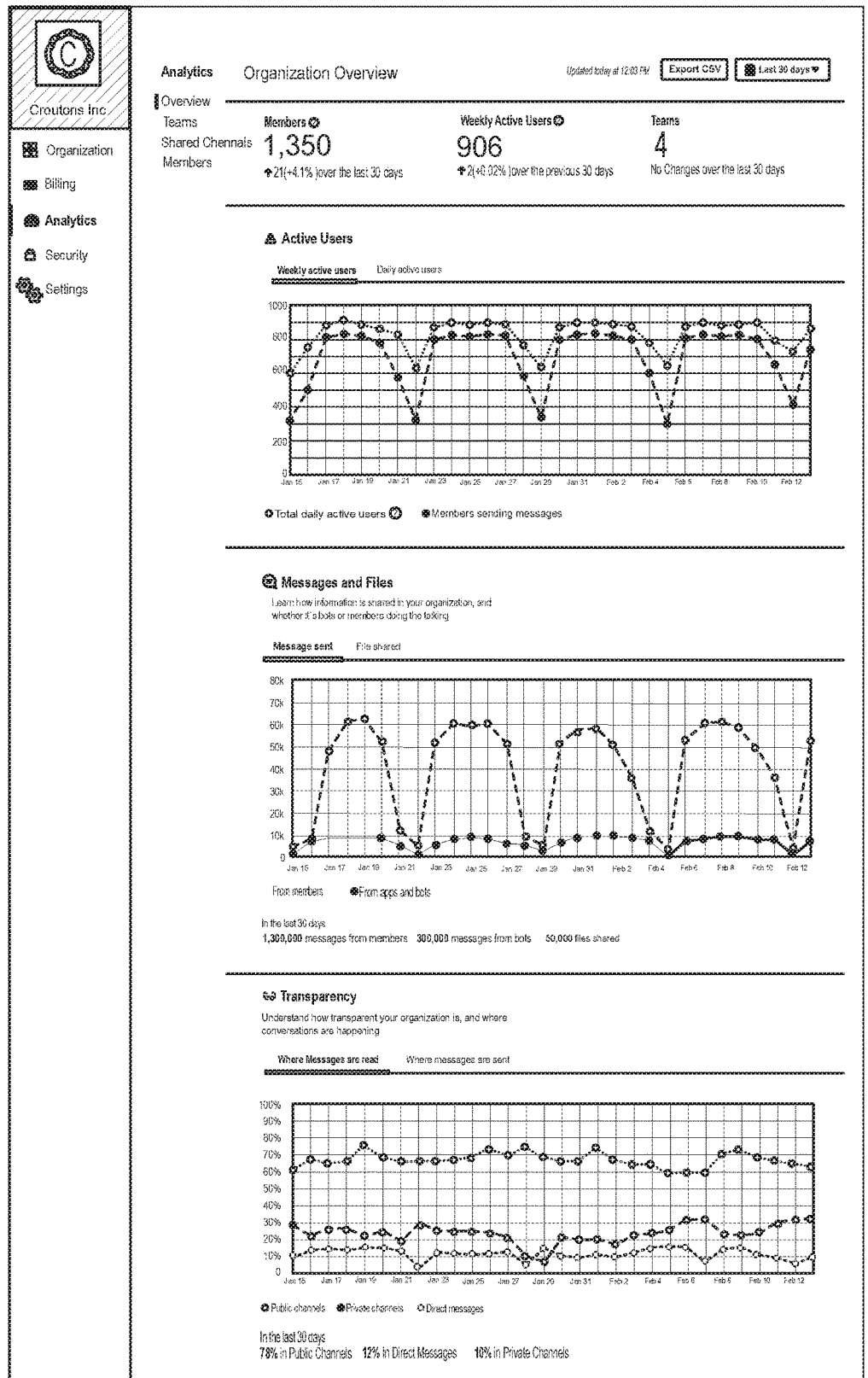

FIG. 12 illustrates an exemplary interface for use with embodiments of the present disclosure. Interface 1200 illustrates top level details associated with enterprise analytics that may be considered important for enterprise/organizational administrators.

Figure 13:
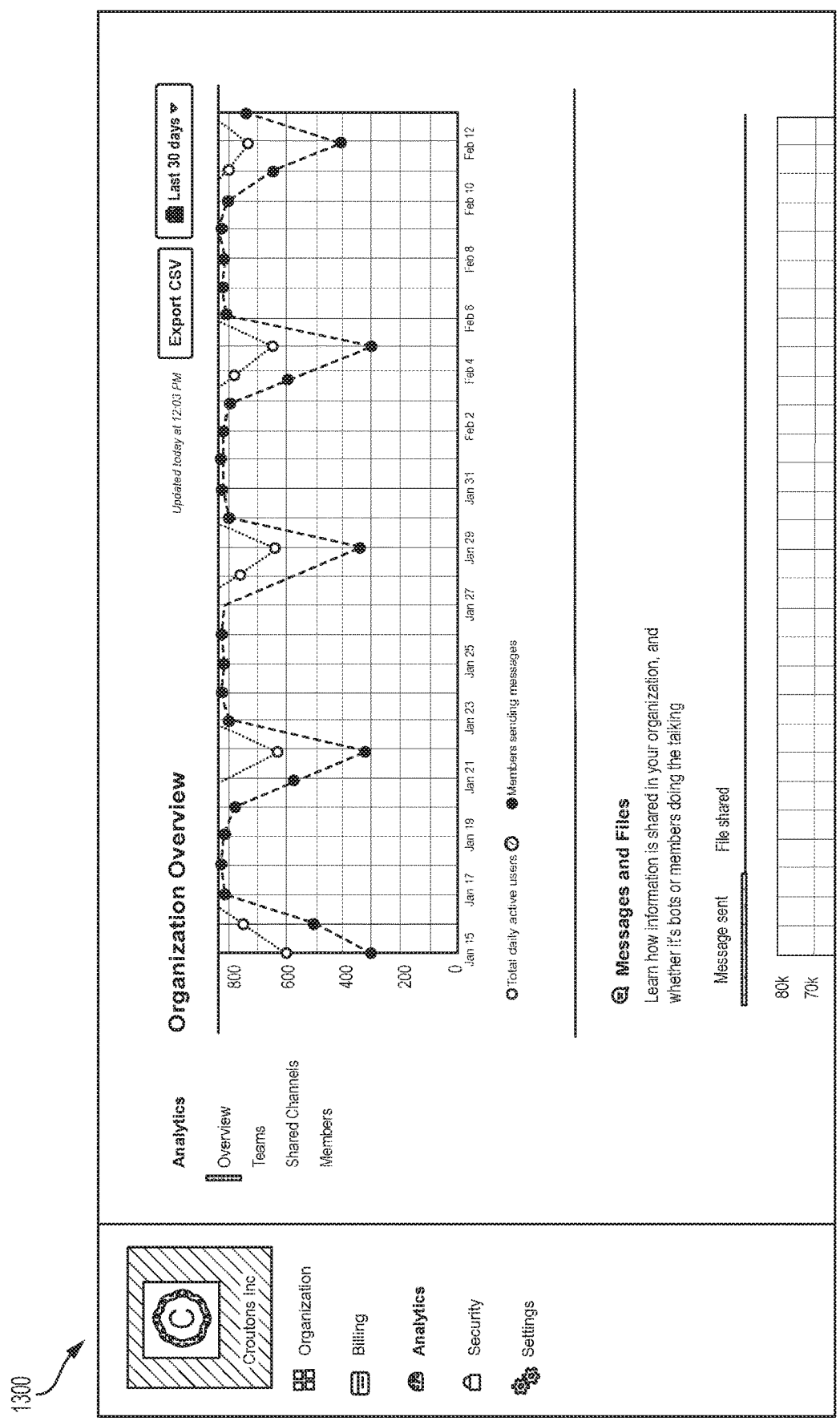

FIG. 13 illustrates an exemplary interface for use with embodiments of the present disclosure. Interface 1300 illustrates that a header on an Overview interface can be fixed above the content to allow easy access to interface actions. In embodiments, headers can include a page title, an option to "Export CSV," and access to a "Date Picker."

Figure 14:
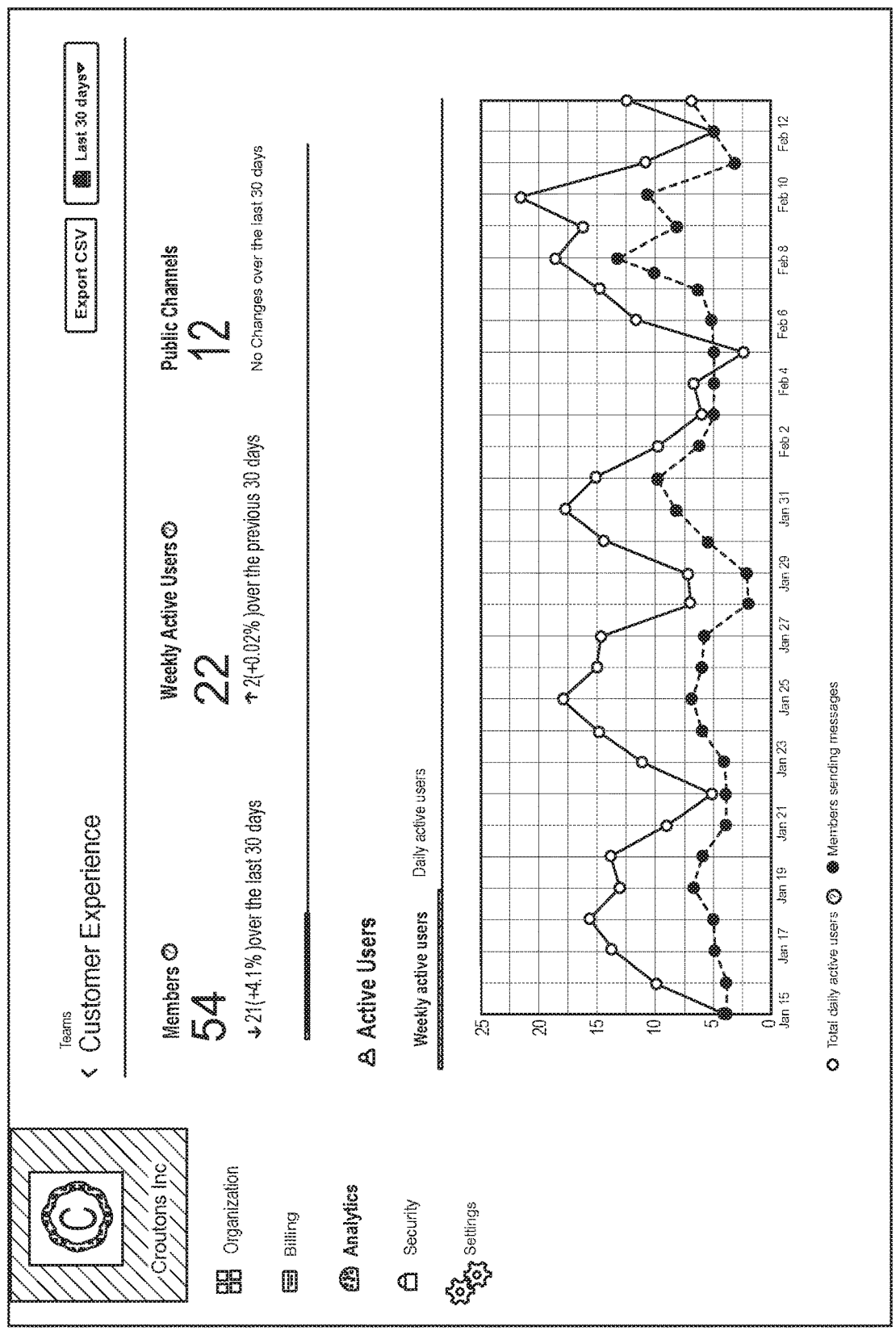

FIG. 14 illustrates an exemplary interface for use with embodiments of the present disclosure. Interface 1400 illustrates a Teams overview interface.

FIG. 15 illustrates an exemplary interface for use with embodiments of the present disclosure. Interface 1500 illustrates a Channels interface for the Customer Experience team.

Figure 16:
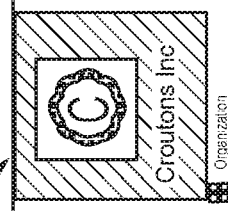

FIG. 16 illustrates an exemplary interface for use with embodiments of the present disclosure. Interface 1600 illustrates a Teams interface within an organization or enterprise.

Figure 17:
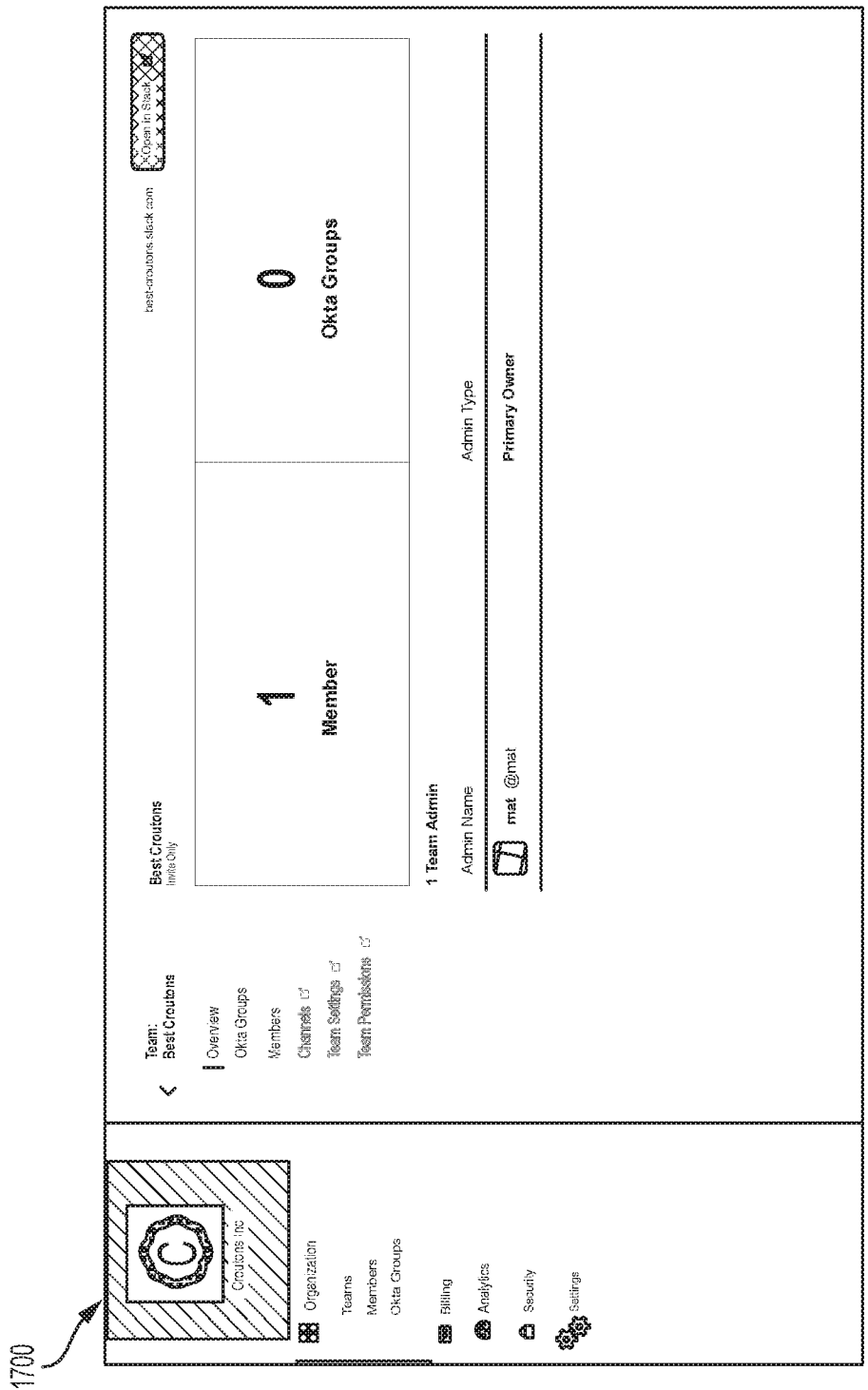

FIG. 17 illustrates an exemplary interface for use with embodiments of the present disclosure. Interface 1700 illustrates a specific interface for a team "Best Croutons."

Figure 18:
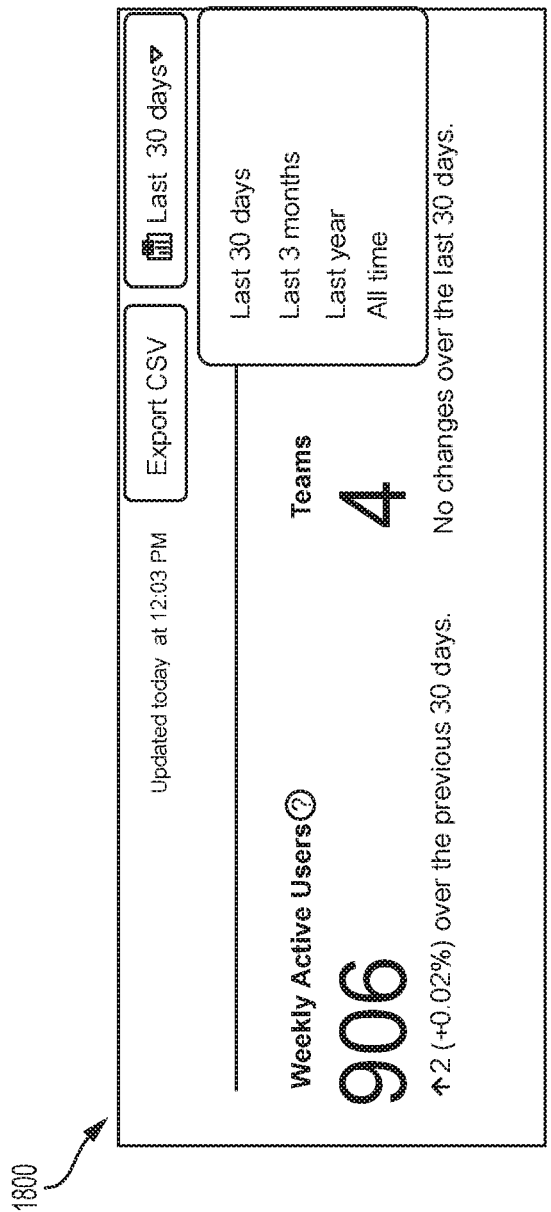

FIG. 18 illustrates an exemplary interface for use with embodiments of the present disclosure. Interface 1800 illustrates a date picker interface.

Figure 19:
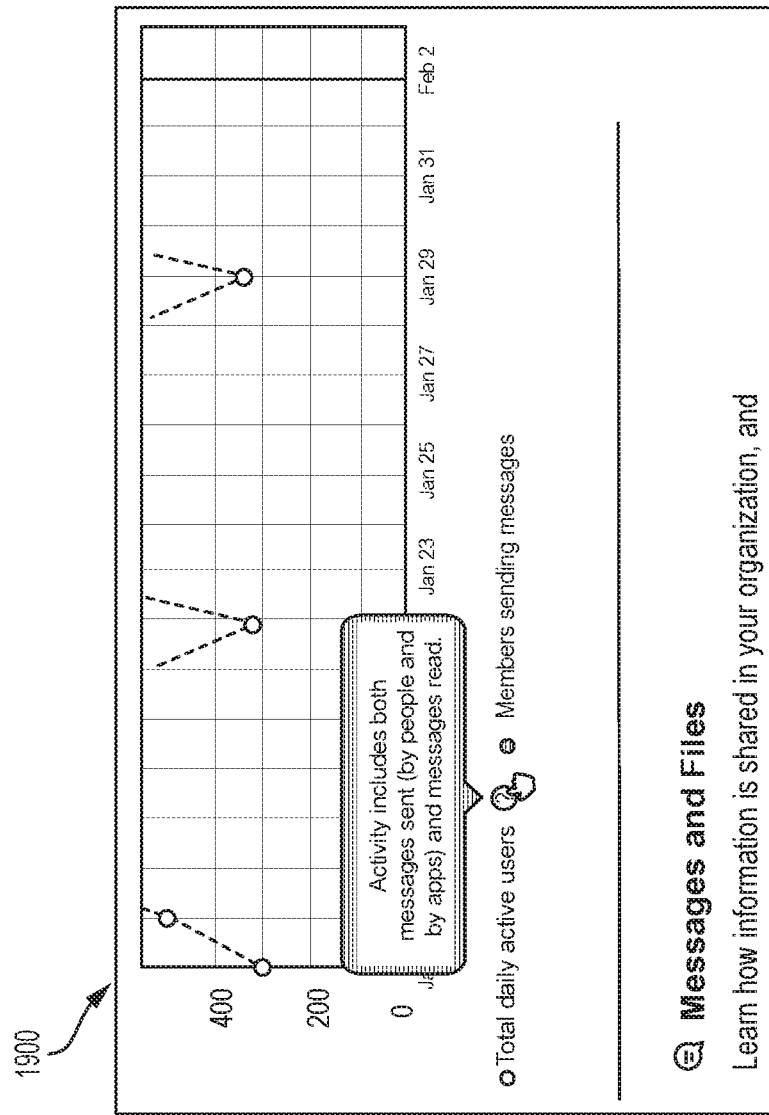

FIG. 19 illustrates an exemplary interface for use with embodiments of the present disclosure. Interface 1900 illustrates that question marks next to terms in an interface indicate that hovering over them will display a tool tip with additional explanation about the metric.

Figure 20:

FIG. 20 illustrates an exemplary interface for use with embodiments of the present disclosure. Interface 2000 illustrates that number callouts show a selection of key metrics from an organization/enterprise. In embodiments, numbers with gains are rendered in a different color or font from numbers with no changes or negative changes.

Figure 21:
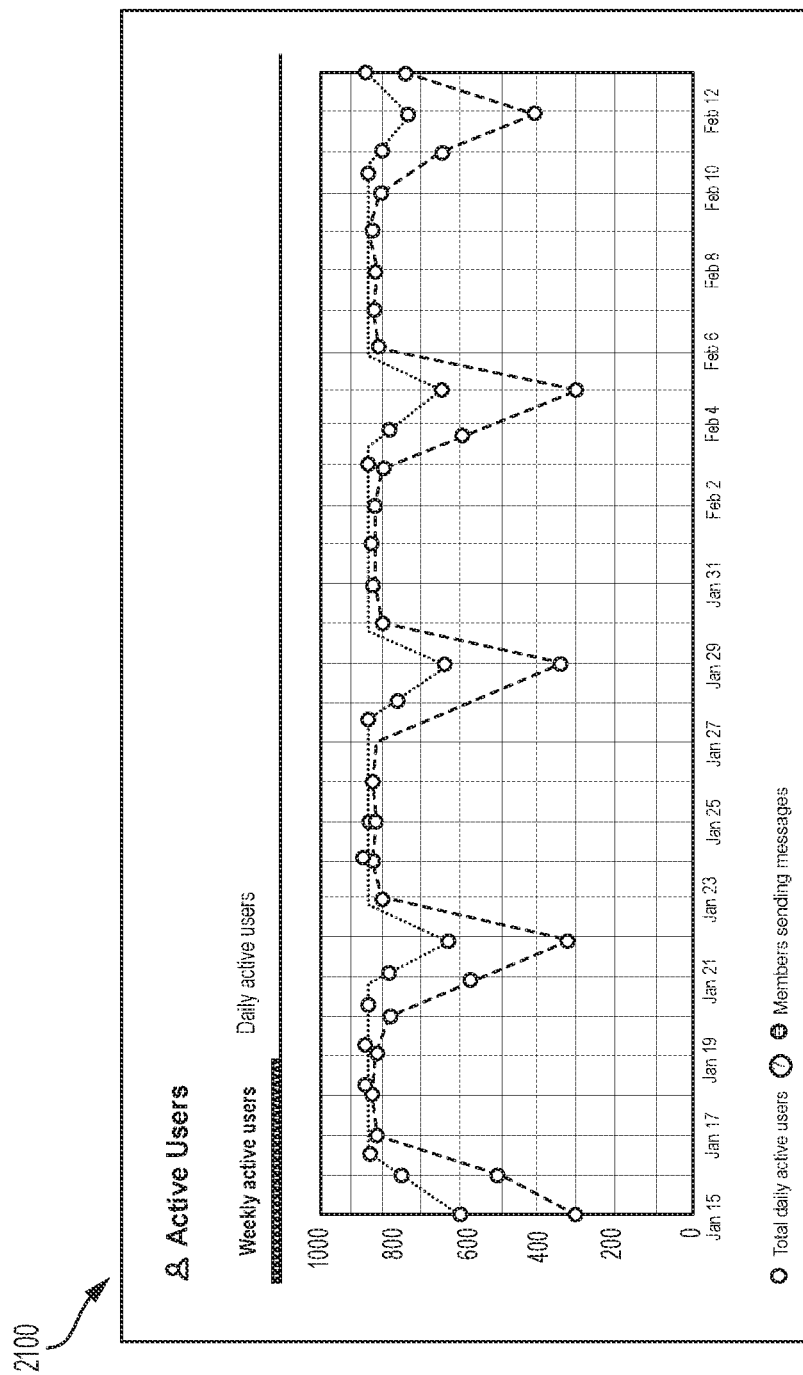

FIG. 21 illustrates an exemplary interface for use with embodiments of the present disclosure. Interface 2100 illustrates a line graph of weekly active users. According to embodiments, charts (e.g., line graphs) can have a title, a description, and different key color palettes. Charts allow for flexible width. Selecting, by a client device input device, a graph or chart key can hide or display the key on the client device display.

Figure 22:
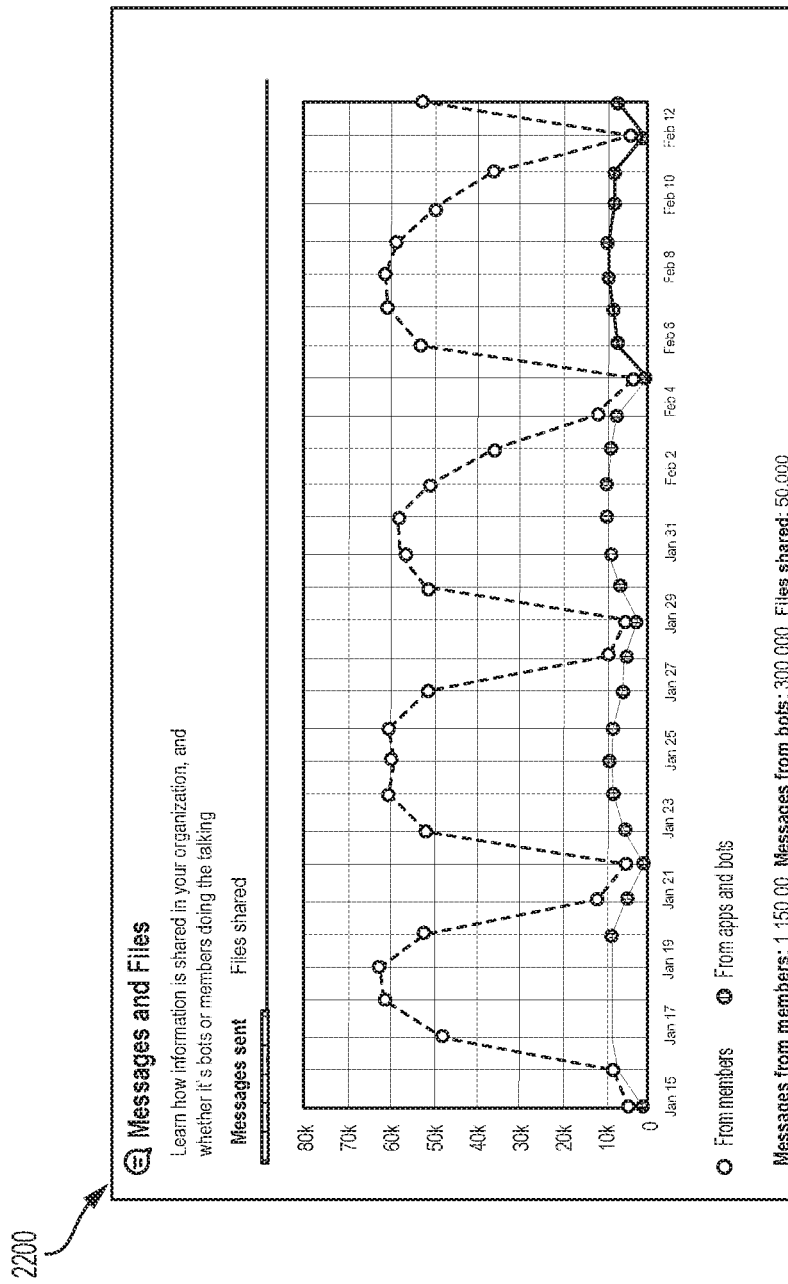

FIG. 22 illustrates an exemplary interface for use with embodiments of the present disclosure. Interface 2200 illustrates a line graph of messages sent over time.

Figure 23:
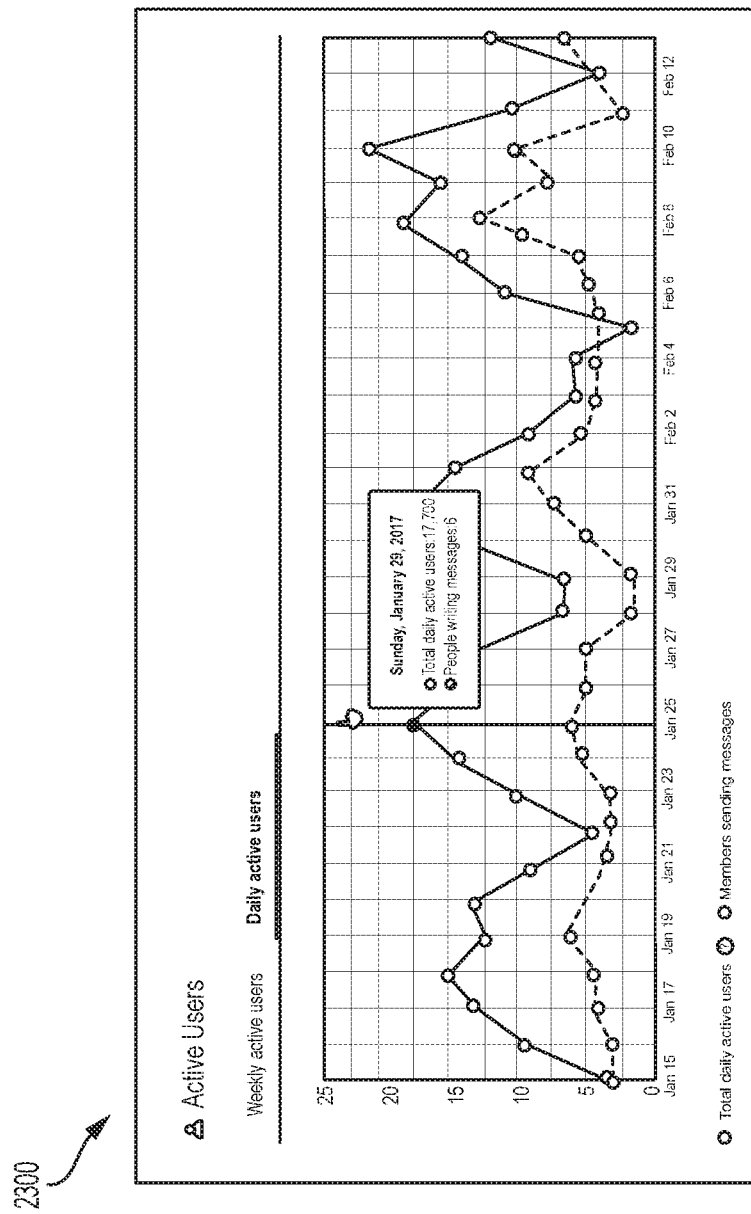

FIG. 23 illustrates an exemplary interface for use with embodiments of the present disclosure. Interface 2300 illustrates a line graph of daily active users.

Figure 24:
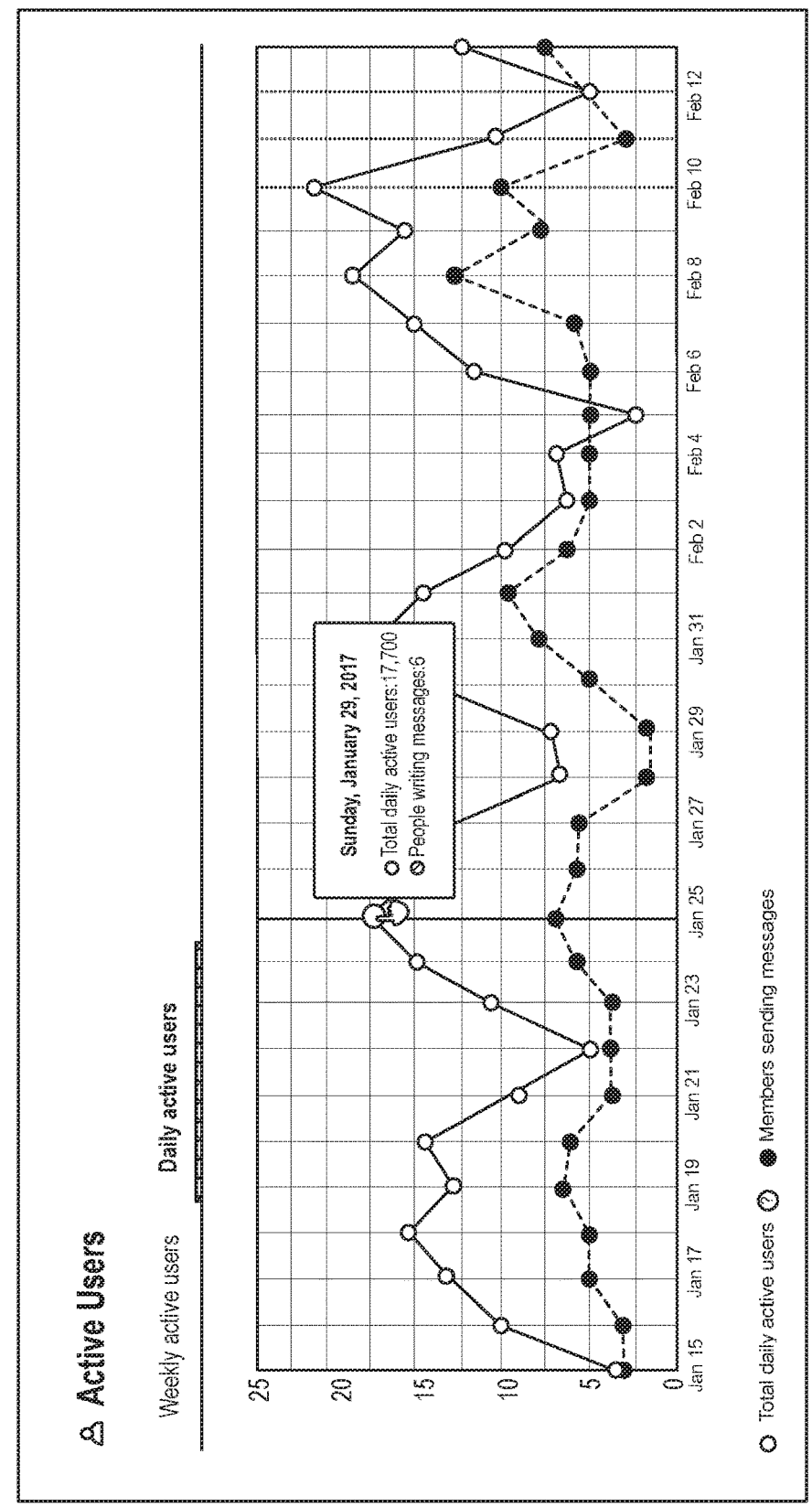

FIG. 24 illustrates an exemplary interface for use with embodiments of the present disclosure. Interface 2400 illustrates a line graph of daily active users. In embodiments, and as shown in interfaces 2300 and 2400, hovering over any portion of a chart shows details of values on the line hovered upon. In embodiments, when a specific line is hovered, the line is brought in front of all other lines (e.g., on the z-axis) and a dot on the line scales up a percentage (e.g., 15%).

Figure 25:
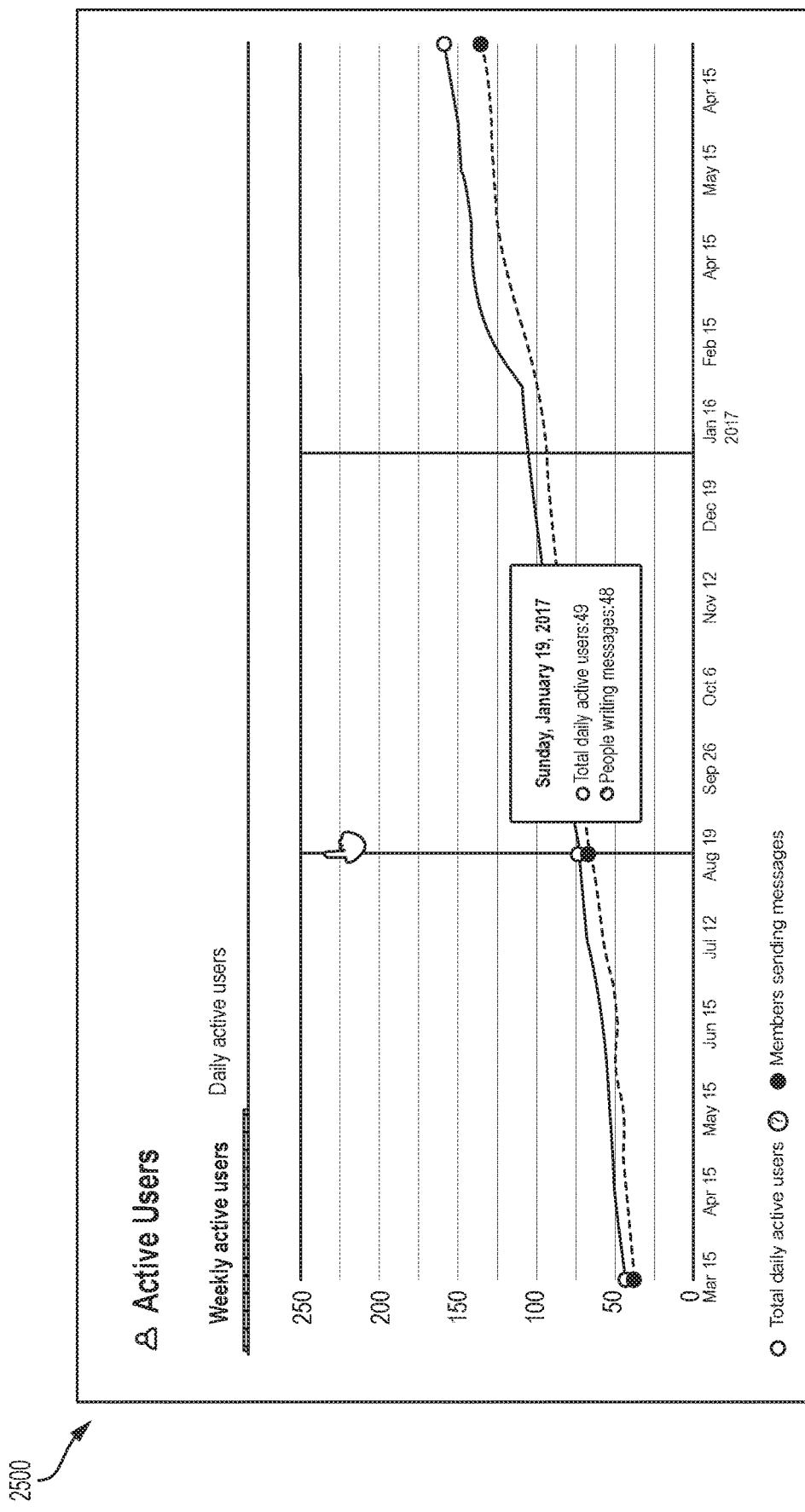

FIG. 25 illustrates an exemplary interface for use with embodiments of the present disclosure. Interface 2500 illustrates a line graph of weekly active users. In interface 2500, a date range exceeds thirty days, and therefore vertical lines are displayed differently on the chart. In embodiments, when the range is more than 30 days, vertical lines are displayed on a monthly basis. In embodiments, when the range is more than 1 year, vertical lines are displayed on an annual basis. In embodiments, when the range is more than 1 year, years are also displayed on the x-axis.

Figure 26:
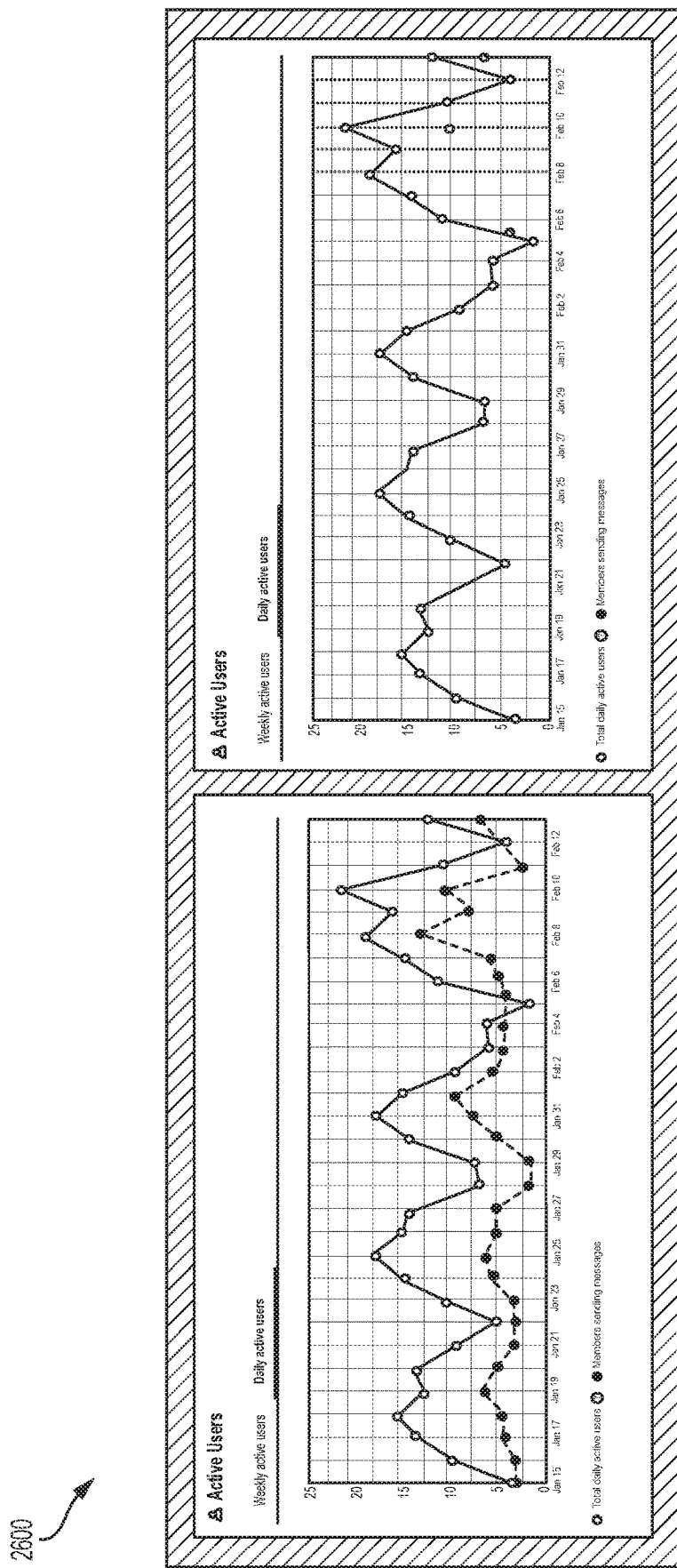

FIG. 26 illustrates an exemplary interface for use with embodiments of the present disclosure. Interface 2600 illustrates the ability to hide a line (e.g., a line is displayed on the left graph and not on the right). In embodiments, clicking on a legend item hides an associated line.

Figure 27:
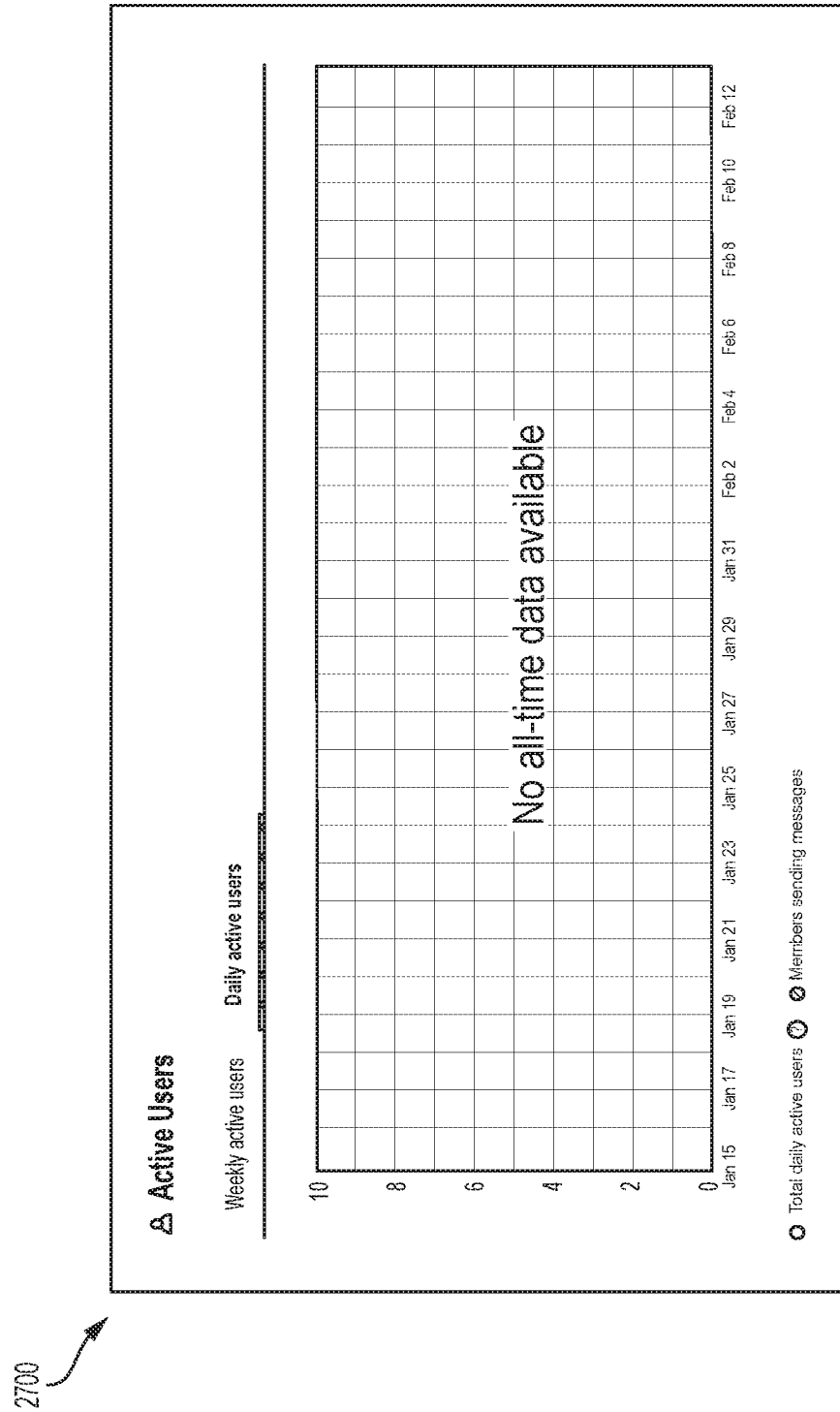

FIG. 27 illustrates an exemplary interface for use with embodiments of the present disclosure. Interface 2700 illustrates an empty chart. In embodiments, when a chart is empty, it fades to a percentage of opacity (e.g., 20% opacity).

Figure 28:
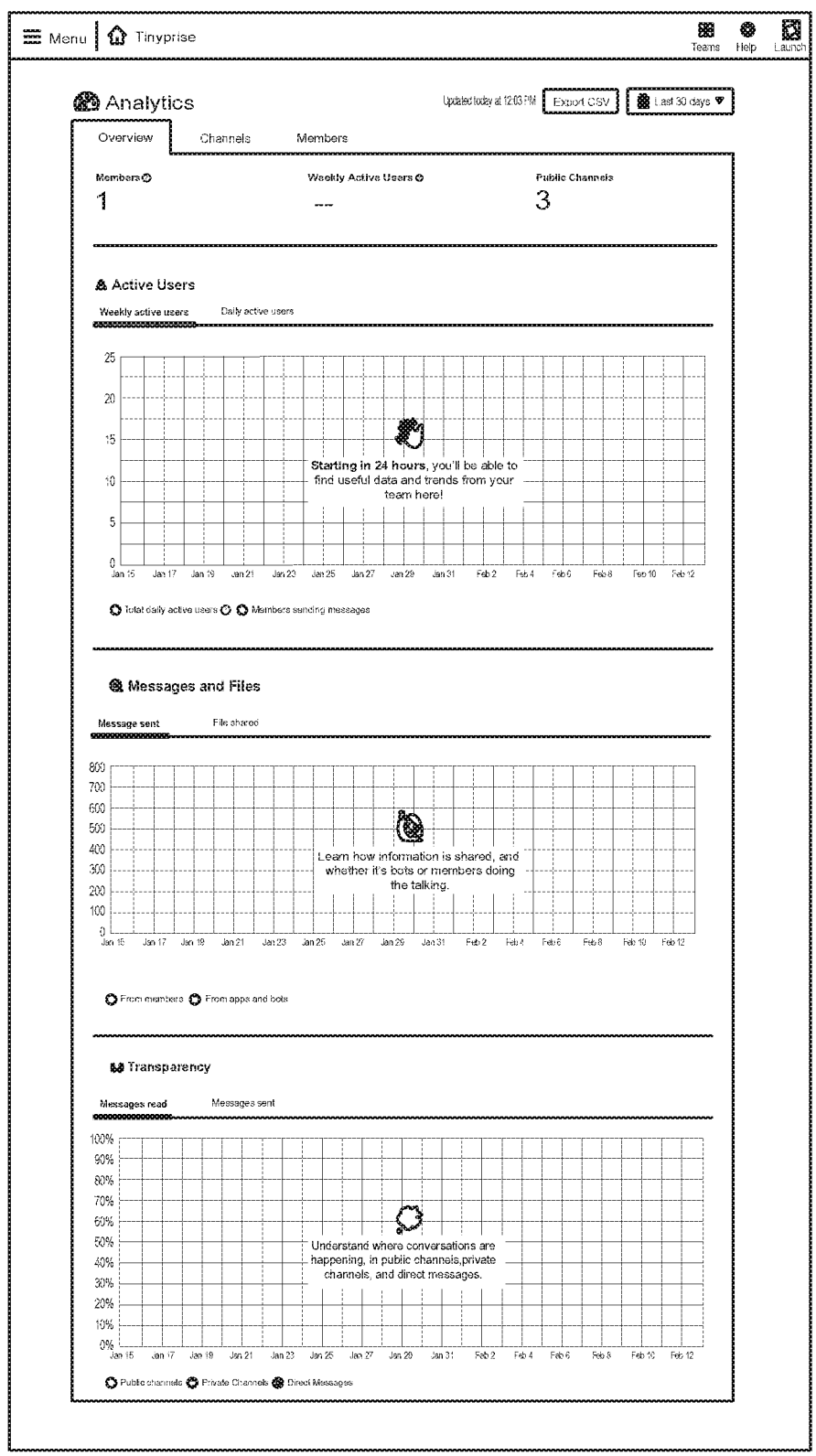

FIG. 28 illustrates an exemplary interface for use with embodiments of the present disclosure. Interface 2800 illustrates an overview for which no data is available (i.e., empty overview).

Figure 29:
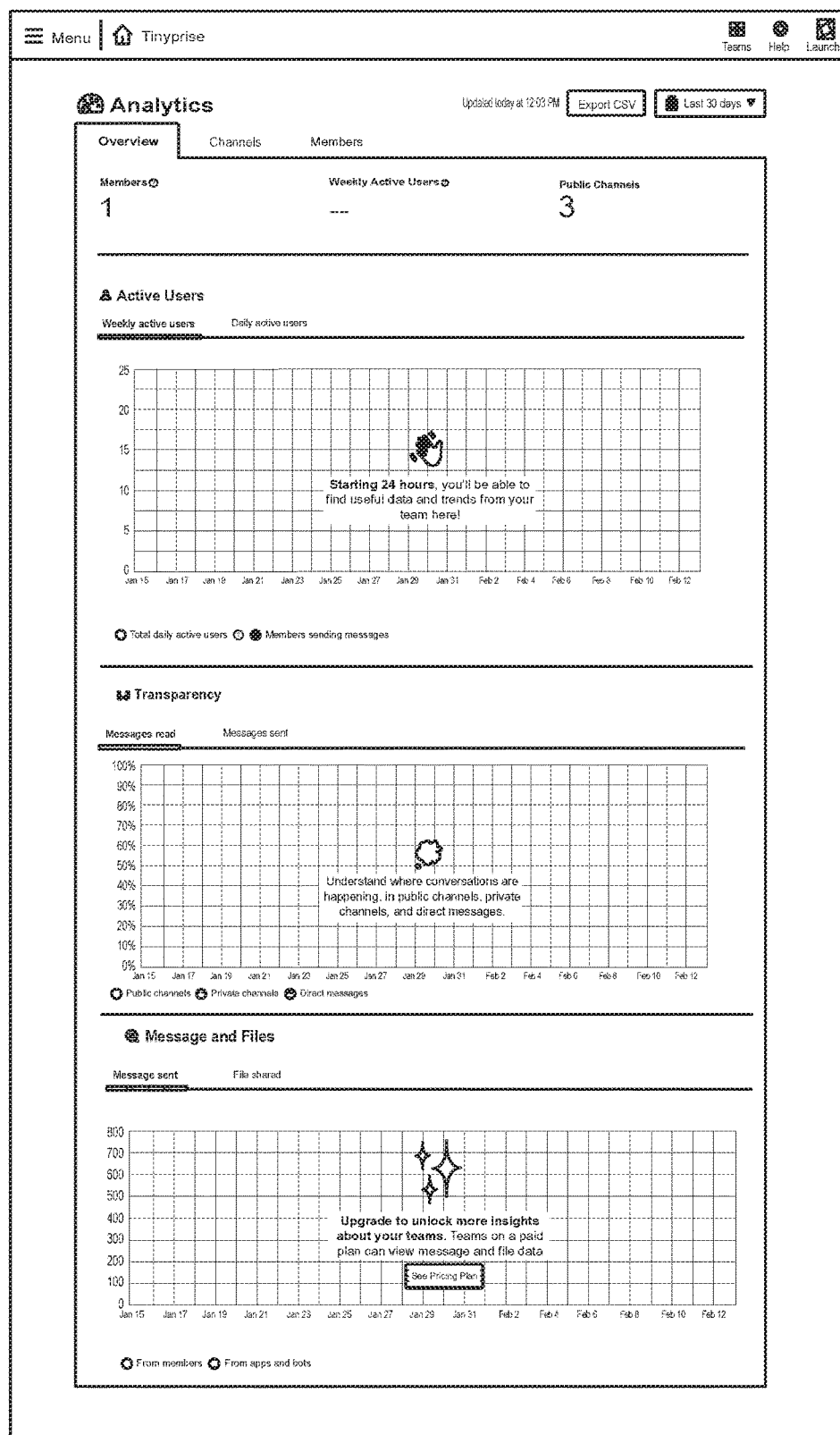

FIG. 29 illustrates an exemplary interface for use with embodiments of the present disclosure. Interface 2900 illustrates an overview for which no data is available (i.e., empty overview).

Figure 30:
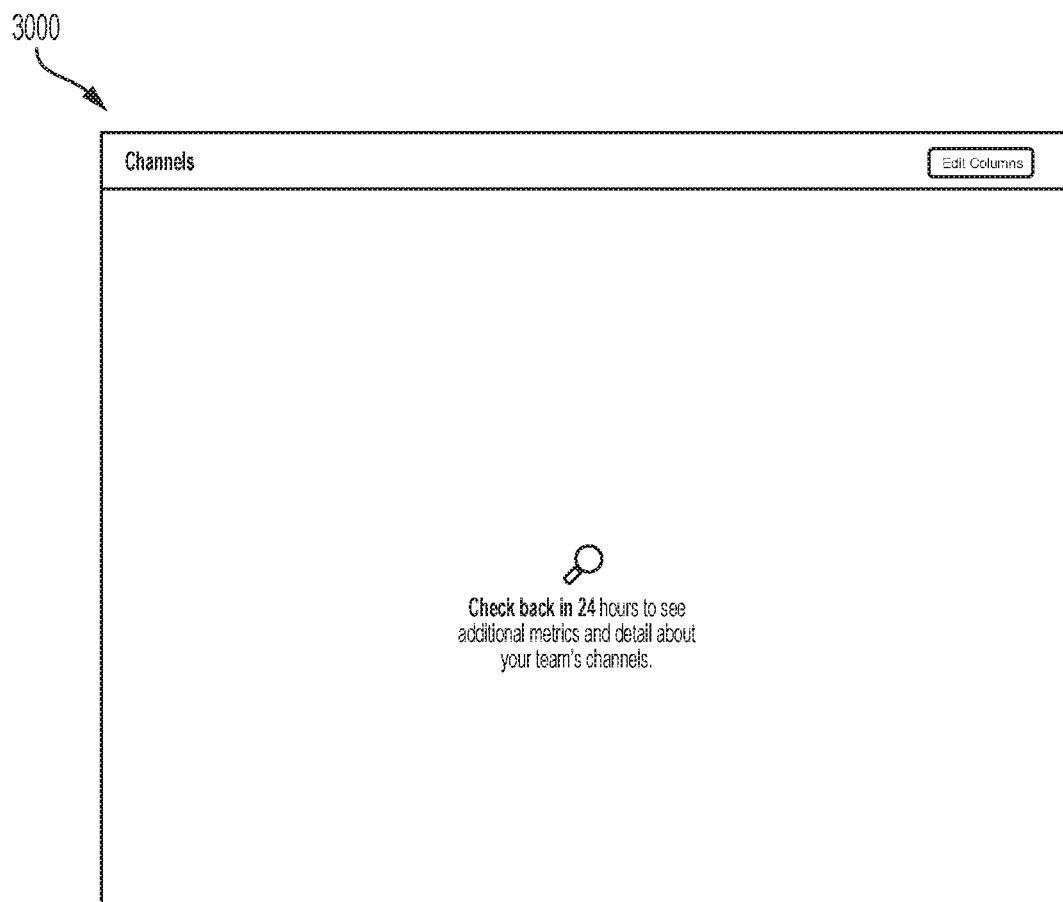

FIG. 30 illustrates an exemplary interface for use with embodiments of the present disclosure. Interface 3000 illustrates an overview for which no data is available (i.e., empty overview).

Figure 31:
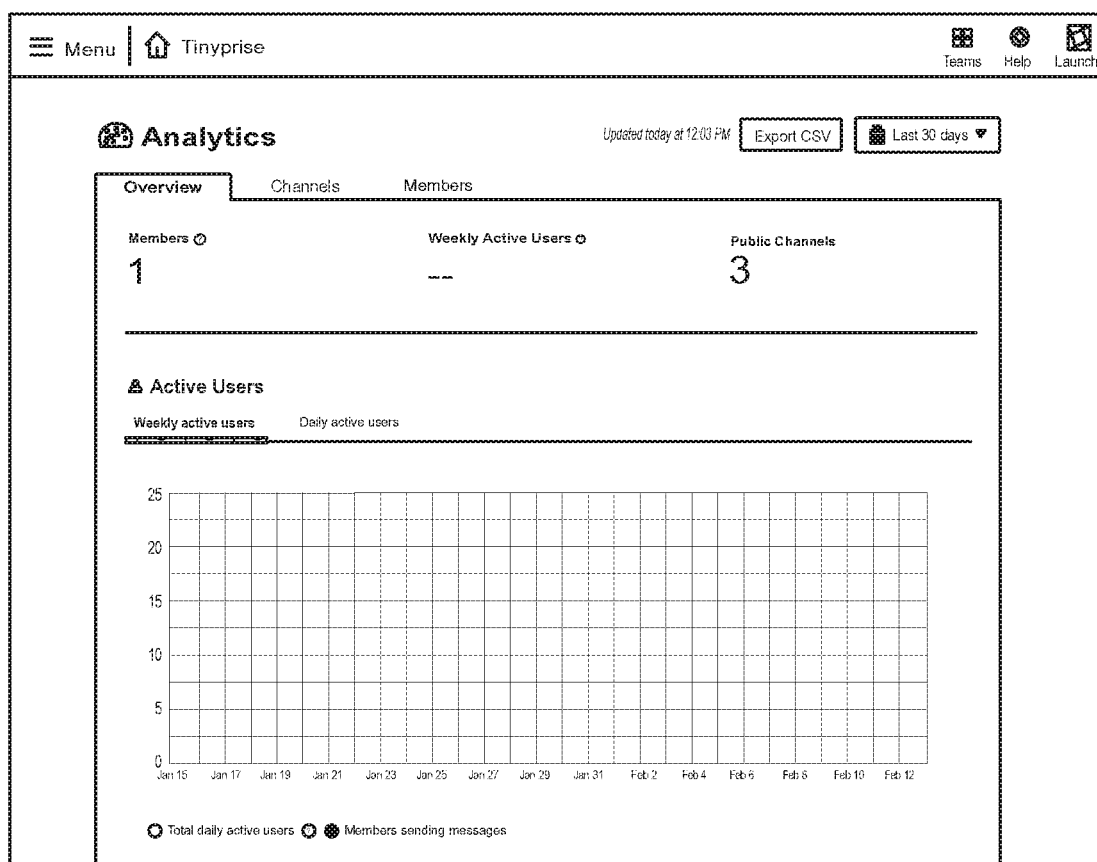

FIG. 31 illustrates an exemplary interface for use with embodiments of the present disclosure. Interface 3100 illustrates an overview for which no data is available (i.e., empty overview).

Figure 32:
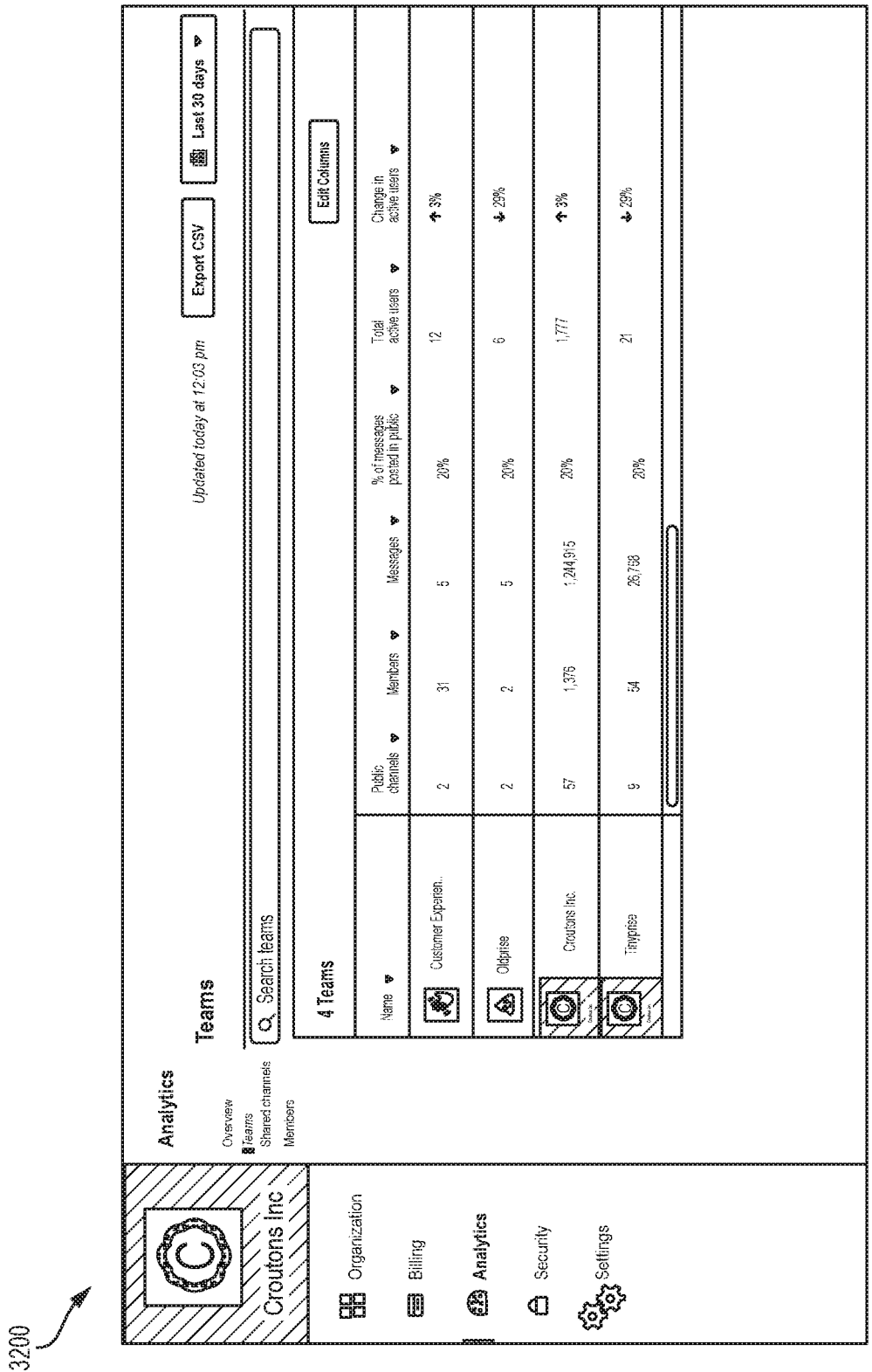

FIG. 32 illustrates an exemplary interface for use with embodiments of the present disclosure. Interface 3200 illustrates an interface including a list of teams for an organization. In embodiments, charts are available for Active Users, Messages & Files, and Public & Private messages.

FIG. 33 illustrates an exemplary interface for use with embodiments of the present disclosure. Interface 3300 illustrates possible Team Table columns. Tables are sortable by column, filterable through a field on the top of the interface, customizable by clicking a cog in the upper right-hand corner of the interface, and provide the ability to scroll both vertically and horizontally. In embodiments, possible columns include: Name; Members; Messages; Messages read in public channels; Active users; Change in active users; Messages from people; Messages from apps and bots; Files shared; Messages in public channels; Messages in shared channels; Messages in private channels; Direct messages; Cross-team direct messages.

Figure 34:
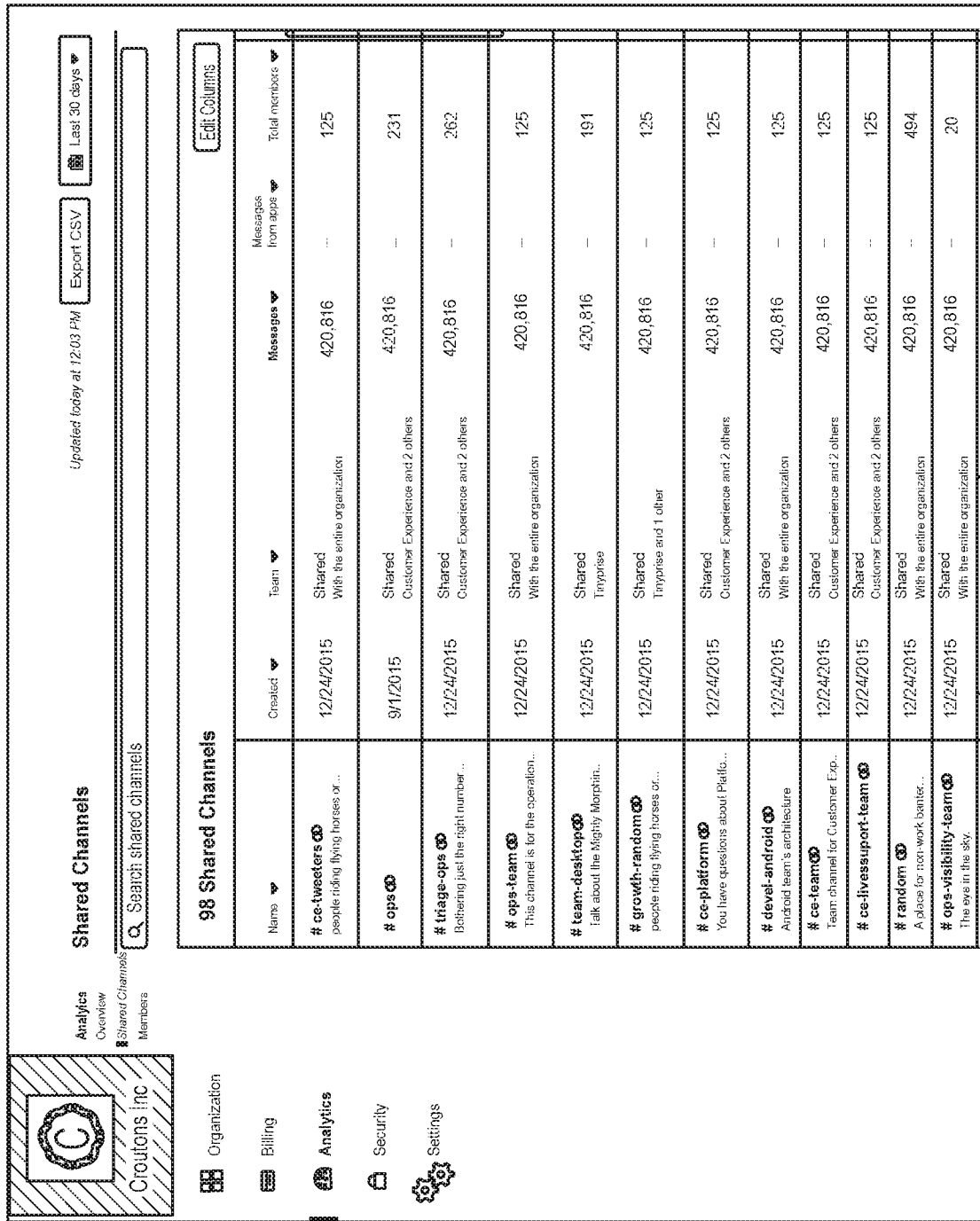

FIG. 34 illustrates an exemplary interface for use with embodiments of the present disclosure. Interface 3400 illustrates a Shared Channels Table interface.

FIG. 35 illustrates an exemplary interface for use with embodiments of the present disclosure. Interface 3500 illustrates possible Shared Channels Table columns. In embodiments, possible columns include: Name; Created date; Team/Shared; Active members; Total members; Messages from people; Message from apps and bots; Members who wrote a message; Members who read a message; Members who reacted.

Figure 36:

FIG. 36 illustrates an exemplary interface for use with embodiments of the present disclosure. Interface 3600 illustrates a Members Table interface.

FIG. 37 illustrates an exemplary interface for use with embodiments of the present disclosure. Interface 3700 illustrates possible Members Table columns. In embodiments, possible columns include: Name; Team; Account type; Group; Days active; Last activity; Username; Billable (yes/no); Account created; Messages sent.

Figure 38:

FIG. 38 illustrates an exemplary interface for use with embodiments of the present disclosure. Interface 3800 illustrates possible a Customize Table interface. In embodiments, tables can be customized in real-time by selecting "Edit Columns." The drop down menu shows a list of all available columns. Checking a column displays it in the table. Clicking "reset defaults" returns the column set to its default state.

Figure 39:
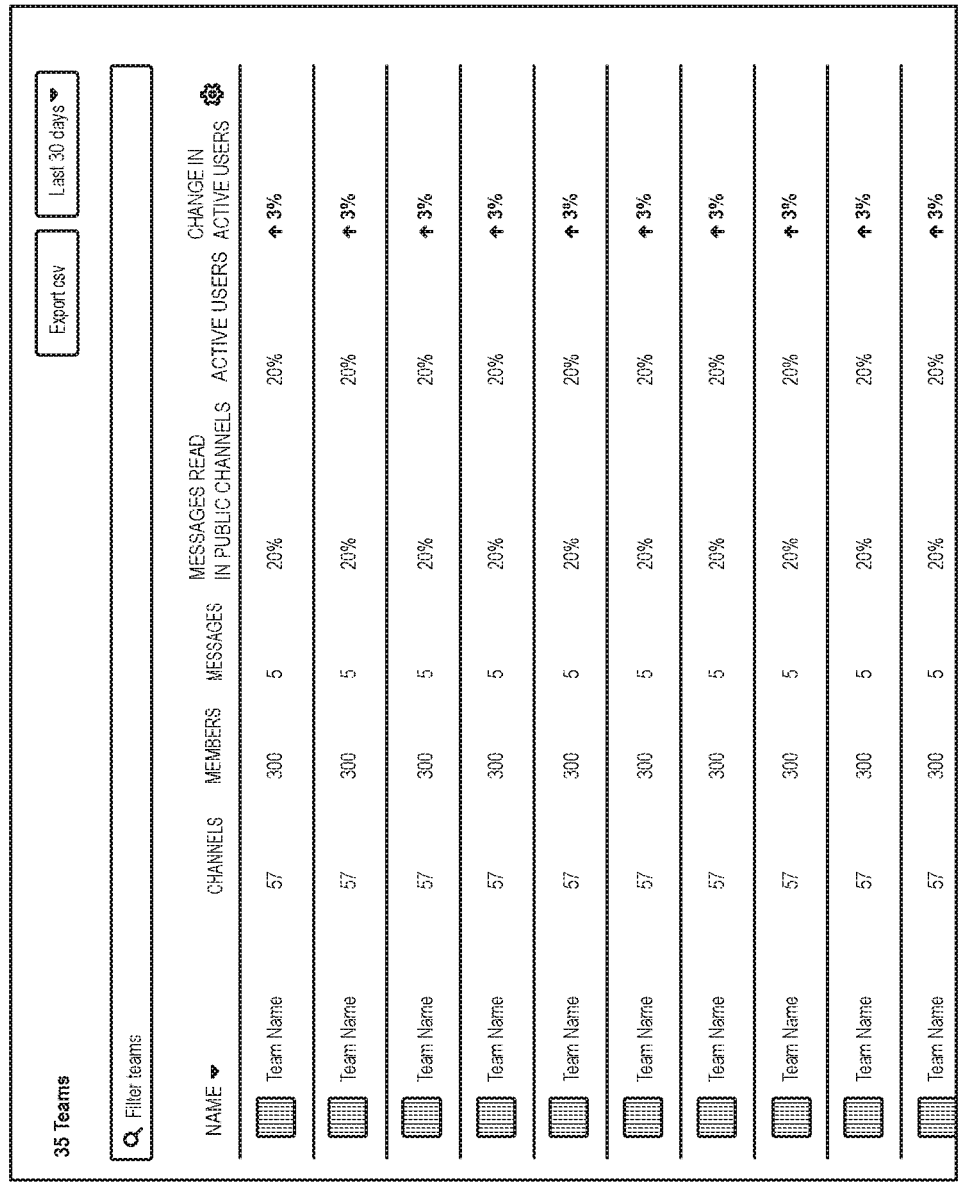
Figure 44:

FIG. 39 illustrates an exemplary interface for use with embodiments of the present disclosure. Interface 3900 illustrates customized interface according to the menu in interface 3100.

FIG. 40 illustrates an exemplary interface for use with embodiments of the present disclosure. Interface 4000 illustrates changes in the interface that occur from hovering over a row. In embodiments, hovering a row highlights the row. In embodiments, hovering linked text underlines the text. In embodiments, clicking anywhere within a cell with a link opens the link. In embodiments, hovering a row with no data displays a tooltip.

FIGS. 41-43 illustrate exemplary interfaces for use with embodiments of the present disclosure. Interfaces 4100, 4200, and 4300 illustrate changes in the interface that occur from hovering over a sorting option.

Figure 45:
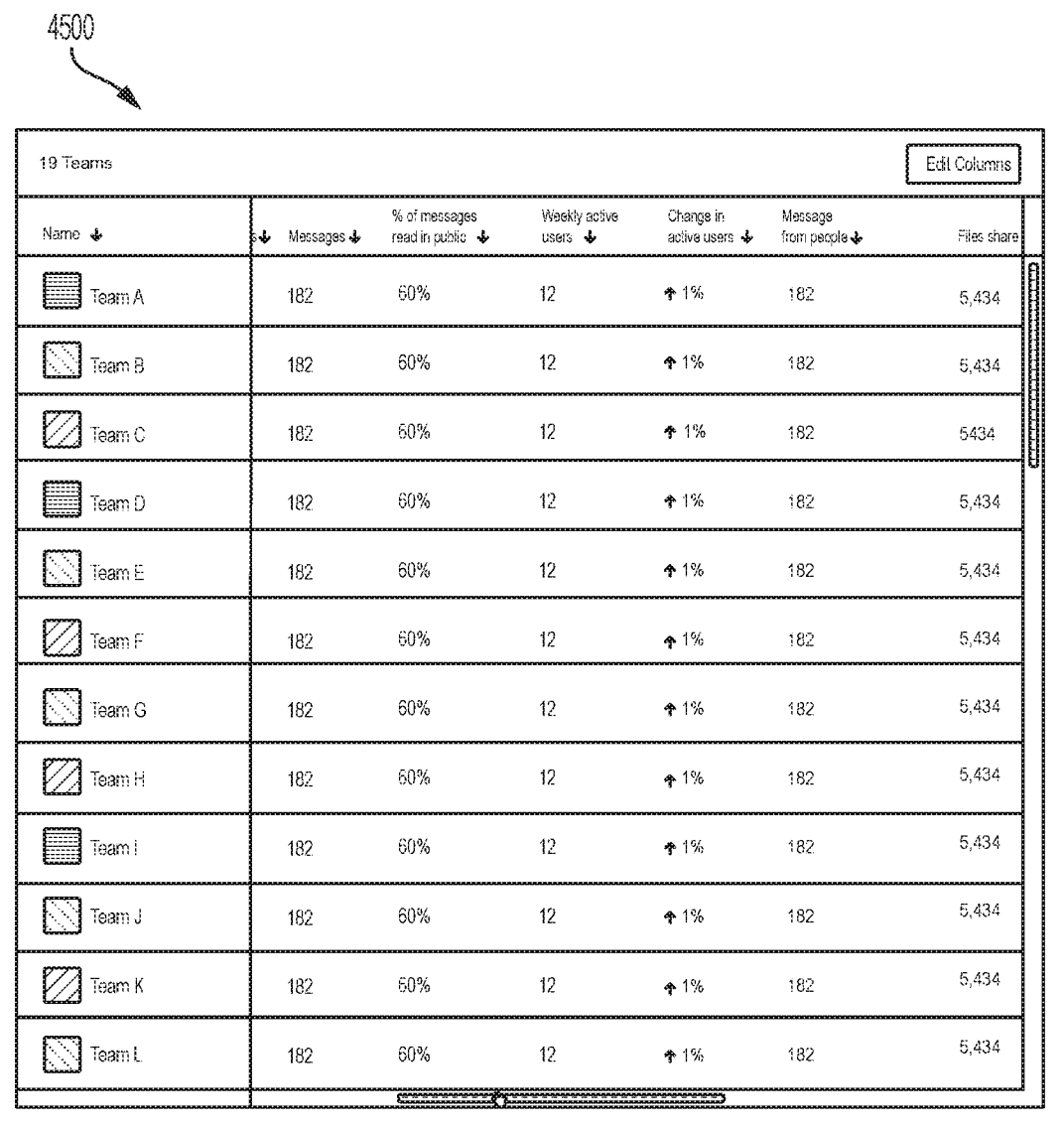

FIGS. 44-47 illustrate exemplary interfaces for use with embodiments of the present disclosure. Interfaces 4400-4700 illustrate a horizontally scrolling table.

Figure 48:
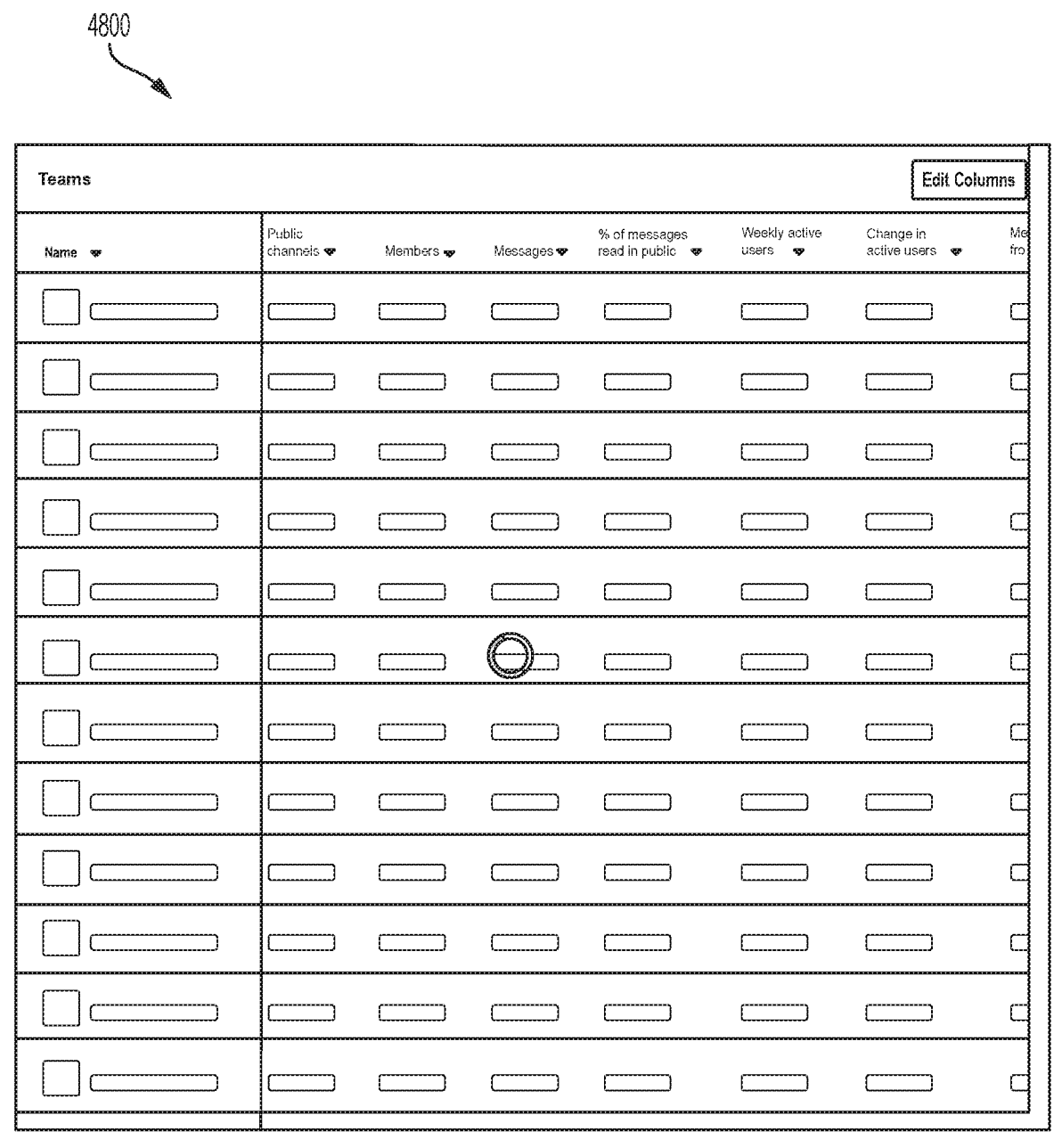

FIG. 48 illustrates an exemplary interface for use with embodiments of the present disclosure. Interface 4800 illustrates ghosted rows and a spinner for when a table first loads.

Figure 49:
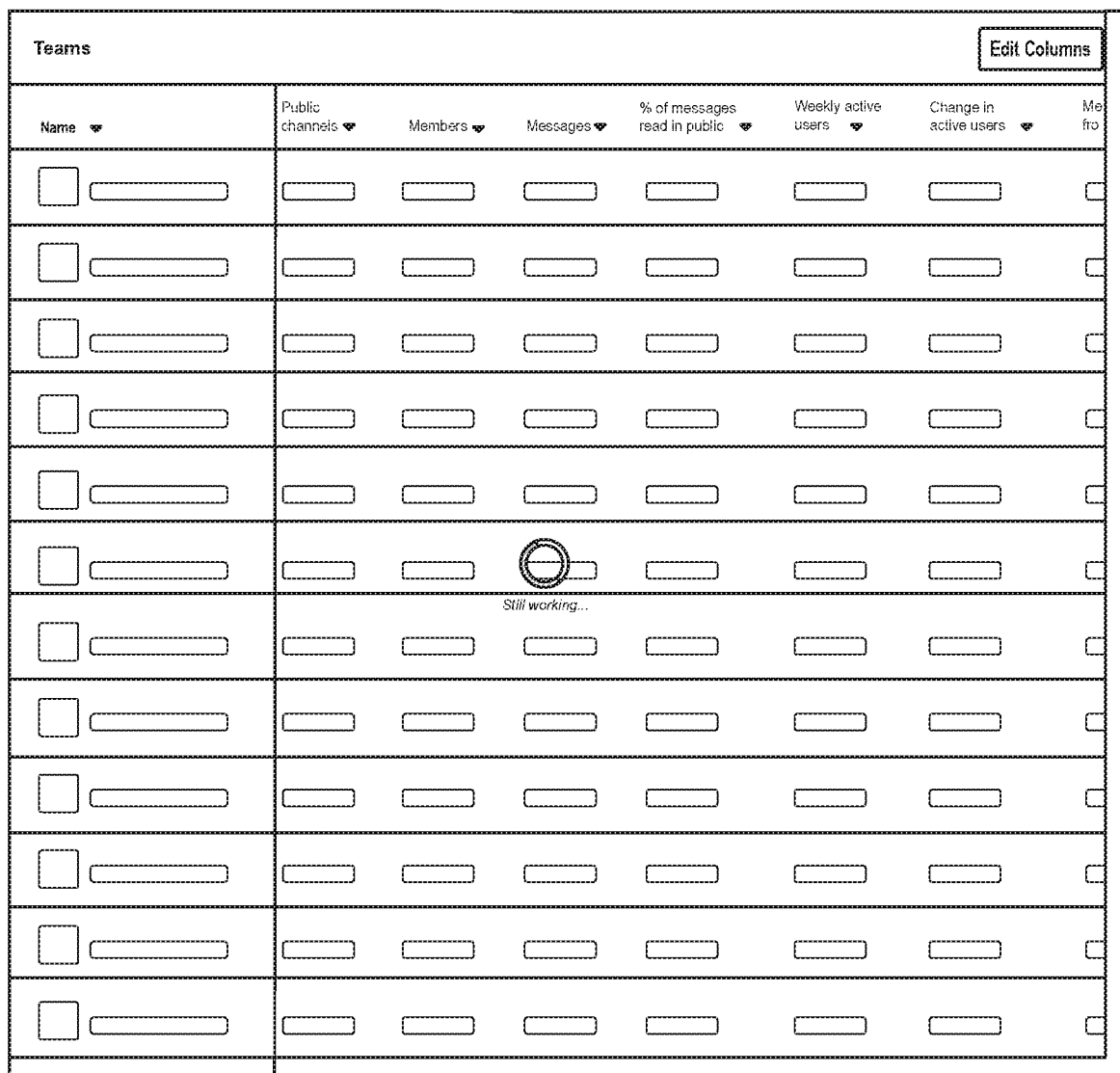

FIG. 49 illustrates an exemplary interface for use with embodiments of the present disclosure. Interface 4900 illustrates ghosted rows and a spinner as long as a "still working" indication if the loading of the table is delayed.

FIG. 50 illustrates an exemplary interface for use with embodiments of the present disclosure. Interface 5000 illustrates loaded rows fading into an interface.

Figure 51:

FIG. 51 illustrates an exemplary interface for use with embodiments of the present disclosure. Interface 5100 illustrates ghosted rows and a spinner for when a table is being updated.

Figure 52:
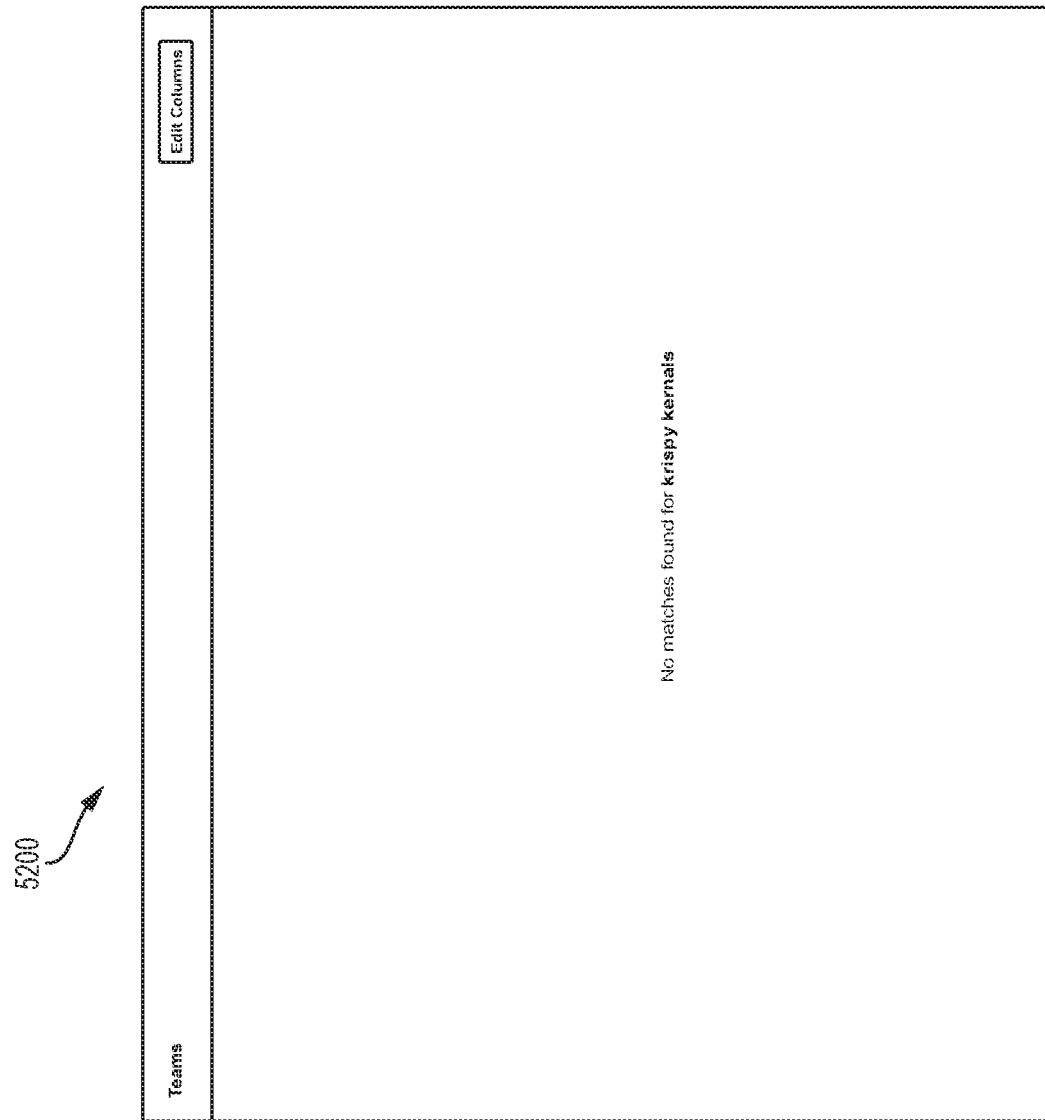

FIG. 52 illustrates an exemplary interface for use with embodiments of the present disclosure. Interface 5200 illustrates an error message for when no data is found.

Figure 53:
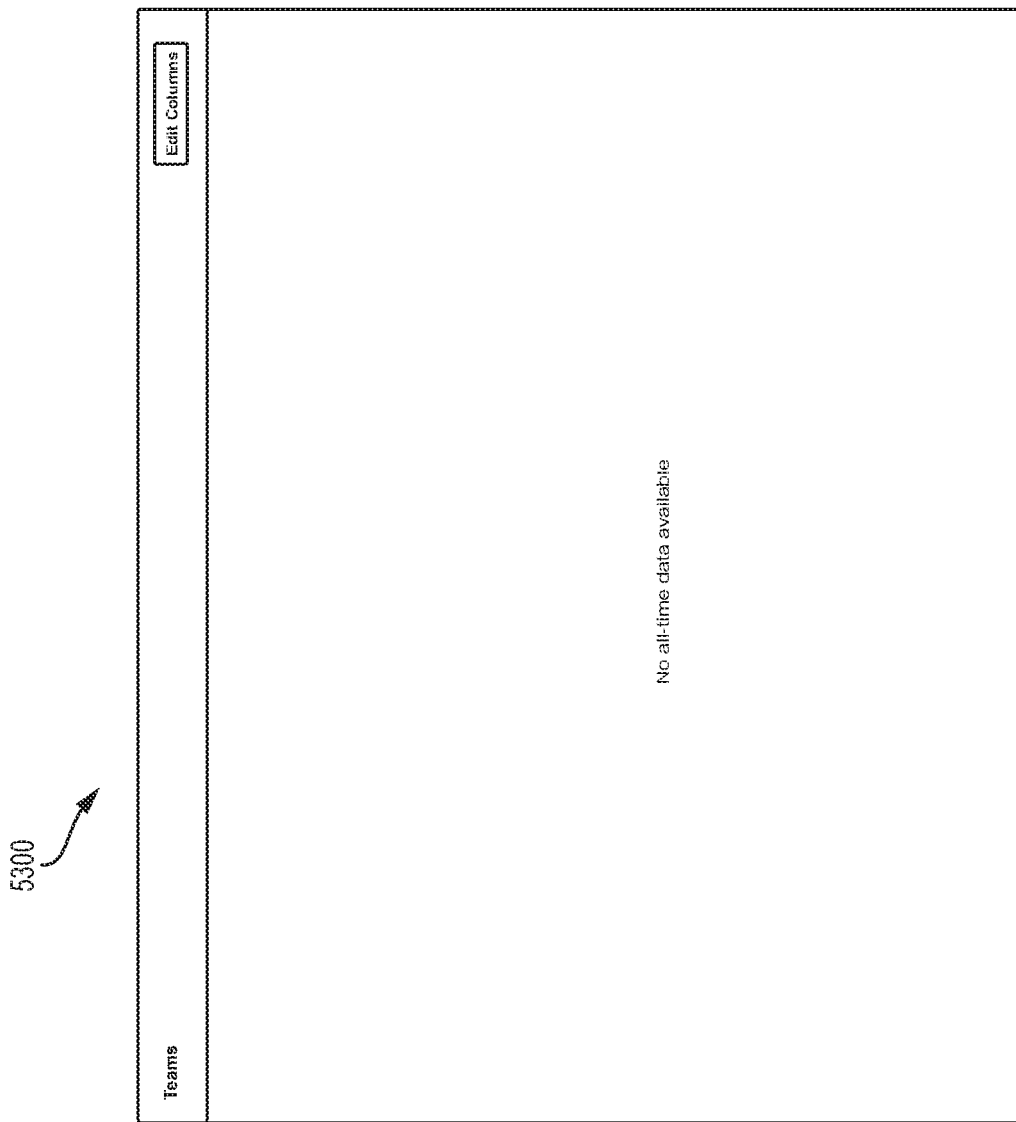

FIG. 53 illustrates an exemplary interface for use with embodiments of the present disclosure. Interface 5300 illustrates a no data state.

Figure 54:
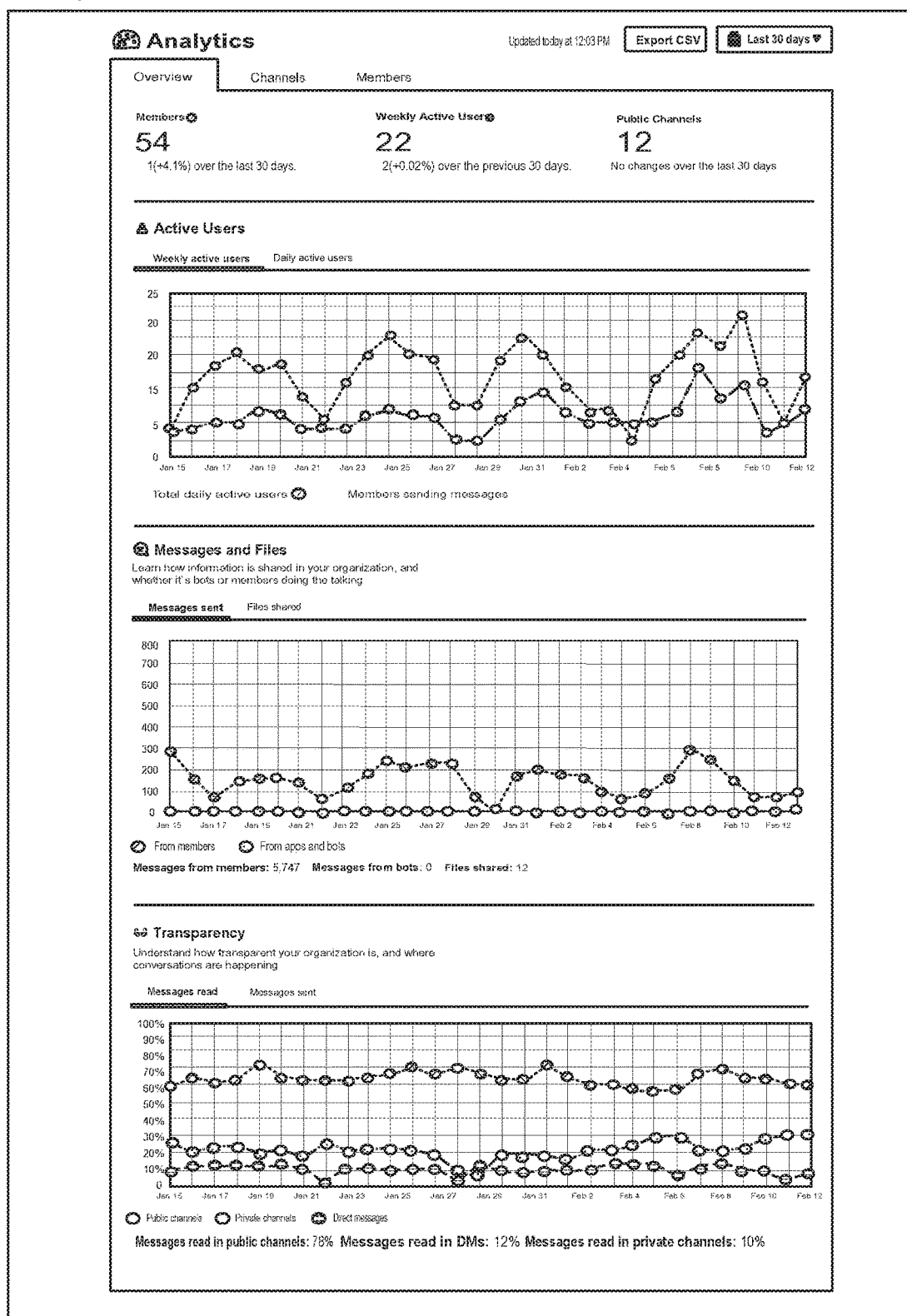

FIG. 54 illustrates an exemplary interface for use with embodiments of the present disclosure. Interface 5400 illustrates a Team Overview interface.

Figure 55:
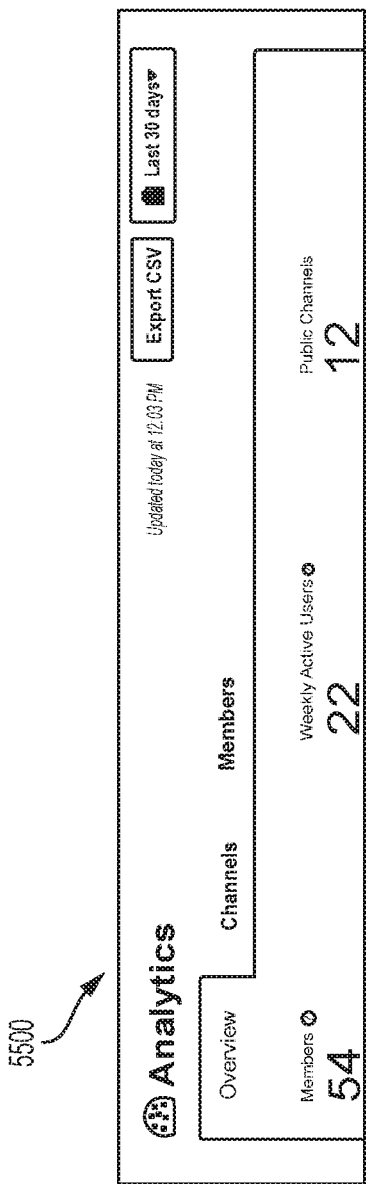

FIG. 55 illustrates an exemplary interface for use with embodiments of the present disclosure. Interface 5500 illustrates that a Team Overview interface includes an Overview tab, a Channels tab, and a Members tab.

Figure 56:
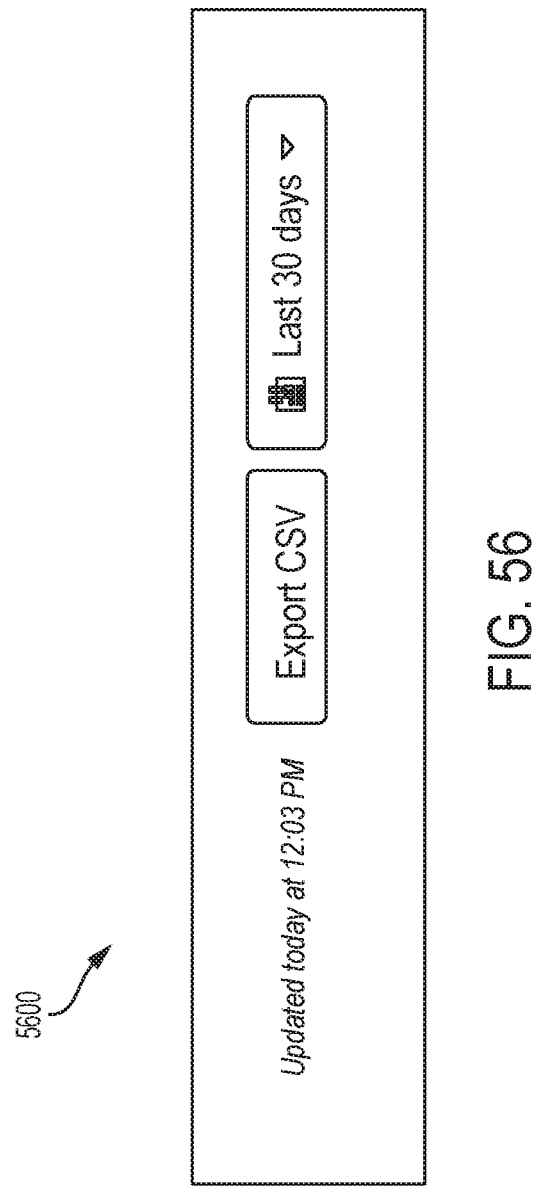

FIG. 56 illustrates an exemplary interface for use with embodiments of the present disclosure. Interface 5600 illustrates a date picker from interface 4900.

Figure 57:
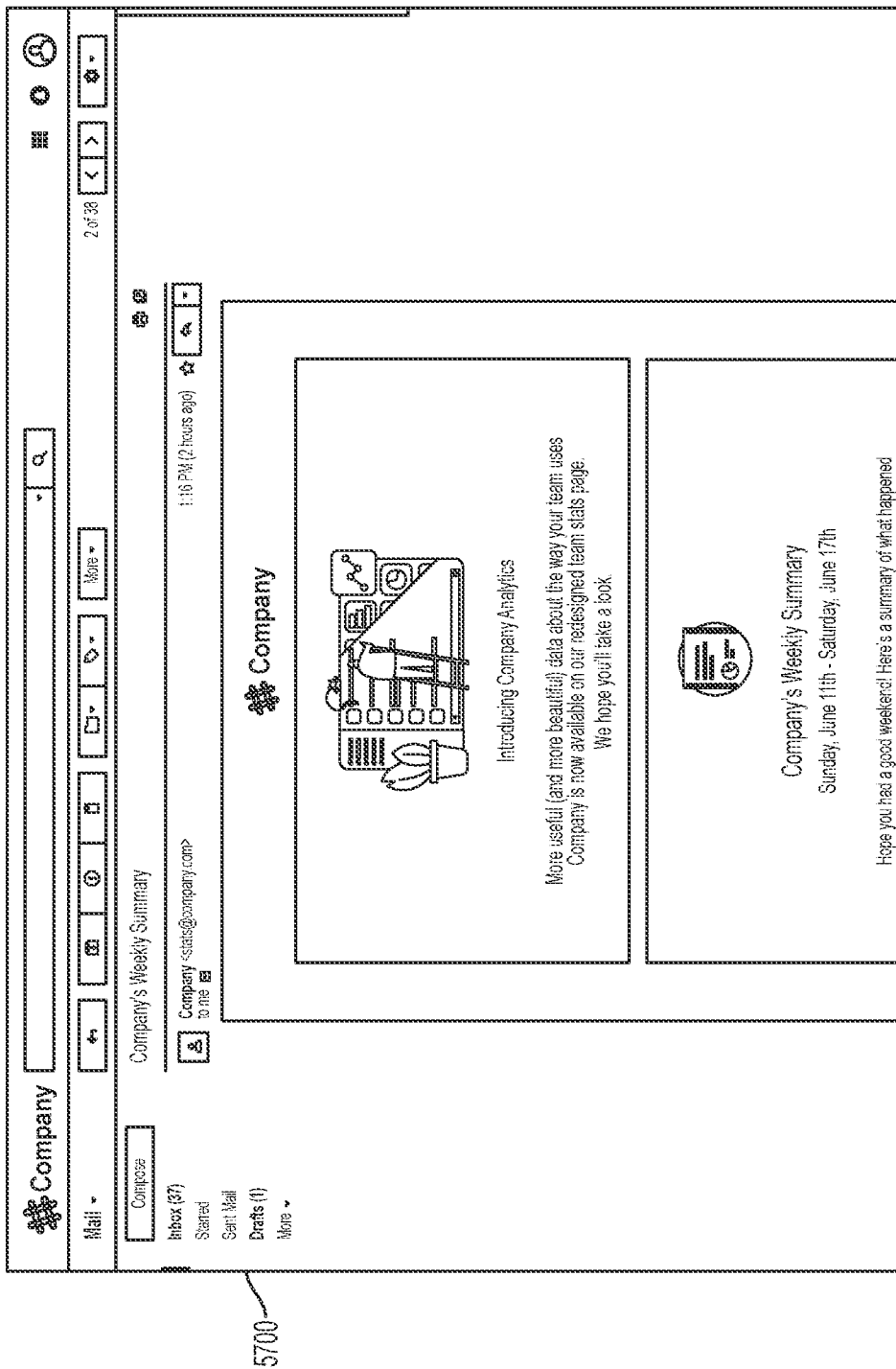

FIG. 57 illustrates an exemplary interface for use with embodiments of the present disclosure. Interface 5700 illustrates an enterprise analytics email interface.

Figure 58:
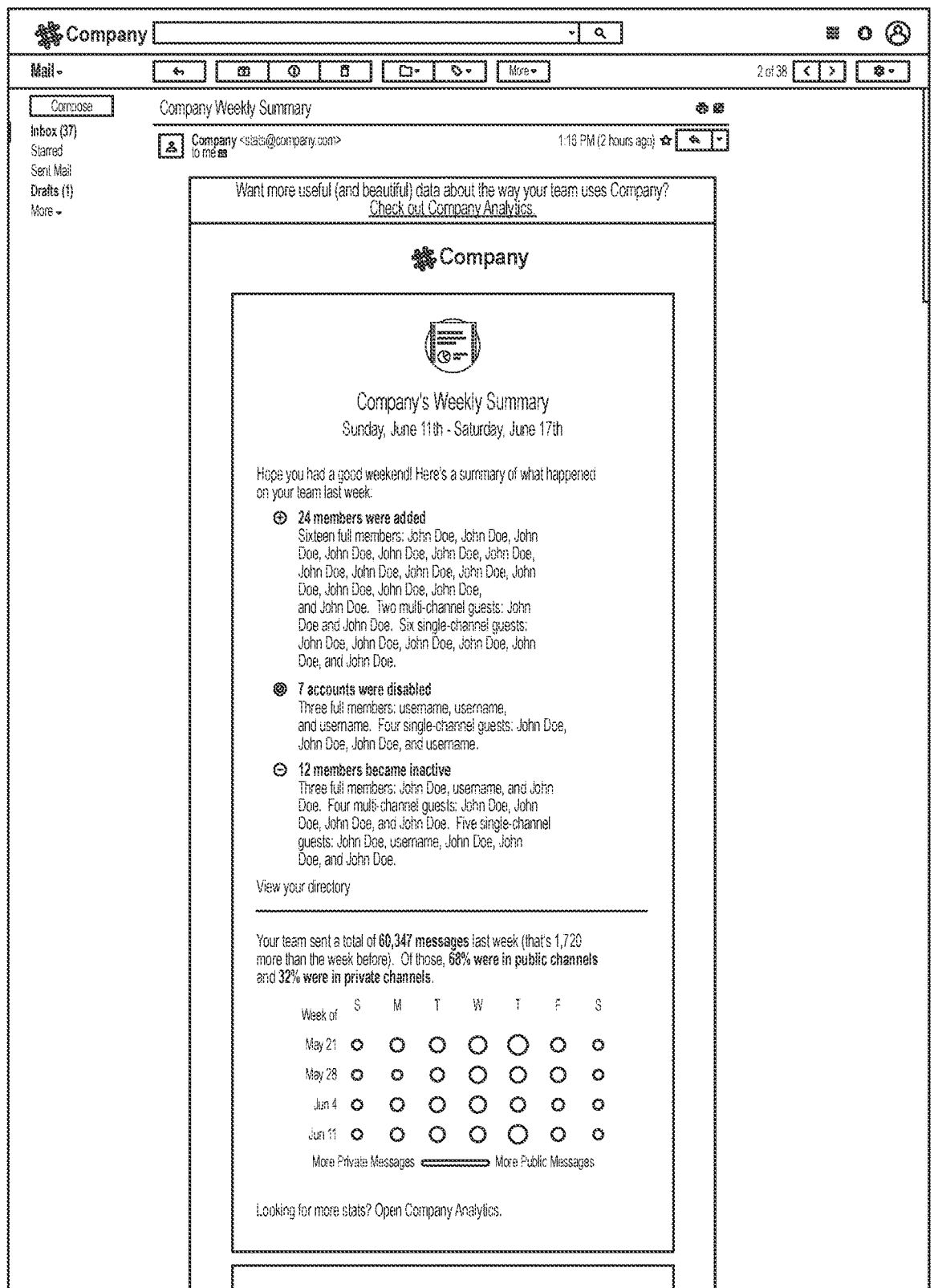

FIG. 58 illustrates an exemplary interface for use with embodiments of the present disclosure. Interface 5800 illustrates an enterprise analytics email interface.

Figure 59:
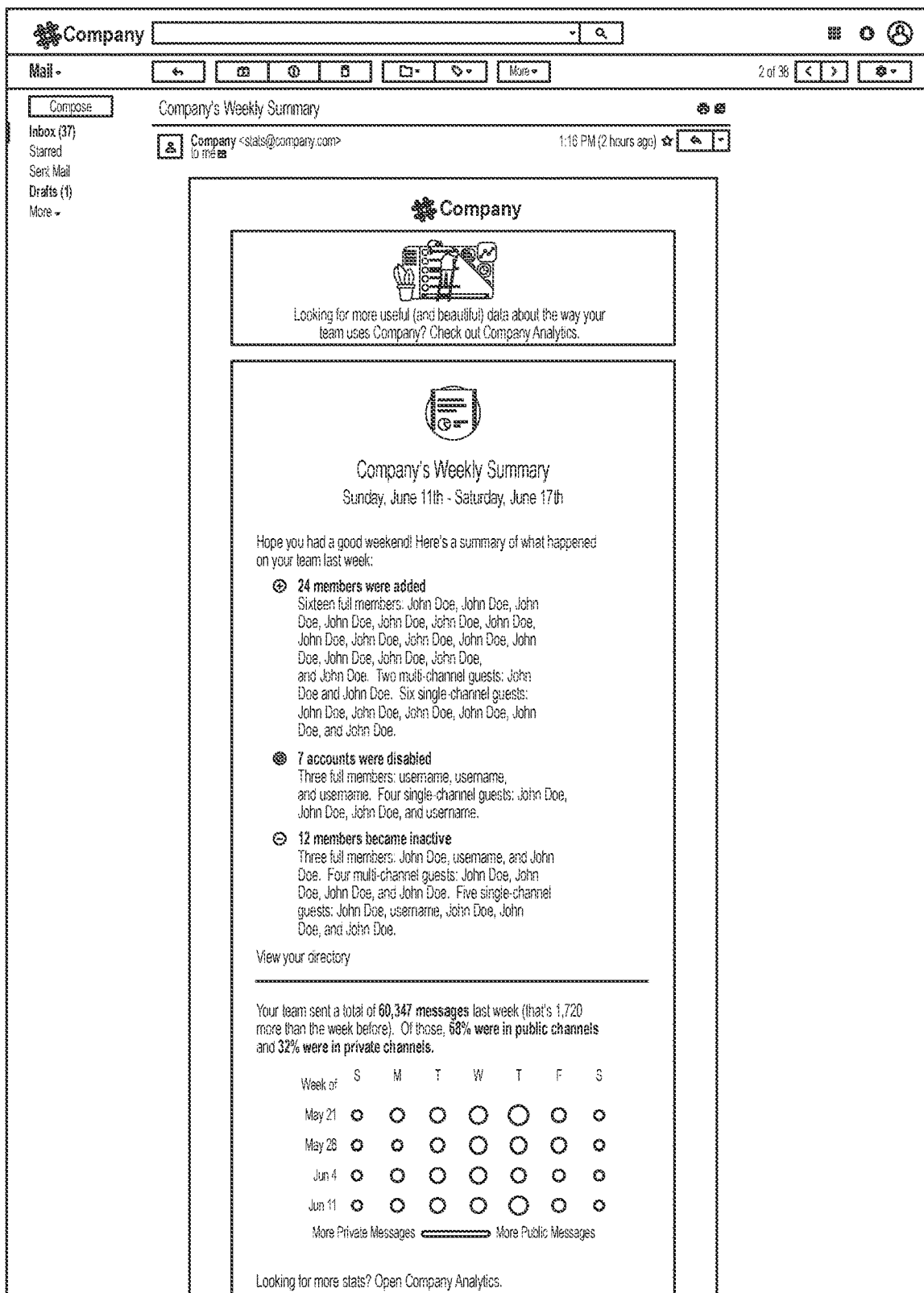

FIG. 59 illustrates an exemplary interface for use with embodiments of the present disclosure. Interface 5900 illustrates an enterprise analytics email interface.

Figure 60:
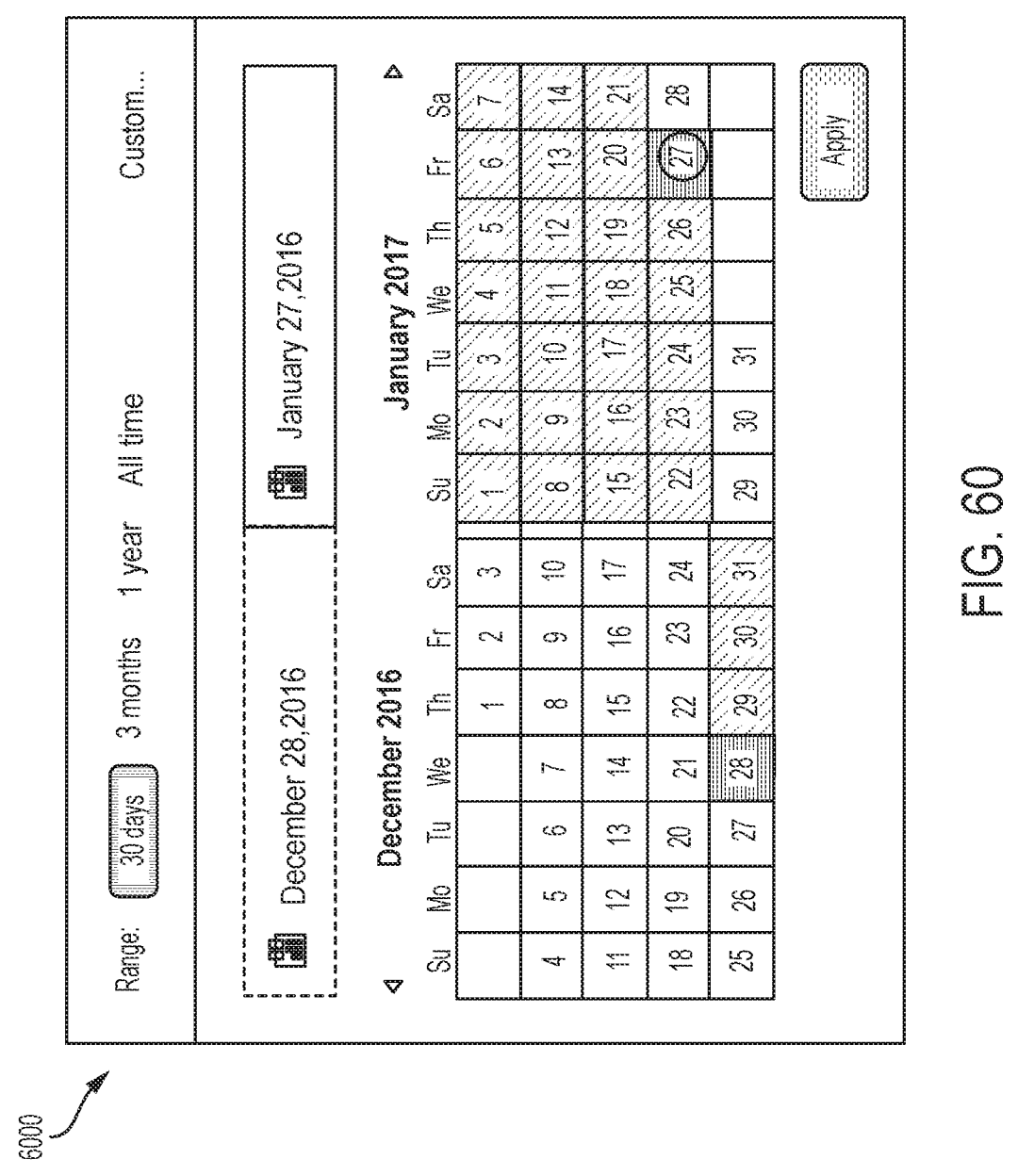

FIG. 60 illustrates an exemplary interface for use with embodiments of the present disclosure. Interface 6000 illustrates a date picker interface.

Table 18 illustrates examples of Enterprise Analytic Metric Levels, Enterprise Analytic Metrics, and Enterprise Analytic Metric Definitions.

TABLE 18

Example Enterprise Analytic Metric Levels, Enterprise Analytic Metrics, and Enterprise Analytic Metric Definitions

| Enterprise Analytic Metric Level | Enterprise Analytic Metric | Enterprise Analytic Metric Definition |
|---|---|---|
| Enterprise/Organization | Date (day) | |
| | Number of Teams | Total number of teams in the org |
| | Total enabled users | Total number of enabled non-bot users on the org |
| | Total enabled non-guest users | Total number of enabled non-bot, non-guest users on the org |
| | Total enabled guest users | Total number of enabled guest users on the org |
| | Billable active users | Number of users who are marked as active for billing purposes |
| | Active users: readers | Number of users who had at least 1 cursor mark move |
| | Active users: writers | Number of users who posted at least one message |
| | Weekly active users: readers | Same definition as Daily active users: readers but this metric is counting unique users over the current day and the preceding 7 days |

TABLE 18-continued

Example Enterprise Analytic Metric Levels, Enterprise Analytic Metrics, and Enterprise Analytic Metric Definitions

| Enterprise Analytic Metric Level | Enterprise Analytic Metric | Enterprise Analytic Metric Definition |
|---|---|---|
| | Weekly active users: writers | Same definition as Daily active users: writers but this metric is counting unique users over the current day and the preceding 7 days |
| | Messages from people | Number of messages sent by non-app accounts |
| | Messages from apps | Number of messages sent by apps |
| | Messages in public channels | All messages sent in public channels (includes both team and shared channels) |
| | Messages in private channels | All messages sent in private channels (includes both team and shared channels) |
| | Messages in shared channels | All messages sent in shared channels (includes both public and private shared channels) |
| | DMs | Total number of DMs sent in the org |
| | % of messages posted in public channels | Ratio of messages in public channels to total messages |
| | % of messages posted in private channels | Ratio of messages in private channels to total messages |
| | % of messages posted in DMs | Ratio of messages in DMs to total messages |
| | Cursor mark moves in public channels | The total number of cursor mark moves in public channels Exclude muted channels" |
| | Cursor mark moves in private channels | The total number of cursor mark moves in private channels Exclude muted channels" |
| | Cursor mark moves in shared channels | The total number of cursor mark moves in shared channels Exclude muted channels" |
| | Cursor mark moves in DMs | The total number of cursor mark moves in DMs Exclude muted channels" |
| | % of cursor mark moves in public channels | Ratio of cursor mark moves in public channels to total cursor mark moves |
| | % of cursor mark moves in private channels | Ratio of cursor mark moves in private channels to total cursor mark moves |
| | % of cursor mark moves in DMs | Ratio of cursor mark moves in DMs to total cursor mark moves |
| | Number of files uploaded | Total files uploaded in the organization |
| | Cross-team DMs | |
| | Cross-team Calls | |
| Team | Date | |
| | Team name | |
| | Calls | |
| | Number of public local and shared channels | Total number of non-archived, non-deleted public channels on the team. It should include shared channels |
| | Number of public shared channels | |
| | Total enabled users | Total number of enabled non-bot users on the team |
| | Total enabled non-guest users | Total number of enabled non-bot, non-guest users on the team |
| | Total enabled guest users | Total number of enabled guest users on the team |
| | Daily active users: readers | A user should be considered an active reader on a team if they have at least 1 cursor mark move (in a non-muted channel) while in the team's context |
| | Daily active users: writers | A user should be considered an active writer on a team if they send at least 1 message while in the team's context |
| | Weekly active users: readers | Same definition as Daily active users: readers but this metric is counting unique users over the current day and the preceding 7 days |
| | Weekly active users: writers | Same definition as Daily active users: writers but this metric is counting unique users over the current day and the preceding 7 days |

TABLE 18-continued

Example Enterprise Analytic Metric Levels, Enterprise Analytic
Metrics, and Enterprise Analytic Metric Definitions

| Enterprise Analytic Metric Level | Enterprise Analytic Metric | Enterprise Analytic Metric Definition |
|---|---|---|
| | Messages from people | Number of messages sent by non-app users<br>For shared channels and DMs, only count messages posted by users in the team's context." |
| | Messages from apps | Number of messages sent by apps that are installed on the team |
| | Messages in public channels | Messages posted in public channels (includes both team and shared channels)<br>For shared channels, count messages posted by users in the team's context. |
| | Messages in private channels | Messages posted in private channels (includes both team and shared channels)<br>For shared channels, count messages posted by users in the team's context. |
| | Messages in shared channels | Messages posted in channels that are shared with the team by users who were in the team context (i.e. had this team open in the enterprise group-based communication system)<br>Includes both public and private shared channels" |
| | DMs | Number of DMs sent while a user was in the team context (i.e. had this team open in the enterprise group-based communication system) |
| | % of messages posted in public channels | Ratio of messages in public channels to total messages |
| | % of messages posted in private channels | Ratio of messages in private channels to total messages |
| | % of messages posted in DMs | Ratio of messages in DMs to total messages |
| | Cursor marks moved in all channels | |
| | Cursor mark moves in public channels | The total number of cursor mark moves in public channels (includes team and shared channels).<br>Exclude muted channels<br>For shared channels, count usage by users in the team's context. |
| | Cursor mark moves in private channels | The total number of cursor mark moves in private channels (includes team and shared channels).<br>Exclude muted channels<br>For shared channels, count usage by users in the team's context. |
| | Cursor mark moves in shared channels | The total number of cursor mark moves in shared channels made by users who were in the team's context.<br>Exclude muted channels" |
| | Cursor mark moves in DMs | The total number of cursor mark moves in DMs made by users who were in the team's context<br>Exclude muted channels |
| | % of cursor mark moves in public channels | Ratio of cursor mark moves in public channels to total cursor mark moves |
| | % of cursor mark moves in private channels | Ratio of cursor mark moves in private channels to total cursor mark moves |
| | % of cursor mark moves in DMs | Ratio of cursor mark moves in DMs to total cursor mark moves |
| | Number of files uploaded in the workspace's channels | Number of files that were uploaded in the team's channels or channels shared with the team<br>For shared channels, count usage by users in the team's context. |
| | File storage used by the team<br>File storage added in the day by the team (historical) | Total gigabytes of storage space used by the team's files. This should be the total storage used and not the incremental amount added on that day |

TABLE 18-continued

Example Enterprise Analytic Metric Levels, Enterprise Analytic
Metrics, and Enterprise Analytic Metric Definitions

| Enterprise Analytic Metric Level | Enterprise Analytic Metric | Enterprise Analytic Metric Definition |
|---|---|---|
| | All-time messages sent | Total messages ever posted on the team (including messages from humans and messages from apps). |
| Workspace | Apps installed | Number of apps installed on the team. |
| | Workspace name | |
| | Workspace domain | |
| | Workspace creation date | |
| | Total enabled users | Total number of enabled non-bot users on the team on the date the report is generated |
| | Total enabled non-guest users | Total number of enabled non-bot, non-guest users on the team on the date the report is generated |
| | Total enabled guest users | Total number of enabled guest users on the team on the date the report is generated |
| | # of apps | Total apps installed on the team on the date the report is generated. |
| | # of public team channels | Number of public, non-archived channels on this team on the date the report is generated. Does not include shared channels |
| | # of public channels shared with this team | Number of public, non-archived channels that are shared with this team on the date the report is generated |
| | % of enabled users who were active | (Total Readers)/(Total Enabled Users) |
| | % change in active users from prior month | [(Total Readers for the current 30 day period) − (Total Readers for the prior 30 day period)]/(Total Readers for the prior 30 day period) |
| | Active users: readers | See above |
| | Active users: writers | See above |
| | Messages from people | See above |
| | Messages from apps | See above |
| | % of messages posted in public channels | Ratio of messages in public channels to total messages |
| | Messages in public channels | See above |
| | Messages in private channels | See above |
| | Messages in shared channels | See above |
| | DMs | See above |
| | % of cursor mark moves in public channels | Ratio of cursor mark moves in public channels to total cursor mark moves |
| | Cursor mark moves in public channels | See above |
| | Cursor mark moves in private channels | See above |
| | Cursor mark moves in shared channels | See above |
| | Cursor mark moves in DMs | See above |
| | Number of files uploaded in the team's channels | See above |
| Public Channel | Channel name | |
| | Creation date | |
| | Date of last message posted | |
| | Is_shared | Flag that indicates if the channel is shared or not. When viewing this report for a team, channels shared with the team are included |
| | Total members | Full members + guest members on the date the report is generated |
| | Number of full members | Number of full members in the channel on the date the report is generated |
| | Number of guest members | Number of guests in the channel on the date the report is generated |
| | Number of messages posted | Total messages posted in the channel |
| | Messages from people | Total number of messages posted by non-bot users |
| | Messages from apps | Total number of messages posted by apps |
| | Number of users who posted a message | Total number of users (excluding bots) who posted at least one message |
| | Number of readers | Total number of users with at least 1 cursor mark move in the channel |

TABLE 18-continued

Example Enterprise Analytic Metric Levels, Enterprise Analytic Metrics, and Enterprise Analytic Metric Definitions

| Enterprise Analytic Metric Level | Enterprise Analytic Metric | Enterprise Analytic Metric Definition |
|---|---|---|
| | Number of reactions | Total number of emoji reactions on messages in the channel |
| | Number of users who reacted to a message | Total number of users who posted at least 1 emoji reaction |
| | % change in users posting messages | [(Number of users who posted a message for the current 30 day period) − (Number of users who posted a message for the prior 30 day period)]/(Number of users who posted a message for the prior 30 day period) |
| | % users posting messages | |
| | Channel purpose | |
| | Workspaces | List of workspaces the channel is shared with |
| | Most active users | |
| User | Full Name | |
| | Username | |
| | Email | |
| | Account Type | Either Full Member, Single-Channel Guest, or Multi-Channel Guest |
| | Department | Used to attribute enterprise group-based communication system costs back to an internal cost center or department |
| | Cost center | |
| | Workspaces | List of workspaces the user is enabled on |
| | Is_billable | Flag that indicates whether the user is considered active for billing purposes |
| | Messages sent in last 30 days | Total messages sent by this user in the last 30 days |
| | Messages sent - all time | Total messages sent by this user since their account was created |
| | # of days active in last 30 days | Number of days where the user either an active writer or reader (i.e. posted a message or had at least one cursor mark move) |
| | Date of last activity | Date the user last posted a message or had a cursor mark move |
| | Date of account creation | |
| | What I Do | |
| | Time spent active | |
| Third Party Resource (or Application) | App ID (or Third Party Resource ID) | |
| | App Name (or Third Party Resource Name) | External apps: App Name field Internal/custom apps: Custom Integration Name if the app has one. If the app doesn't, then fall back to the App Name |
| | Person who installed the app | The user who initially installed the app or created the custom integration |
| | Date added | Date the app was first installed in the org or team |
| | Active users | Number of users who have taken at least one action with the app |
| | % of team/org active users using the app | app_active_users_*d/readers_count_*d |
| | Number of workspaces installed on | Number of workspaces in the org that have the app installed |
| | List of workspaces the app is installed on | List of workspaces the app is installed on |
| | Number of workspaces actively using the app | Number of workspaces where the app is actively used by at least one person |
| | App Actions | Number of times users take particular actions within an app |

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. One or more non-transitory computer-readable media storing computer-executable instructions that, when executed by at least one processor, perform a method for receiving communications by an enterprise-scale group-based communication system and programmatically generating analytics for the enterprise-scale group-based communication system, the method comprising:
   causing display of a plurality of group-based communication channels and a plurality of direct messages in a user interface of the enterprise-scale, group-based communication system, wherein the plurality of group-based communication channels comprise a plurality of channel messages that are distinct from the plurality of direct messages;
   receiving a request for enterprise analytics based on interaction data of a plurality of users of the enterprise-scale, group-based communication system;
   retrieving, from an enterprise-scale group-based communication system repository, the interaction data describing a plurality of interactions of the plurality of users;
   extracting, from the interaction data,
   wherein the interaction metadata comprises enterprise attributes associated with one or more user identifiers associated with at least one of the plurality of channel messages or the plurality of direct messages, channel identifiers associated with the plurality of channel messages, and activities associated with the one or more user identifiers;
   generating a first association data structure based on the enterprise attributes;
   generating a second association data structure based on the channel identifiers associated with the plurality of channel messages;
   joining the first and second association data structures to obtain a first joined data structure;
   generating a third association data structure based on the activities associated with the one or more user identifiers;
   joining the first joined data structure and the third association data structure to obtain a second joined data structure;
   filtering the second joined data structure based on user-selected unwanted data to produce a final data structure;
   returning the final data structure to a requesting device for rendering by an analytics visualization user interface;
   generating analytics visualizations based on the final data structure; and
   causing display of the analytics visualizations by the analytics visualization user interface.

2. The media of claim 1, wherein the first association data structure represents statistical calculations and aggregations of the interaction data.

3. The media of claim 1, wherein filtering the second joined data structure further includes filtering out one of private information or sensitive information.

4. The media of claim 1, wherein filtering the second joined data structure further includes filtering out interactions not matching a group-based communication system user criterion included in user-specified criteria.

5. The media of claim 1, wherein filtering the second joined data structure further includes filtering out interactions not matching a group-based communication system channel criterion included in user-specified criteria.

6. The media of claim 1, wherein filtering the second joined data structure further includes filtering out interactions not matching a time criterion included in user-specified criteria.

7. The media of claim 1, wherein the interaction metadata comprises workspace identifiers, further comprising:
   generating a fourth association data structure based on the workspace identifiers; and
   joining the fourth association data structure with the first and second association data structures, such that the first joined data structure further includes the fourth association data structure.

8. A method for receiving communications by an enterprise-scale group-based communication system and programmatically generating analytics for the enterprise-scale group-based communication system, the method comprising:

causing display of a plurality of group-based communication channels and a plurality of direct messages in a user interface of the enterprise-scale, group-based communication system, wherein the plurality of group-based communication channels comprise a plurality of channel messages that are distinct from the plurality of direct messages;

receiving a request for enterprise analytics based on interaction data of a plurality of users of the enterprise-scale, group-based communication system;

retrieving, from an enterprise-scale group-based communication system repository, the interaction data describing a plurality of interactions of the plurality of users;

extracting, from the interaction data, interaction metadata, wherein the interaction metadata comprises enterprise attributes associated with one or more user identifiers associated with at least one of the plurality of channel messages or the plurality of direct messages, channel identifiers associated with the plurality of channel messages, and activities associated with the one or more user identifiers;

generating a first association data structure based on the enterprise attributes;

generating a second association data structure based on the channel identifiers associated with the plurality of channel messages;

joining the first and second association data structures to obtain a first joined data structure;

generating a third association data structure based on the activities associated with the one or more user identifiers;

joining the first joined data structure and the third association data structure to obtain a second joined data structure;

filtering the second joined data structure based on user-selected unwanted data to produce a final data structure;

returning the final data structure to a requesting device for rendering by an analytics visualization user interface;

generating analytics visualizations based on the final data structure; and causing display of the analytics visualizations by the analytics visualization user interface.

9. The method of claim 8, wherein the first association data structure represents statistical calculations and aggregations of the interaction data.

10. The method of claim 8, wherein filtering the second joined data structure further includes filtering out one of private information or sensitive information.

11. The method of claim 8, wherein filtering the second joined data structure further includes filtering out interactions not matching a group-based communication system channel criterion included in user-specified criteria.

12. The method of claim 8, wherein filtering out the user-selected unwanted data from the second joined data structure further includes filtering out interactions not matching a group-based communication system channel criterion included in user-specified criteria.

13. The method of claim 8, wherein filtering the second joined data structure further includes filtering out interactions not matching a time criterion included in user-specified criteria.

14. The method of claim 8, wherein the interaction metadata comprises workspace identifiers, further comprising:

generating a fourth association data structure based on the workspace identifiers; and joining the fourth association data structure with the first and second association data structures, such that the first joined data structure further includes the fourth association data structure.

15. A system for receiving communications by an enterprise-scale group-based communication system and programmatically generating analytics for the enterprise-scale group-based communication system, comprising:

at least one processor; and one or more non-transitory computer-readable media storing computer-executable instructions that, when executed by the at least one processor, perform a method comprising:

causing display of a plurality of group-based communication channels and a plurality of direct messages in a user interface of the enterprise-scale, group-based communication system, wherein the plurality of group-based communication channels comprise a plurality of channel messages that are distinct from the plurality of direct messages;

receiving a request for enterprise analytics based on interaction data of a plurality of users of the enterprise-scale, group-based communication system;

retrieving, from an enterprise-scale group-based communication system repository, the interaction data describing a plurality of interactions of the plurality of users;

extracting, from the interaction data, interaction metadata, wherein the interaction metadata comprises enterprise attributes associated with one or more user identifiers associated with at least one of the plurality of channel messages or the plurality of direct messages, channel identifiers associated with the plurality of channel messages, and activities associated with the one or more user identifiers;

generating a first association data structure based on the enterprise attributes;

generating a second association data structure based on the channel identifiers associated with the plurality of channel messages;

joining the first and second association data structures to obtain a first joined data structure;

generating a third association data structure based on the activities associated with the one or more user identifiers;

joining the first joined data structure and the third association data structure to obtain a second joined data structure;

filtering the second joined data structure based on user-selected unwanted data to produce a final data structure;

returning the final data structure to a requesting device for rendering by an analytics visualization user interface;

generating analytics visualizations based on the final data structure; and causing display of the analytics visualizations by the analytics visualization user interface.

16. The system of claim 15, wherein the first association data structure represents statistical calculations and aggregations of the interaction data.

17. The system of claim 15, wherein filtering the second joined data structure further includes filtering out one of private information or sensitive information.

18. The system of claim 15, wherein filtering the second joined data structure includes filtering out interactions not matching a group-based communication system user criterion included in user-specified criteria.

19. The system of claim 15, wherein filtering the second joined data structure includes filtering out interactions not matching a group-based communication system channel criterion included in user-specified criteria.

20. The system of claim 15, wherein filtering the second joined data structure includes filtering out interactions not matching a time criterion included in user-specified criteria.

* * * * *